(12) United States Patent
Szubbocsev

(10) Patent No.: US 10,852,737 B2
(45) Date of Patent: Dec. 1, 2020

(54) POWER MANAGEMENT, DYNAMIC ROUTING AND MEMORY MANAGEMENT FOR AUTONOMOUS DRIVING VEHICLES

(71) Applicant: Micron Technology, Inc., Boise, ID (US)

(72) Inventor: Zoltan Szubbocsev, Haimhausen (DE)

(73) Assignee: Micron Technology, Inc., Boise, ID (US)

( * ) Notice: Subject to any disclaimer, the term of this patent is extended or adjusted under 35 U.S.C. 154(b) by 393 days.

(21) Appl. No.: 15/933,260

(22) Filed: Mar. 22, 2018

(65) Prior Publication Data

US 2019/0294173 A1    Sep. 26, 2019

(51) Int. Cl.
| | |
|---|---|
| *G05D 1/02* | (2020.01) |
| *B60L 58/12* | (2019.01) |
| *G05D 1/00* | (2006.01) |
| *G01C 21/34* | (2006.01) |
| *B60L 15/20* | (2006.01) |

(52) U.S. Cl.
CPC ............ *G05D 1/0217* (2013.01); *B60L 58/12* (2019.02); *G05D 1/0088* (2013.01); *G05D 1/0274* (2013.01); *B60L 2240/62* (2013.01)

(58) Field of Classification Search
USPC ......................................................... 701/26
See application file for complete search history.

(56) References Cited

U.S. PATENT DOCUMENTS 8,996,213 B2*   3/2015   Ishikawa ............. B60L 15/2045
701/22

9,126,493 B2*   9/2015   Suganuma .............. B60L 53/63
10,137,897 B2*   11/2018   Higgins ................. B60W 10/18
(Continued)

FOREIGN PATENT DOCUMENTS

| JP | 2017211758 | | 11/2017 |
|---|---|---|---|
| JP | 2018025856 | | 2/2018 |
| JP | 2018025856 A | * | 2/2018 |

OTHER PUBLICATIONS

International Search Report and Written Opinion, PCT/US2019/023168, dated Jul. 4, 2019.

*Primary Examiner* — Aniss Chad
*Assistant Examiner* — Mahmoud M Kazimi
(74) *Attorney, Agent, or Firm* — Greenberg Traurig

(57) ABSTRACT

The invention relates to a system and method for navigating an autonomous driving vehicle (ADV) that utilizes an-onboard computer and/or one or more ADV control system nodes in an ADV network platform. The on-board computer receives battery monitoring and management data concerning a battery stack. The on-board computer, utilizing a battery management system, determines the current state of charge (SOC) and other information concerning the battery stack and determines if the estimated total amount of electrical power required to navigate an ADV along a generated route to reach the predetermined destination is available. In response to determining that the ADV cannot reach the predetermined destination, the on-board computer automatically initiates a dynamic routing algorithm, which utilizes artificial intelligence, to generate alternative routes in an effort to find a route that the ADV can navigate to reach the destination utilizing the current state of charge (SOC) of the battery stack.

20 Claims, 13 Drawing Sheets

(56) References Cited

U.S. PATENT DOCUMENTS

| | | |
|---|---|---|
| 2013/0342310 A1 | 12/2013 | Park et al. |
| 2017/0168493 A1 | 6/2017 | Miller et al. |
| 2017/0355371 A1 | 12/2017 | Higgins |
| 2018/0118029 A1* | 5/2018 | Koebler .................... B60T 7/18 |
| 2018/0347997 A1* | 12/2018 | Fujimura ............ B60L 15/2045 |

* cited by examiner

POWER MANAGEMENT, DYNAMIC ROUTING AND MEMORY MANAGEMENT FOR AUTONOMOUS DRIVING VEHICLES

CROSS-REFERENCE TO RELATED APPLICATIONS

None.

STATEMENT REGARDING FEDERALLY SPONSORED RESEARCH OR DEVELOPMENT

None.

FIELD OF THE INVENTION

Various embodiments relate generally to autonomous-driving vehicles, the associated features and capabilities, and the associated systems and methods utilized to perform certain functionalities. More specifically, systems, methods and devices are configured to navigate an autonomous driving vehicle (ADV) and alter a navigation route in various ways based upon input data, sensed data and received data.

BACKGROUND OF THE INVENTION

Typical approaches to driverless cars do not take into account the power consumption required to navigate a self-driving vehicle along a route to reach a predetermined destination. Conventional manually driven vehicles can include one or more cameras and radars that can generate around 12 gigabytes of data every minute. Self-driving vehicles require the use of sensors to navigate the vehicle through the world that utilize large amounts of computing power that is substantially more than is required for conventional manually driven vehicles. Whether utilizing a combustion engine, hybrid combustion and electric engine or fully electrical-driven vehicle to power a self-driving car, there will be a huge electrical demand made upon the power generation system that will translate to a reduced range of operation for the self-driving vehicle.

BRIEF SUMMARY OF THE DISCLOSURE

It is an object of one or more embodiments of the present invention to improve upon the aforementioned deficiencies.

One or more embodiments described herein include a system and/or a method that is used to route and autonomously navigate an autonomous driving vehicle (ADV) using a dynamic routing algorithm that utilizes artificial intelligence and improved memory management. The system and method utilized by one or more embodiments to route and autonomously navigate an ADV using a dynamic routing algorithm that utilizes artificial intelligence and improved memory management includes an on-board computer that is programmed to autonomously navigate a vehicle. One or more embodiments of an ADV include one or more sensor devices communicatively coupled to the on-board computer, and one or more processors that are programmed to determine a vehicle location that represents a current geographical location of the vehicle.

One or more embodiments of an ADV include one or more sensor devices communicatively coupled to the on-board computer, and one or more processors that are programmed to determine a vehicle location that represents a current geographical location of the vehicle. One or more embodiments of an ADV determine a first destination that represents a first predetermined geographical destination of the vehicle, generate a map of a geographical region that includes a starting location, such as the vehicle location or a scheduled starting geographical location, the first destination, and navigable pathways between the vehicle location and the first destination upon which the vehicle can navigate to reach the first destination. One or more embodiments of an ADV generate a first route that includes the vehicle location, the first destination, and a first set of navigable pathways included in the first route upon which the vehicle can navigate to reach the first destination. One or more embodiments utilize one or more sensor devices communicatively coupled to a battery device and the CPU to monitor and manage the battery device. One or more embodiments of an ADV analyze information concerning the first set of navigable pathways (e.g., navigable pathway information) included in the first route and generate a first route time that represents the total time it will take the vehicle from the vehicle location to navigate the first route to reach the first destination. One or more embodiments of an ADV set the first route as the current route, set the first destination as the current destination and navigate the vehicle along the current route, periodically determine and update the vehicle location and set each updated vehicle location as a current vehicle location that represents the current geographical location of the vehicle.

One or more embodiments of an ADV, in response to the determination of a current vehicle location, update the first route time to the current route time that represents the time it will take the vehicle to reach the current destination from the current vehicle location navigating the current route, generate a first alternative route set that represents a set of one or more alternative routes that the vehicle can navigate from the current vehicle location to the current destination that are different from the current route, wherein each of the alternative routes in the first alternative route set includes at least one navigable pathway that is not included in the current route and each of the other alternative routes. One or more embodiments of an ADV, in response to the identification of a route condition set that represents one or more qualifying route conditions that will be applied to each alternative route in the first alternative route set, apply a route condition set to each alternative route included in the first alternative route set and determine a qualifying route set that includes one or more qualifying routes that meet all of the qualifying conditions. One or more embodiments of an ADV, in response to no route condition set being identified, set an alternative route set as the qualifying route set, analyze information concerning the one or more navigable pathways included in each qualifying route included in the qualifying route set and generate a qualifying route time for each qualifying route that represents a time that it will take the vehicle from its current location to navigate the qualifying route to reach the current destination. One or more embodiments of an ADV determine, from a current route time and each qualifying route time, a shortest time, and in response to the shortest time being shorter than the current route time, automatically set a qualifying route associated with the shortest time as a new current route and navigate the vehicle along the new current route to reach the current destination.

One or more embodiments of an ADV are configured as an electric vehicle. One or more embodiments of an ADV are configured as a hybrid electric vehicle. One or more embodiments of an ADV include an on-board computer comprising one or more processors programmed to autonomously navigate the vehicle along a current route to a predetermined geographical destination. One or more embodiments of an ADV include a battery device configured to provide electrical power to an autonomous driving vehicle. One or more embodiments of an ADV include one or more sensor devices communicatively coupled to the on-board computer. One or more embodiments of an ADV include one or more sensor devices that are configured to generate battery data including a state of charge of the battery device. One or more embodiments of an ADV are configured to determine a starting geographical location of the vehicle. One or more embodiments of an ADV are configured to generate mapping information for a geographical area that includes the starting location of the vehicle, the destination, one or more navigable pathways between the starting vehicle location and the destination and information concerning the one or more pathways. One or more embodiments of an ADV are configured to generate, utilizing the mapping information, the current route from the starting location of the vehicle to the destination that includes one or more of the navigable pathways. One or more embodiments of an ADV are configured to determine a current route time that represents a time that it will take to navigate the vehicle along the current route from the starting location to reach the destination. One or more embodiments of an ADV are configured to receive the state of charge of the battery device from the at least one sensor device. One or more embodiments of an ADV are configured to determine an estimated total amount of electrical power required to navigate the vehicle along the current route to reach the destination. One or more embodiments of an ADV are configured to determine, utilizing the state of charge of the battery device and the total amount of electrical power, if the on-board computer can navigate the vehicle along the current route from the starting location to the destination without having to charge the battery device utilizing an external power source. One or more embodiments of an ADV are configured to, in response to determining that the on-board computer can navigate the vehicle along the current route to reach the destination without having to charge the battery device utilizing the external power source, autonomously navigate the vehicle from the starting location to the destination along the current route. One or more embodiments of an ADV include a data storage device communicatively coupled to the one or more processors for retrievably storing data. One or more embodiments of an ADV include an in-memory processing system that includes the at least one of the one or more processors to perform in-memory processing of data received from one or more devices included in the system.

One or more embodiments of an ADV are configured to determination of an estimated total amount of electrical power required to navigate the vehicle along the current route to reach the destination. One or more embodiments of an ADV are configured to analyze, utilizing the mapping information, the one or more navigable pathways included in the current route. One or more embodiments of an ADV are configured to identify stress events associated with the one or more navigable pathways included in the current route that affect the energy charge and discharge of the battery device. One or more embodiments of an ADV are configured to analyze stress events that include, for example, an angle of inclination, traffic congestion, braking events, acceleration events, an angle of curvature, a wind speed, a severity of rain, a surface grade, a depth of snow, or any environmental or road condition that impacts the one or more navigable pathways included in the current route. One or more embodiments of an ADV are configured to determine, utilizing the mapping information, the current route time and the identified stress events, the estimated amount of electrical power that will be discharged from the battery device to enable the on-board computer to navigate the vehicle along the current route to reach the destination.

One or more embodiments of an ADV are configured to, in response to determining that the on-board computer cannot navigate the current route to reach the destination without having to charge the battery device utilizing an external power source, generate, utilizing the mapping information, a set of one or more alternative routes that includes one or more navigable pathways between the starting location to the destination. One or more embodiments of an ADV are configured to determine a corresponding set of alternative route times for the set of alternative routes that represents a time that it will take to navigate the vehicle along each alternative route from the starting location to reach the destination. One or more embodiments of an ADV are configured to generate a set of alternative routes wherein each alternative route included in the set includes at least one navigable pathway that is not included within any of the other alternative routes. One or more embodiments of an ADV are configured to determine an estimated total amount of electrical power required to navigate the vehicle along the current route to reach the destination. One or more embodiments of an ADV are configured to determine, utilizing the state of charge of the battery device and the total amount of electrical power, if the on-board computer can navigate the vehicle along each of the alternative routes from the starting location to the destination without having to charge the battery device utilizing an external power source. One or more embodiments of an ADV are configured to, in response to determining that the on-board computer can navigate the vehicle along one or more alternative routes to reach the destination without having to charge the battery device utilizing the external power source, identify each of the one or more alternative routes that can be navigated without having to charge the battery device utilizing the external power source as a qualifying route set of one or more qualifying routes. One or more embodiments of an ADV are configured to identify each alternative route time associated with the respective qualifying route as a qualifying route time. One or more embodiments of an ADV are configured to determine the new current route by determining a shortest time between the one or more qualifying route times, and setting the qualifying route associated with the shortest time as the new current route of the vehicle.

The above discussion/overview is not intended to describe each embodiment or every implementation of the present disclosure. The Figures and detailed description that follow also exemplify various embodiments.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF THE DISCLOSURE

Figure 1:
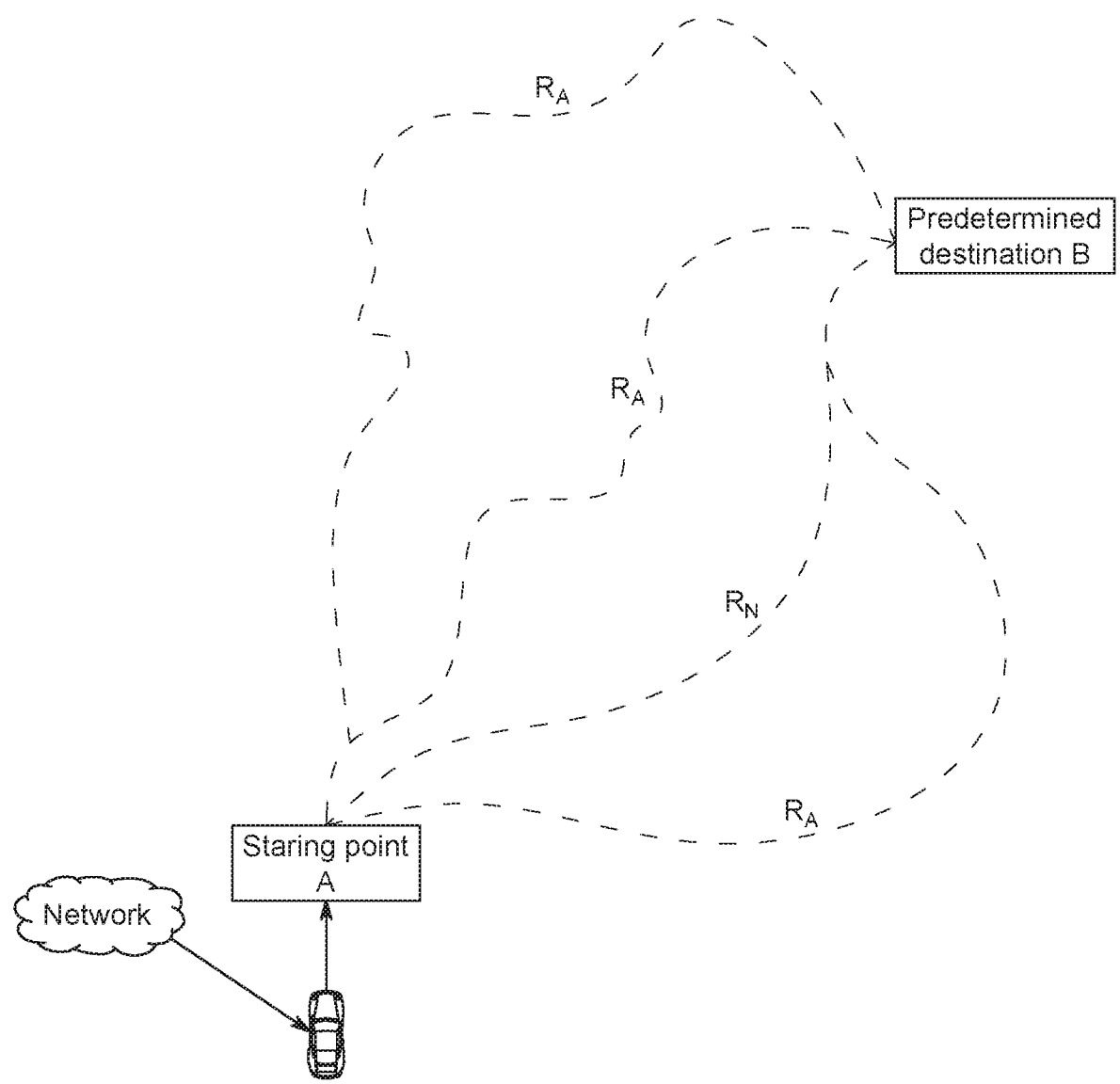
FIG. 1 is a diagram depicting an example of an implementation of a navigation method and system for an ADV that is utilizing a battery management system and navigation technology that relies upon data utilized by an on-board navigation system to route an ADV, according to some embodiments.

One or more embodiments of the present invention functions to generate routing information, mapping information, navigational information, occupant identification information, information containing items transported by an ADV, routes, reference information including a current position of one or more ADVs, timing information including current times to reach a current destination, etc., as described herein.

One or more embodiments of an ADV includes one or more processors included in an ADV on-board computer and/or one or more control and system nodes 502 to monitor and manage the electrical power discharging and charging processes of a battery device utilized by the ADV. In one or more embodiments, the ADV is configured as an electric vehicle (EV). In one or more embodiments, the ADV is configured as a hybrid electric vehicle (HEV). The HEV vehicle is an ADV configured as a hybrid vehicle that includes a battery device in addition to a fuel cell or an engine as a source of motive power that is utilized to move and navigate the vehicle. The EV vehicle is an ADV configured as an electric vehicle that solely utilizes a battery device as a source of motive power that is utilized to move and navigate the vehicle. In each of these configurations, the main source of energy for one or more embodiments of the ADV hybrid EV (HEV) and the ADV EV is the battery device, which includes one or more batteries. As used herein, a sensor is a sensor device that can be a system, an apparatus, software, hardware, a set of executable instructions, an interface, a software application, a transducer and/or various combinations of the aforementioned that include one or more sensors utilized to indicate, respond to, detect and/or measure a physical property and generate data concerning the physical property.

In one or more embodiments, the battery device is a battery stack. Those having skill in the art appreciate that other types of battery devices can be used to provide power to the embodiments of an ADV described herein and, thus, the recitation of a battery stack is not intended to be limiting. As discussed herein with reference to FIGS. 1-4, a battery management system is utilized by the on-board computer to control the electrical power discharge of a battery stack such that the ADV can be operated in a more efficient and power saving mode to increase the distance of operation of the ADV. For example, if an ADV occupant desires to travel to a predetermined destination, one or more embodiments of an ADV described herein include an on-board computer that will estimate the electrical power requirements to navigate the ADV over navigable pathways along a generated route to reach the destination and determine if the ADV can safely reach the destination using the stored energy available to operate the ADV. If the on-board computer determines that the ADV cannot reach the predetermined destination, one or more of the ADV occupants will be alerted and given one or more options to reach the destination. These options can include, for example, charging the ADV battery stack, turning off certain ADV components and/or devices to conserve power, decreasing the speed of the ADV to conserve electrical energy such that the ADV can navigate longer distances, changing the original predetermined destination to another destination, etc.

The types of battery devices that can be utilized by one or more embodiments described herein include a single battery, a plurality of batteries coupled in a series or parallel configuration, a plurality of batteries configured as primary and auxiliary batteries wherein each primary and auxiliary battery is assigned to provide power to certain devices included in the ADV and/or facilitate certain functions and operations performed by an ADV, or a battery stack that includes a plurality of batteries that are coupled in various ways to provide electrical power to the relevant components included in the ADV. In one or more embodiments, the batteries that can be utilized in the battery devices described herein to provide power to an ADV can include, for example, Lithium Ion (Li-Ion), Molten Salt (Na—NiCl2), Nickel Metal Hydride (Ni-MH) and Lithium Sulphur (Li—

S) batteries. As discussed herein, an ADV refers to an autonomous driving electric vehicle or an autonomous-driving hybrid electric vehicle. Persons having skill in the art appreciate that various other types of batteries can be utilized and, as such, the one or more embodiments discussed herein should not be limited to the particular batteries named herein. The discussion herein concerning a battery stack, including the discussion with reference to the FIGS. 1-10, applies to both a battery stack and one or more batteries unless it is stated that the discussion solely applies to a single battery or a battery stack. The discussion herein, including the discussion with reference to the FIGS. 1-10, applies to both configurations (EV and HEV) of an ADV described herein unless it is stated otherwise.

One or more embodiments of an autonomous driving vehicle (ADV) are described herein that are configured to autonomously drive one or more ADV occupants to a destination while utilizing a battery management method and system for managing the electrical power output by a battery stack. For example, with reference to FIG. 1, if one or more ADVs is programmed to navigate one or more routes (e.g., a route that has a geographical starting point A and ends at a predetermined geographical destination at point B), the battery stack utilized by the ADV to navigate the ADV along the generated route is used to provide 1) at least a portion of the power (i.e., in case of the HEV configuration) required by the ADV to navigate the ADV along the generated route (e.g., power to the ADV sensors, the ADV on-board computer and peripheral components/devices, the motor/generator, the wheels of the vehicle, HVAC system, air conditioning system, heating system, ventilation system, audio/visual components, vehicle components (turn signals, horn, warning lights, sun-roof, headlights, brake lights, interior lights and any other mechanism/device/component required to operate and navigate the ADV)), or 2) all of the power (i.e., in case of the EV configuration) required by the ADV to navigate the ADV along the generated route. In this scenario, the battery stack is monitored and managed to 1) determine and monitor the state of health (SOH) of the battery stack, 2) determine and monitor the state of charge (SOC) of the battery stack, 3) determine if the ADV can navigate a generated route to reach the predetermined destination using the battery stack at its current level of SOC and/or SOH, 4) monitor the electrical output of the battery stack, 5) manage the electrical energy output by the battery stack such that the ADV can reach a predetermined destination, 6) manage the operation of the ADV (e.g., turning off certain unneeded ADV sensors and/or other electrical components/devices (e.g., HVAC system, air conditioning system, heating system, ventilation system, audio/visual components, etc.)) to conserve electrical energy to lengthen the navigational distance that the ADV can travel before the battery stack requires an additional electrical charge, 7) manage the speed of the ADV to conserve electrical energy to lengthen the navigational distance that the ADV can travel before the battery stack requires an additional electrical charge, and/or 8) perform other operations to more efficiently operate an ADV, to extend the life of a battery stack utilized by an ADV and/or the operation of an ADV.

Once a route is generated utilizing one or more techniques as described herein, information concerning one or more of the navigable pathways that impact electrical energy discharge and/or electrical energy accumulation experienced by a battery stack utilized by an ADV is analyzed to determine the total amount of electrical power that is required to be output from the battery stack to navigate the ADV from a starting geographical point (e.g., a predetermined starting point, a scheduled starting point or the current location of the ADV) to a predetermined destination. For example, the information concerning the one or more navigable pathways or relevant portions of one or more pathways included in a route that is analyzed to determine its impact upon the state of charge (SOC) of the battery stack can include inclination information, traffic information, estimated idling/stop time, speed information, environmental conditions, temperature information, power required by one or more ADV sensors, power required by one or more ADV components/devices, and any other information that would impact electrical energy discharge or accumulation. Information including the angles of inclination and the angles of curvature of a navigable pathway or a portion of a navigable pathway may be estimated from GPS data. This information can also be determined from historical data generated from other vehicles and/or one or more ADVs navigating the same navigable pathways and generating data concerning the roadways. This information and other information concerning the weather and environmental conditions can also be accessed through one or more proprietary databases and/or services that have accumulated this information and that are accessible to authorized users of the proprietary or on-line system. Once a route is generated utilizing one or more techniques as described herein, the state of charge (SOC) of the battery stack is determined. In one or more embodiments, once a route is generated utilizing one or more techniques as described herein, the state of health (SOH) of the battery stack is determined. The time required to navigate the route to reach the predetermined destination is also determined utilizing one or more techniques described herein. Based upon the time to navigate the route, the information concerning the one or more navigable pathways included in the route, the total amount of electrical power required to navigate the route to reach the predetermined destination, and the SOC (and, optionally the SOH) of the battery stack, the ADV on-board computer 204 determines if the ADV can reach the predetermined destination navigating the current route.

Additionally, in one or more embodiments, the CPU 302 is programmed by the power management and battery monitoring system 312 to give the one or more ADV occupants choices of speeds (e.g., 10, 20, 30, 40, 50, etc. mph/km/h or a % mph/km/h under the average speed of travel along any point or length of the route) at which the ADV will travel along a generated route, depending upon the average speed of the overall route and/or the average speed along one or more navigable pathways included in the route, and determine and display the estimated times of arrival associated with each choice of speed presented. In one or more embodiments, the choices can include choices of one or more speeds which the ADV will maintain along one or more navigable pathways or portions of the navigable pathways included in a route such that 1) the ADV can reach a predetermined destination, and/or 2) the ADV arrives at a predetermined destination at a particular estimated time (e.g., 6:00 AM Friday May 6, 6:15 AM Tuesday September 9, 8:00 PM Wednesday October 20, 8:10 PM Thursday December 28), without having to utilize an external power source (e.g., a charging station) to add charge to the battery stack. For example, once the CPU receives the SOC of the battery stack 402 and determines an estimated total amount of charge that will be required to navigate the ADV from a starting location to the predetermined destination, the CPU 302 can be programmed by the power management and battery monitoring system 312 to display a series of speeds, that represent the speed at which the ADV will be autonomously driven along the generated route, and a series of associated times, that represent an estimated date/time that the ADV will reach the predetermined destination if the associated speed is selected. In this example, the on-board computer 204 includes a display device 210 that includes a touch screen that enables an ADV occupant to select a speed as described herein. This choice can be given at any point along the trip (e.g., before the start of the trip, at any point during the trip).

In one or more embodiments, the CPU 302 is programmed by the power management and battery monitoring system 312 to give the one or more ADV occupants the choice to turn off certain ADV components/devices to conserve power, as discussed herein. Similarly, in one or more embodiments, the choices to turn off certain one or more ADV components/devices can be given as choices that are associated with a threshold level of charge which the ADV will not go below to reach a predetermined destination included in a route. For example, on-board computer can give the ADV occupants to turn off one or more ADV devices/components to enable the ADV to be navigated along a generated route to reach the predetermined destination without having to utilize an external power source to add charge to the battery stack. In one or more embodiments, the options to turn off one or more ADV components/devices can include certain temporal durations that one or more components/devices will be turned off (e.g., air conditioner for 2 hours starting at 12:00 AM and ending at 2:00 AM). The choices to reduce the speed of the ADV and turn off certain ADV components/devices can be both presented to the ADV occupants on a display screen 210 and selected using touch screen technology included in the display screen 210. For example, once the CPU receives the SOC of the battery stack 402 and determines an estimated total amount of charge that will be required to navigate the ADV from a starting location to the predetermined destination, the CPU 302 can be programmed by the power management and battery monitoring system 312 to display one or more ADV components/devices, and a series of associated estimated threshold levels of charge. Each threshold level of charge represents a state of charge (SOC) below which the battery device will not go upon the ADV reaching the predetermined destination. In this example, the on-board computer 204 includes a display device 210 that includes a touch screen that enables an ADV occupant to select an ADV component/device to turn the same to an off state. This choice can be given at any point along the trip (e.g., before the start of the trip, at any point during the trip).

Once it is determined that an ADV can reach the predetermined destination based upon the current state of charge (SOC) (and, optionally, the current state of health (SOH)) of the battery stack or, if, it is determined that the ADV cannot reach the predetermined destination navigating the route utilizing the battery stack with its current state of charge (SOC) (and, optionally, its current state of health (SOH)), the ADV on-board computer 204 generates an alternative route set that includes one or more alternative routes that the ADV can navigate to reach the predetermined destination and associated times, that represent the estimated time for the ADV to reach the predetermined destination from either the current, a predetermined or a scheduled geographical location of the vehicle, for each route. Similar to the original (i.e., current) route, for each alternative route included in the alternative route set, the on-board computer 204 will 1) determine the total estimated amount of electrical power required from the battery stack to navigate the ADV along the alternative route to reach the predetermined destination, 2) identify each alternative route that the ADV can navigate to reach the predetermined destination without having to store anymore charge on the battery stack, 3) determine a qualifying route set that includes one or more qualifying routes that the ADV can navigate to reach the predetermined destination, 4) determine which qualifying route is the shortest temporal route (i.e., will take the shortest amount of time to navigate to reach the predetermined destination), and 5) set the shortest temporal alternative route as the new current route and navigate the ADV along the new current route to reach the predetermined destination.

In one or more embodiments, if the ADV cannot reach the predetermined destination utilizing either the original route or any alternative routes, then the on-boar computer 204 will give the ADV occupant(s)/user a choice to input another destination or proceed to an EV or HEV charging station to charge the battery stack. The charging station can be geographically located on a generated route or outside of a generated route (i.e., closest charging station, charging station located in a pre-selected county, town, city, state, country, etc.). The new geological destination can be wirelessly transmitted over a network to a relevant ADV, stored in an ADV on-board computer 204, and/or transmitted to an ADV over a network by one or more control and system nodes 502 that reside on the ADV control system network 610 and are communicatively coupled to the ADV via a network 608, as described with reference to FIG. 6. One or more embodiments of the present invention will utilize occupant sensor devices 208 and ADV content sensor devices 220 to monitor the weight of the ADV occupants and any contents that are being transported by the ADV such that the weight of the occupant(s) and the contents being transported can be taken into account when determining the total electrical energy required to navigate the car along a route. Those having skill in the art appreciate that the heavier an ADV vehicle is, the more power required to produce enough torque to overcome the friction created by a navigable pathway surface to turn the wheels of the vehicle to move the vehicle along the pathway.

FIG. 1 illustrates at least a portion of an ADV navigation system (e.g., ADV 602) and generally illustrates one or more of its capabilities including generating a route for an ADV that includes a starting point A and a first predetermined destination B ($D_N$), using input data, sensed data, received data and/or other data to autonomously navigate the ADV from a geographical starting point A to a geographical destination point B, and automatically determining, utilizing sensed data, received data and/or other data, if the ADV can navigate the original current route $R_N$ to reach the predetermined geographical destination represented at point B utilizing a battery stack with its current state of charge (SOC) (and, optionally, its current state of health (SOH)). Once it is determined that the ADV can reach the predetermined destination, or if it is determined that the ADV cannot reach the predetermined destination utilizing the current state of charge (SOC) (and, optionally, the current state of health (SOH)) of the battery stack, an alternative route set that includes one or more alternative routes $R_A$ is generated, as described herein, to determine if the ADV can reach the predetermined destination $D_N$ utilizing the current state of charge (SOC) (and, optionally, the current state of health (SOH)) of the battery stack.

For the sake of simplicity, one ADV is shown performing routing and navigation operations on roadways provided within a single geographical area. However, one or more embodiments of the ADV navigation system network (described with reference to FIG. 6) can function to aide a fleet of ADVs to route and navigate a plurality of ADVs throughout the same or different geographical areas on navigational pathways. In one example, ADV 602 includes a vehicle identification that may be utilized by the on-board navigation system to allow for the operation of the same. In other examples, the vehicle identification can be transmitted over a network to a remote navigation service (RNS) that resides within one or more nodes 502 residing within an ADV network 610 that enables the RNS to check the status of each the ADV including the SOC (and, optionally SOH) of each battery stack included therein, and transmit navigation information to each ADV (e.g., starting point, destinations, mapping information, routing information, routes, geographical locations of artifacts, etc.). The vehicle identification can include occupant sensory and/or identification data, data concerning a route and/or other navigation data, and/or sensory, navigation, control and/or any other data discussed herein concerning the vehicle, the route, and/or the occupants therein. Examples of the embodiments described below are applicable to a single ADV and a fleet of autonomous-driving vehicles and can generate routing information and navigate one or more ADVs across short and long distances, including between and within facilities, geographical areas, neighborhoods, towns, cities, states, countries, etc. As shown in FIG. 1, an ADV 602 is being controlled by an on-board navigation system, embodiments of which are disclosed herein, to determine a route $R_N$ between starting point A and ending Point B and autonomously drive (i.e., navigate) the ADV from starting point A to ending point B along a navigation route R. In this example, ADV 602 is a passenger EV or HEV vehicle that is configured to autonomously move one or more persons along Navigation Route R using an on-board navigation system. In other embodiments described herein, ADV 602 may be any EV or HEV vehicle that uses navigational pathways to autonomously navigate a geographical area.

An ADV 602 shown in FIG. 1 includes ADV sensors that can be used to collect data to navigate the ADV through its surroundings, sensors used for collecting data about one or more vehicle occupants, a battery management system, and an on-board navigation computer that uses at least a portion of the data that is communicated via the aforementioned sensors in connection with other data to navigate (i.e., the ADV autonomously drives the ADV occupants) the ADV along a route $R_N$ to a predetermined destination utilizing the dynamic routing algorithm described with respect to FIGS. 7, 8 and 10A-10C. For example, during and/or after the ADV has determined a route R (i.e., routes including current route $R_N$ and any alternative route(s) $R_A$), the ADV on-board computer is continuously processing data received by one or more sensors to monitor the SOC and/or SOH of a battery stack and navigate the ADV along a route $R_N$. If the on-board computer determines that the ADV cannot reach the predetermined destination $D_N$ utilizing the battery stack at its current SOC and/or SOH, the on-board computer is programmed to automatically determine a new route $R_{N+1}$, using a dynamic re-routing algorithm that utilizes artificial intelligence to navigate the ADV to a new destination $D_{N+1}$, as depicted in FIG. 1, to reach the destination $D_N$ without having to charge the battery stack using an external charging device (not shown). If the on-board computer determines that the ADV cannot reach the predetermined destination $D_N$ by navigating the ADV over the current route $R_N$ or an alternative route $R_A$ utilizing the battery stack at its current SOC and/or SOH, then the on-board computer 204 will give the user/ADV occupant(s) a choice to enter a new destination $D_{N+1}$ and re-route the ADV utilizing the dynamic re-routing algorithm described with respect to FIGS. 9 and 10A-10C.

In one or more embodiments, a sensor is a sensor device that can be a system, an apparatus, a camera, any device that detects light to generate an image, an electro-magnetic device that utilized any form of electricity and magnetism to image, measure and/or detect a phenomenon, software, hardware, a set of executable instructions, an interface, a software application, a transducer and/or various combinations of the aforementioned that include one or more sensors utilized to indicate, respond to, detect and/or measure a physical property and generate data concerning the physical property. For example, battery management system 222 is a sensor device configured as a system to monitor and manage a battery stack 402 and/or one or more batteries include therein, as described herein with reference to FIGS. 2 through 4. In another example, a sensor may be a transducer or any other device that measures weight (e.g., imperial system, metric system, international standards, pound, NIST, etc.), mass or a force. For example, occupant sensor devices 208 transducers that generate data that is processed by CPU 302 utilizing occupant identification system 320 to measure the weight of contents being transported by an ADV.

Figure 2:
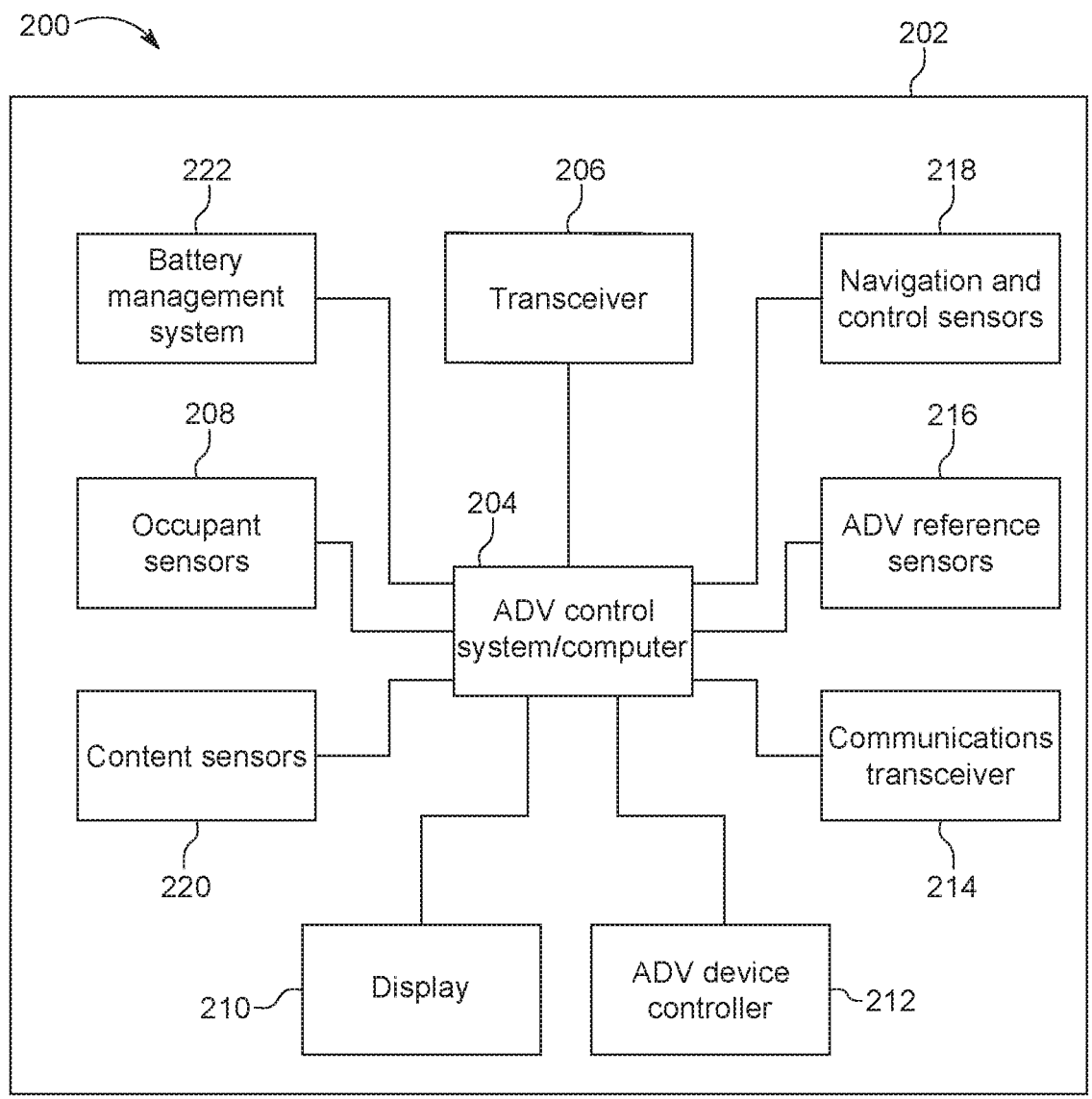
FIG. 2 is an example of a functional block diagram depicting a system including an ADV on-board navigation system that is utilized to control an ADV, according to some embodiments.

FIGS. 2,3A, 3B and 4 are functional block diagrams of an embodiment of an on-board ADV navigation system 200 that can be used to route and navigate an ADV 602 generally shown in FIG. 1. As shown in FIG. 2, each embodiment of an ADV described herein has an on-board computer and control system (on-board computer) 204 that operates to autonomously position and control an ADV to navigate the same from a geographical starting point A to a geographical ending point B without requiring an ADV occupant to accelerate, idle, engine-throttle, steer, brake, or warn (e.g., using a vehicle horn, wiper blades, hazard lights, or using a turn signal) another vehicle or pedestrian of an action that may somehow affect the other vehicle or pedestrian. The sensor data generated by the sensors described with reference to FIG. 2 will be processed by the on-board computer 204 described with reference to FIGS. 2,3A, 3B and 4 to autonomously navigate and control the ADV while monitoring and managing a battery stack 402, as described with reference to FIG. 4. The on-board computer 204 operates to among other things, for example, generate, determine and/or monitor 1) routing information that includes, when necessary, re-routing information, 2) navigational information to navigate an ADV from a geographical starting point to a geographical ending destination, and 3) sensor information that digitally describes an ADV's external surroundings, vehicular activities, and the current state of charge (SOC) and state of health (SOH) of a battery stack utilizing battery management system 222 and power management and battery system monitoring system 312. For example, an ADV's driving devices such as, for example, a steering wheel, a brake pedal, a gas pedal, a turn signal, a mirror(s), and a caution horn will be controlled by an ADV device controller 212 pursuant to control signals transmitted by the on-board computer 204 described with reference to FIG. 3A. The on-board computer 204 communicates with the ADV reference sensors 216, the navigation and control sensors 218 and battery management system 222 to receive the associated sensor data and processes the same to autonomously drive the ADV utilizing ADV device controller 212.

Figure 3A:
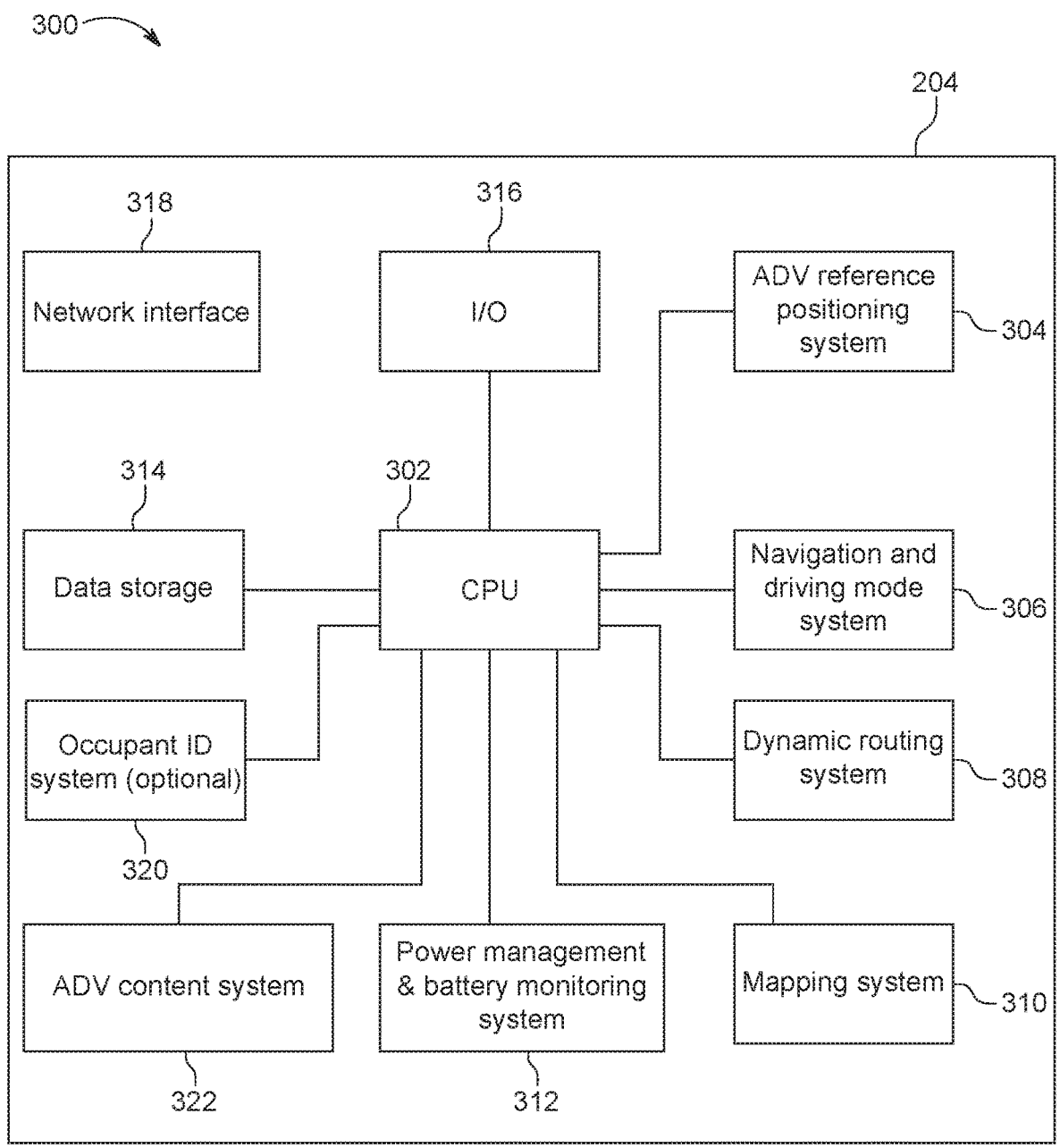
FIG. 3A is a diagram depicting an example of an architecture for an ADV control system and on-board computer, according to some embodiments.

To assist the on-board computer 204 in navigating the ADV, the ADV reference sensors 216 generate sensor data (e.g., that generate sensor data concerning the direction the ADV is facing and the orientation of the ADV) that is processed by the on-board computer 204 via the ADV reference positioning system 304 to determine the geographical position and location of an ADV on the Earth's surface, a position which is correlated with a navigational map of a relevant geographical area via the mapping system 310 to enable the on-board computer 204, utilizing the dynamic system 308, to ultimately determine a route $R_N$ and additional routes $R_{N+M}$. For example, in one embodiment, a reference positioning system 304, described with reference to FIG. 3A, is included within the on-board computer 204 and utilized to receive the sensor information generated by the ADV reference sensors 216 to generate positioning information that represents the location of the ADV on the Earth and, ultimately, on a map. The location information can include, for example, the direction the ADV 602 is facing and/or headed (e.g., the directions being the cardinal directions and ordinal directions), the ADV's orientation (e.g., angle of inclination and rotational position). In another embodiment, ADV reference system 304 can be a stand-alone device that generates positioning and reference data that may be input into on-board computer 204 utilizing one or more I/O ports 316 to program the CPU to perform the described functionality.

In one or more embodiments, maps generated by on-board computer 204 utilizing mapping system 310 include mapping information such as navigable pathways that an ADV can navigate, the geographical location of geographical artifacts that are found along the navigable pathways and/or the relevant geographical region, artifacts including, for example, one or more of city streets, tolls, lights, bridges, highways, street cameras, structures, businesses, identified accidents or traffic jams, locations, etc. that may exists and are identifiable geographically within the relevant geographical area. Additionally, the mapping information includes information concerning the one or more navigable pathways included in a geographical area and each generated route included in the relevant geographical area including the geographical length (meters, kilometers, miles, etc.) and angles of inclination of one or more navigable pathways or portions of the one or more navigable pathways, and the angles of curvature of each curve included within the one or more navigable pathways or portions of the one or more navigable pathways. In one or more embodiments, the CPU 302 of each ADV is programmed to utilize one or more ADV sensors to generate and retrievably store the aforementioned information concerning the navigable pathways such that the information can be retrieved to assist in the generation of one or more routes, as described herein. In another embodiment, one or more control and system nodes 502 can collect mapping information including information concerning the navigable pathways (e.g., angles of inclination, angles of curvature or a combination of both) from one or more ADV on-board computers. In one or more embodiments, on-board computer 204 and/or one or more nodes 502 can utilize GPS devices (described herein) to collect the aforementioned mapping information. Additionally, on-board computer 204 and/or one or more nodes 502 can retrieve the aforementioned mapping information by accessing the Internet using public network 608. The aforementioned mapping information is associated with the navigable pathways included in a geographic area for which mapping information is generated and retrievably stored as historical information and organized such that it is retrievable with the mapping information. The mapping information can be used by CPU 302 in generating one or more routes and route times, as described herein.

In one or more embodiments, the CPU 302 is programmed to generate additional routing information in addition to the generated route(s) utilizing the dynamic routing system 308. For example, in these one or more embodiments the dynamic routing system 308 programs a CPU 302 to utilize various ADV sensors to measure one or more environmental conditions such as time of day, the severity rain, the depth of snow, temperature, wind speed, traffic congestion, braking distances, average speed limit and other speed information including average rate of speed, lighting conditions, and any other environmental information that concerns one or more navigable pathways included in a geographical area. The environmental information collected by one or more ADVs is transmitted to one or more control and system nodes such that it is retrievably stored and transmitted to relevant ADVs to assist in route generation and other activities. In one or more embodiments, mobile devices 606 described with reference to FIG. 6 can transmit environmental conditions concerning navigable pathways residing in a geographic area including traffic patterns, the conditions of the navigable pathways and surrounding environment (e.g., rain, snow, light conditions (clear, foggy, hazy, etc.), temperature, wind speed, etc.) and other information (e.g., rate of speed, braking distances, time of day, etc.). In one or more embodiments, CPU 302 utilizes mapping system 310 to receive traffic information, environmental conditions and other information impacting the one or more navigable pathways included in a generated route. In other embodiments, on-board computer 204 and/or one or more control and system nodes 502 can access the Internet via public network 608, described with reference to FIG. 6, to receive environmental conditions impacting and concerning one or more navigable pathways in a geographic region and/or included in a generated route. The information can be stored in the respective data storage systems and organized such that the information can be retrieved when applicable to assist the on-board computer 204 in route generation and the determination of route times, as described herein.

In either of these embodiments, the aforementioned information is associated with the one or more navigable pathways included in a generated route such that the information can be utilized to generate estimated navigation times (e.g., TRN, TRA, TRQ, etc. as described herein with respect to FIGS. 7-10C) and battery management and monitoring information as described herein. For example, the on-board computer can query the database or utilize the in-memory processing system described herein to obtain the geographical location(s) of a certain type of geographical artifacts (e.g., businesses, residences, gas stations, schools, banks, arenas, ballparks, healthcare facilities, etc.) and receive a list of addresses or a display of the aforementioned relevant artifacts that appear on a map generated on a display 210 and referenced as a symbol or any other display device that can be used to visually represent one or more of the relevant geographical artifacts on the display 210. These geographical artifacts can reside in and span across different countries, states, cities, counties, and/or towns and geographical areas that are associated with the respective mapping information may span across international borders.

In one embodiment, the positioning system can use a global-positioning system (GPS), the Quazi-Zenith Satellite System (QZSS), Beidou, Galileo, Globalnaya Navigazionnaya Sputnikovaya Sistema or Global Navigation Satellite System (GLONASS), or any other system that is accurate enough to determine the position of an ADV within the time and distance constraints such that the position can correlate with mapping information generated utilizing mapping system 310, be continuously updated, and fall within certain positioning distances such that navigation of the ADV 602 can be safely achieved while maintaining the accuracy of the routing information generated by utilizing dynamic routing system 308. Depending upon the size of the area to be navigated, Indoor Positioning System (IPS) can also be used as the other positioning systems described herein.

The ADV referencing sensors 216 can include sensors that measure the physical movement and orientation of the ADV, including but not limited to one or more accelerometers, geomagnetic field sensors, speedometers, etc. The current position of the ADV is continuously updated and used by the navigation and driving mode system, routing system and mapping system that are part of the on-board computer 204, described with reference to FIG. 3A, to generate routing information and autonomously navigate the car along the generated route.

Navigation and control sensors 218 described with reference to FIG. 2 generate sensor data that is communicated to the navigation and driving mode system 306 that is utilized by the on-board computer 204 described with reference to FIG. 3A. The navigation and control sensors 218 can include, for example, one or more infra-red sensors, gyroscopes, lasers and/or other light sensors, accelerometers, air flow meters, barometric sensors, vibrational sensors, electromechanical sensors, sensors that measure force, sensors that measure weight, and other sensors that may be utilized to measure physical movement, physical impact, distance, speed, direction, orientation (angle, rotation) and time. In another embodiment, one or more sensors that generate data concerning the positions of the steering wheel, one or more tires and/or steering column, and/or one or more sensors that read or utilize the data generated by the on-board speedometer an also be used by the navigation and driving system to navigate the ADV along a predetermined route. Navigation and control sensors 218 can also include sensors that detect roadway conditions (e.g., mud, water, snow, ice, potholes, gratings, uneven pavement, gravel, grass, lack of pavement, etc.) and the data generated by these sensors 218 can be used by on-board computer 204 via navigation and driving mode system 306 to control and navigate the ADV in a manner that is determined to be safe depending upon the sensed condition. Navigation and control sensors 218 that can be utilized to detect roadway conditions are vibration sensors, cameras, heat sensors, temperature sensors, lasers and/or other light sensors, moisture sensors, or any other sensor or sensors that can generate data that is indicative of a navigational pathway.

The navigation and driving mode system 306 can also use navigation and control sensors 218 to avoid obstacles along the route such as other vehicles, road obstructions (safety cones, construction, debris, etc.), pedestrians, hanging obstructions (e.g., bridges, tree limbs, light fixtures, etc.) and the like to safely navigate the ADV along a route. In this embodiment, navigation and control sensors can be one or more electromagnetic energy sensors such as radar and/or lidar, or one or more acoustic sensors such as, for example, sonar sensors, cameras that are used to detect traffic lights, stop signs, and any other structure or device intended to visually communicate information, or any combination of navigation and control sensors 218 described herein intended to effectively navigate the ADV along a route. The sensor data generated by one or more the aforementioned radar, lidar and/or sonar sensors described herein is used by the navigation and driving system to determine the distance of the relevant object from the ADV and navigate the ADV around the same if an action is required. The on-board computer 204 uses the continuously updated location information of the ADV and the sensor data generated from the navigation and control sensors 218 to navigate and control the ADV safely and effectively along a predetermined route in a manner such that the speed of the ADV is continuously monitored and controlled, the direction and orientation of the ADV is continuously monitored and controlled, traffic signs and warning signs are sensed and obeyed, and obstacles that are present along the route are safely negotiated by taking on more actions that safely avoid the obstacle (e.g., stopping the vehicle, going around the obstacle, increasing or decreasing the speed of the ADV, making the ADV perform a U-turn, or some other course of action to safely avoid the obstacle) while continuing to navigate the ADV to a geographical predetermined destination identified on a route generated by the on-board computer 204.

To assist the on-board computer 204 in determining the total amount of electrical power required to navigate a generated route and to reach a predetermined destination, the ADV navigation system 200 includes content sensors 220 that will measure the weight of one or more contents within the ADV. Content sensors 220 can include, in one or more embodiments, a transducer device that converts the force of weight into electrical signals that can be processed by CPU 302 utilizing content ID and monitoring system 322 to determine the weight of each item occupying a relevant ADV. In this example, each of the suitcases, bags, backpacks, and/or other containers utilized to carry one or more items are weighed using one or more transducer devices 220. In one or more embodiments, the CPU 302 utilizing the content ID and monitoring system 322 can associate each item with a unique ID, an image (i.e., utilizing a camera sensor device 220 to image the one or more contents), and a weight total such that all of the following can be continuously updated. Similarly, in these one or more embodiments, once an item is selected to be placed in one or more containers or, as the case may be, placed in the ADV without utilizing a container, each item is weighed and/or imaged, given a unique identification and monitored. Similarly, one or more embodiments of the ADV 602 include occupant sensors devices 208 that include transducers that are configured to generate data that is received by CPU 302 utilizing occupant ID system 320 to measure and determine the total weight of the one or more ADV occupants.

In another embodiment, the occupant sensors 208 can be contactless sensors that generate image data such as, for examples, one or more camera sensor devices that can generate image data that can be utilized by CPU 302 utilizing occupant ID system 320 to estimate the weight of one or more ADV occupants based upon the image data. In another embodiment, one or more ADV occupants can utilize a GUI (not shown) in association with a touch screen to enter their weight using display screen 210. For example, the on-board computer 204 can be configured to receive the occupant sensor data from one or more occupant sensors 208 and utilize the occupant ADV identification image data via occupant ID system 320 to process the generated sensor data and generate images indicative of photographs and high-definition images concerning the relevant ADV occupants (image identification information), and transmit the generated or received image identification information to one or more control and system nodes 502 (described with reference to FIG. 5) for further processing to determine the weight of the same.

In one or more embodiments, as described with reference to FIG. 3B, data storage device 314 is configured by on-board computer 204 to retrievably store all of the sensor data generated by one or more ADV sensors including, for example, occupant sensors 208, navigation and control sensors 218, ADV reference sensors 216, battery management system 222 and any other data generated by one or more sensors, modules, devices, systems, etc. that are utilized by on-board computer 204 to effectively and safely navigate ADV 602 as described herein. Although not illustrated, in one or more embodiments, data storage device 314 is also configured to store the operating system for on-board computer 204, and one or more systems utilized by on-board computer 204 to perform the respective functionalities described herein, systems including the ADV reference system 304, navigation and driving mode system 306, dynamic routing system 308, mapping system 310, power management and battery monitoring system 312, and/or occupant identification system 320. Data storage device 314 is also configured to retrievably store mapping information associated with relevant geographical areas with which and within which the routing information (e.g., ADV geographical staring location(s) and geographical destination(s)) described herein is associated and geographically resides. In one or more embodiments, data storage device 314 may include one or more databases and/or have access to one or more databases (e.g., Microsoft SQL Server, MySQL, Oracle, relational database(s), multidimensional database(s), DB$_2$, OLAP cube database(s), multidimensional online analytical processing (MOLAP), etc.).

As described herein, one or more embodiments of the on-board computer 204 includes an in-memory processing system configured to perform in-memory processing utilizing one or more processors and one or more RAM devices (not shown) to store all of the relevant data required to navigate the ADV and perform all of the functionality associated with on-board computer 204 described herein. In another embodiment, the entire contents of the data storage device 314 are retrievably stored in one or more RAM devices for efficient accessibility by the CPU 302. In one or more embodiments, CPU 302 can be one or more processors. In this example, one or more copies of all of the data stored in one more RAM devices are also stored in data storage device 314. The storage device 314 can be, for example, a non-volatile memory, read only memory (ROM), a flash memory, NAND flash memory and the like, or a magnetic disk device, such as a hard disk drive (HDD), and the like. For example, the in-memory processing system can store all of the mapping information and routing information for one or more relevant geographical areas such that the CPU 302 can generate routes without having to access the data storage device 314. For example, the in-memory processing system can store all of the battery monitoring and management data generated by battery management system 222 such that the CPU can process and analyze the relevant battery data including the SOC and SOH of the battery stack 402 and/or one or more batteries 404 included therein, determined by the battery management system 222, and determine if a generated route can be navigated by an ADV without having to charge the battery stack 402 using an external power supply, all without having to retrieve data from storage system 314. In one or more embodiments, the data generated by navigation and control sensors 218 and ADV reference sensors 216 are also stored and processed by the in-memory processing system such that the relevant data does not have to be retrieved from data storage system 314.

Figure 4:
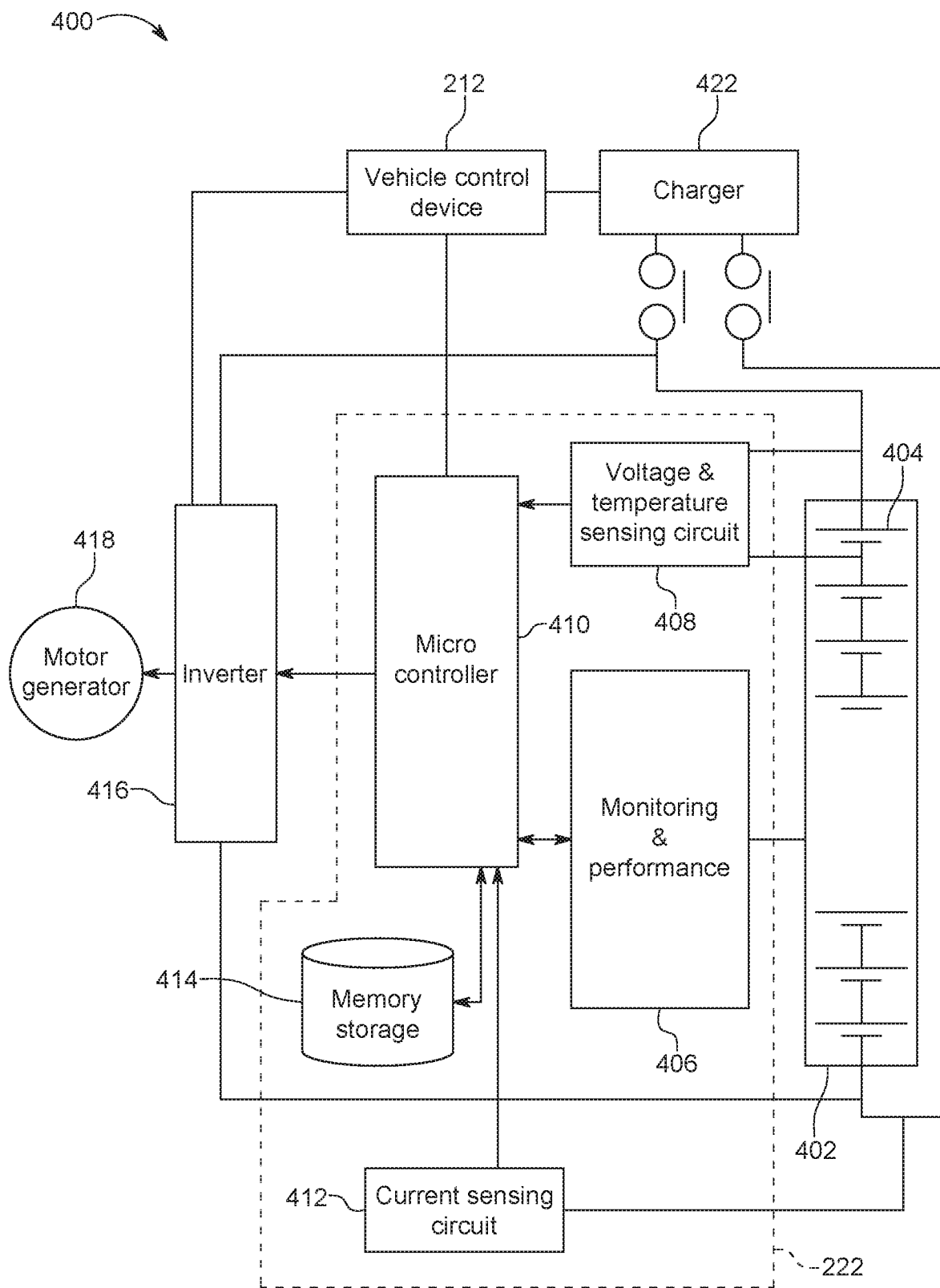
FIG. 4 is an example of a functional block diagram depicting a battery system that includes a battery management system that is utilized to manage and monitor the state of a battery stack and/or one or more batteries included in the battery stack, according to some embodiments.

FIG. 4 illustrates a battery system 400 that includes a battery management system 222. One example of a battery management system 222 that can be utilized by one or more embodiments of an ADV described herein will now be described with reference to FIG. 4. In one or more embodiments, the battery management system 222 includes a monitoring and performance circuit 406, a voltage and temperature sensing circuit 408, a microcontroller 410, a current sensing circuit 412, and a memory storage device 414. In one or more embodiments, the ADV is a hybrid electrical vehicle (HEV) that utilizes a battery management system 222 as described with reference to FIG. 4. In one or more embodiments, the battery device utilized by utilized by an ADV that is an electric vehicle (EV) or a hybrid electric vehicle (HEV) in one or more embodiments herein can be, for example, is a lithium-ion (Li-ion) battery stack 402 that includes a plurality of Li-ion batteries 404. As is appreciated by those having skill in the art and described herein, the battery stack may include other types of batteries and are managed and monitored in a similar way. In one or more embodiments described herein, the state of charge (SOC) of the batteries 404, which represents the available capacity of the battery 404, is measured by microcontroller 410 and the measurement can be expressed as a percentage of the batteries rated (e.g., by the battery manufacturer or independently verified) capacity, a level of health (e.g., 1-5, 1-10, etc.) and/or by an indication (e.g., low, medium, high, lights, a series of lights, etc.). The SOC also gives a user an indication of how much longer the battery stack 402 or more batteries 404 included therein will continue to perform before an external recharging process is required. In one or more embodiments described herein, the state of health (SOH) of the batteries 404, which represents a measure of the battery's 404 ability to both discharge power and store accumulated electricity as compared to the battery's ability to do the same when the battery was rated as new or ready for use, is measured by microcontroller 410 and can be expressed in various ways such as, for example, a percentage, a level of health (e.g., 1-5, 1-10, etc.) or by an indication (e.g., low, medium, high, lights, a series of lights, etc.). The SOH is an indication of the level of degradation of the battery due to use and the imposition of age upon the battery stack 402 and the batteries 404.

SOC can be determined using the open circuit voltage (OCV) Vocv measurement. In one or more embodiments, SOC measurements are performed in real time utilizing measurements of the voltage, current and temperature in real-time of the battery stack 402 and/or one or more batteries 404 included therein. The microcontroller 410 determines the SOC of the battery stack 402 and/or one or more batteries 404 by converting the measurement of the voltage utilizing the data generated by voltage and temperature sensing circuit 408 to an SOC measurement utilizing a known voltage/SOC curve of discharge (not shown) associated with the battery stack 402 and/or one or more batteries 404 included therein. In one or more embodiments, the current and the temperature readings of the battery stack 402 and/or the batteries 404 are also utilized by the microcontroller 410 to determine more accurate voltage readings of the battery stack 402 and/or the batteries 404.

Figure 6:
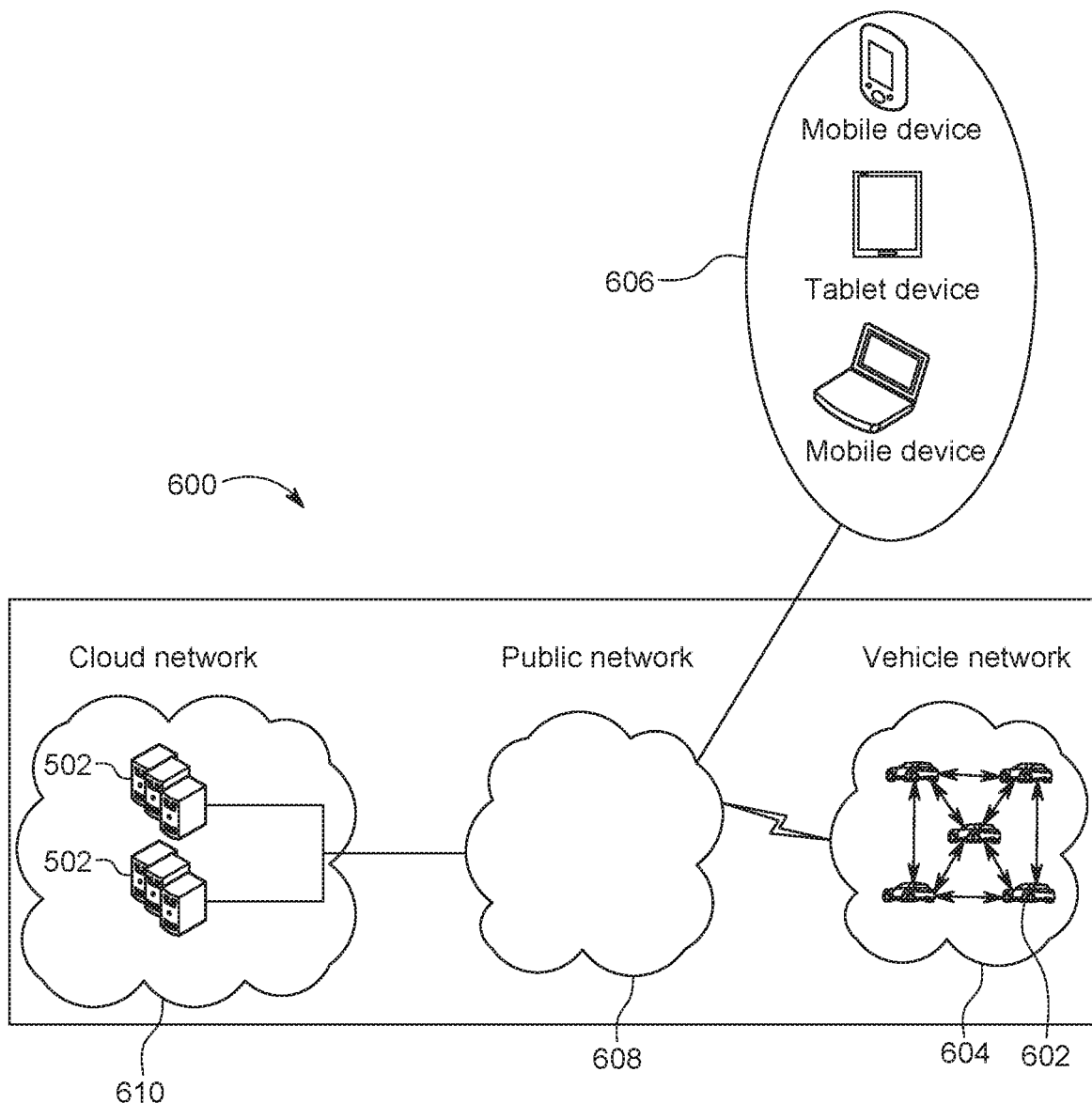
FIG. 6 is a diagram depicting an example of an ADV control system network platform, according to some embodiments.

The SOH does not correspond to a particular physical quality of the battery stack 402 as is the case for the SOC. One having ordinary skill will appreciate that various definitions of SOH can be utilized in one or more embodiments including calendar life, capacity fading, etc. For example, SOC can be defined as the percentage of the releasable capacity $C_{releasable}$ to the rated capacity $C_{rated}$ (SOC=$C_{releasable}/C_{rated} \times 100\%$). SOH can be defined as the ratio of the maximal releasable capacity, $C_{discharge}$, to the battery rated capacity Crated (SOH=$C_{discharge}/C_{rated} \times 100\%$). The capacity $C_{discharge}$ will be substantially the same as the capacity $C_{rated}$ when the battery is new. As one having skill in the art appreciates, capacity $C_{discharge}$ will decline as the battery ages due to age and time such that the state of health SOH of the battery pack 402 and each of the one or more batteries included therein will decline over time and the deterioration of the same will be hastened due to use and the characteristics of usage. One or more embodiments discussed herein may utilize various methods to determine the state of health of a battery stack 402 or one or more batteries included therein 404. For example, microcontroller 410 can utilize historical data in combination with a statistical approach to determine the SOH based upon battery usage similar or substantially the same in one or more ADVs 602 as shown in FIG. 6 or other vehicles utilizing the same type of battery in the vehicle. Additionally, microcontroller 410 can utilize analytical models with empirical calibration such as, for example, the utilization of estimations of battery parameters that indicate aging via direct measurements of battery characteristics. In one or more other embodiments, microcontroller 410 can utilize semi-empirical models based on battery parameters that indicate the age of the battery that are modeled by equations based upon battery characteristics.

In one or more other embodiments, the ADV is configured as an electrical vehicle (EV) or a hybrid electric vehicle (HEV) that utilizes a battery management system 222 as described with reference to FIG. 4. A battery management system 222 monitors and manages a battery stack 402 that includes a plurality of batteries 404 that are connected in a series configuration. Although the example as shown in FIG. 4 illustrates a plurality of series battery blocks connected in series, the battery stack 402 can include other configurations not shown (e.g., a plurality of parallel battery blocks connected in series, or a plurality of series battery blocks or parallel battery blocks connected in a ring configuration). The number of battery blocks utilized in each configuration will depend upon the required electrical states of the battery management system 222 and the electrical requirements of the ADV. The plurality of battery blocks 404 include battery cells that are configured to both accumulate and store electrical energy such that direct current energy can be utilized to charge the battery stack 402. The battery cells included in the battery blocks 404 are also configured to release direct current energy to discharge the battery stack 402. When the ADV is navigating a route, the battery stack 402 is connected to an inverter 416 and drives a motor generator 418 using the energy accumulated by battery stack 402. One way to charge the battery stack 402 is to connect the battery stack 402 is to connect the battery stack to an external power supply using the electric power charger 422. Examples of an external power supply include but are not limited to a charger provided by a utility, a power station, a household charger or other charging station(s) configured to provide electrical power to a battery device utilized in an HEV or EV.

In one or more embodiments, an ADV is configured as a hybrid electric vehicle (HEV) or an electric vehicle (EV) that includes one or more batteries 404 included in battery stack 402 that operate as a main battery, and one or more batteries 404 included in battery stack 402, that are different than the main batteries 404, that operate as a secondary or auxiliary battery. In this configuration, the main battery is utilized to operate one or more electric motors utilized to drive the ADV and the auxiliary battery is utilized to power the other devices that require electrical power (e.g., ADV sensors, air condition (HVAC), ventilation systems, heating systems, lights, speakers, audio/visual, etc.). Alternatively, in one or more embodiments, the battery stack 402 can be configured such that each of the plurality of batteries can be utilized to as a main battery or an auxiliary battery when needed such that a permanent designation as main battery and alternative battery is not required. In this example, microcontroller 410, utilizing monitoring and performance device 406, would determine which battery 404 would be connected to which device to supply electric power thereto. In one or more embodiments, devices that require electrical power supplied by one or more auxiliary batteries can be utilized when the ADV electric motor is not running (e.g., turned off, parked, in an energy-saving mode of operation), devices such as lights, audio/visual devices, ADV sensors as described herein, air conditioning, heating, air ventilation, HVAC systems, warning/flashing lights, door locks, etc.).

In one example, the battery management system 222 is an ADV sensor device utilized as a power storage state estimation system that measures one or more states of the battery device 402. In one or more embodiments, the battery management system 222 includes a voltage sensing circuit that is part of the voltage and temperature sensing circuit 408. The voltage sensing circuit is configured to measure the voltage across each battery 404 by measuring the terminal current of the each battery to assist in determining the state of the battery stack 402. In another example, the voltage sensing circuit is configured to sense the total voltage of the battery stack 402. Examples of voltage sensing circuits that may be utilized in the voltage and temperature sensing circuit 408 can include a current sensor or an analog circuit such as an analog front end circuit. The temperature sensing circuit included in the voltage and temperature sensing circuit 408 is configured to measure the temperature of the battery stack 402 by either measuring the temperature of each individual battery 404, one or more batteries 404 included in the battery stack 402, or the entire battery stack 402. For example, the temperature sensing circuit can measure either a plurality of temperatures across one or more batteries 404 and take the average as the temperature across the entire battery stack 402 or take the temperature at one point along the battery pack configuration and take that temperature as a representative temperature of the battery stack 402. In one example, the temperature sensing circuit is a thermistor. In another example, the temperature sensing circuit can be an analog circuit, such as an analog front end circuit. For example, a temperature sensor can be one or more transducers that are positioned on the battery pack and generate voltage signals and a voltage sensing circuit can assist in determining the temperature of the battery stack 402 or one or more batteries 404. In one or more embodiments, the battery management system 222 includes a plurality of voltage and temperature sensing circuits 408, depending upon the number of batteries 404 included in the battery stack 402. In another embodiment, the battery management system 222 includes a single voltage and temperatures sensing circuit.

The voltage and temperature sensing circuit 408 outputs the measurement results of the voltage sensing circuit and temperature sensing circuit to the micro-controller circuit 410 to sense various states of the battery management system 222 and assist in various measurements and analysis. In one or more embodiments, the micro-controller circuit 410, utilizing monitoring and performance device 406, can perform charging and discharging cycling during periods of abnormal heat generation based on a temperature of the battery stack 402 that is detected by the voltage and temperature sensing circuit 408.

In one or more embodiments, the battery management system 222 includes a current sensing circuit 412 that measures the current of the battery stack 402. The current sensing device 412 senses the current flowing to and/or from the battery stack 402 and outputs the current measurement to microcontroller 410. In one example, the current sensing circuit 412 is a current sensor that is connected to the battery stack 402 or one or more batteries 404. In another example, the current sensing circuit 412 can be an analog circuit, such as an analog front end circuit.

In one or more embodiments, the battery management system 222 also includes a battery impedance sensing circuit that measures in real time the impedance value of battery stack 402 and/or one or more batteries 404 included therein. In one or more embodiments, the impedance sensing circuit is at least part of the monitoring and performance device 406. For example, the internal impedance of battery stack 402 and/or one or more batteries 404 is determined at the time of installation and the battery impedance sensing circuit measures the changes as the batteries 404 age over time to assist in determining the internal impedance of the same. Measuring the internal resistance of the battery stack 402 can be factored into the determination of measuring the remaining life of battery stack 402 and/or each of the one or more batteries 404 included therein. For example, the battery impedance sensing circuit can be configured to utilize an ohmic measurement test method to determine the internal resistance. In this example, the battery stack 402 and/or one or more batteries 404 receives a brief discharge for a period of time (e.g., second or longer). The voltage and temperature sensing circuit 408 measures the open circuit voltage (OCV) with no load. The battery management system 222 thereafter follows the same procedure with a predetermined load. Thereafter, the microcontroller 410 will utilize Ohm's law to calculate the resistance value (voltage difference $\Delta V$ divided by current (i) equals resistance (R)). As is appreciated by those having skill in the art, the changes in impedance value of a battery over time are indicative of the life of the battery. For example, it is recognized that with no current flow, the voltage drop at the internal resistance is zero, thus, the voltage at the output terminals is governed by open circuit voltage (OCV). When the load is applied to the battery stack 402 and/or one or more batteries 404 (i.e., positive charge or negative charge during charging and discharging cycles), the load resistance is in series with internal resistance (R) of one or more of the batteries 404 or battery stack 402.

In one or more embodiments of the ADV, the battery system 400 provides a source of energy for the ADV such that it is important to acquire data concerning the charging and discharging cycles of the battery stack 402. The voltage and temperature sensing circuit 408, current sensing circuit 412 and monitoring and performance device 406 sends battery voltages and temperatures of the battery cells 404 to the microcontroller 410. The microcontroller 410 senses a state of the battery management system 222 based on the received information and transmits the battery state data to a vehicle control device 212 via the CPU 302. The memory storage device 414 stores information including data concerning factors that affect the deterioration of the batteries 404, internal battery resistance characteristics, capacity capabilities of the battery for various levels of battery charge for the battery stack 402 and/or one or more batteries 404, data concerning the polarization of the active materials in the batteries 404 that affect the discharge voltage (i.e., polarization voltage), data concerning the individual batteries 404 and the battery stack 402, and data concerning the state of charge (SOC), the open circuit voltage (OCV) and, in one or more embodiments, the state of health (SOH), and the impact of one on the other. The memory device can be, for example, a ROM, RAM, or any storage device accessible by microcontroller 410. The memory device 414 may be formed from SDRAM, DDR SDRAM, DDR2 SDRAM, DDR3 SDRAM, DDR4 SDRAM, non-volatile memory, EPROM, EEPROM, or any other suitable memory structure and/or device.

The microcontroller 410 utilizes the data generated by voltage and temperature sensing circuit 408, current sensing circuit 412 and monitoring and performance device 406 and determines the state of charge (SOC) of the battery stack 402 and/or one or more individual batteries 404 and the state of health (SOH) of the battery stack 402 and/or one or more individual batteries 404. For example, the microcontroller 410 can estimate the state of the battery pack 402, including the remaining battery capacity level, the state of health of the battery, the time, based upon historical usage and/or estimated future usage based upon the current route, until an external charge will be required, etc. The microcontroller 410 also monitors and controls the currents utilized to charge and discharge the battery stack 402 and/or one or more batteries 404, and the amounts of electrical power accumulated and discharged by the battery stack 402 and/or one or more batteries 404. The microcontroller 410, utilizing the monitoring and performance device 406, also monitors the abnormality states of the battery stack 402 and/or one or more batteries 404. The microcontroller utilizes the SOC and SOH information to control the power output of the battery stack 402 to the vehicle by communicating the information to the vehicle control device 212 which controls various aspects of the functionality of the ADV including the speed of the ADV. For example, the vehicle control device 212 controls the inverter 416 using the information transmitted by the microcontroller 410. The microcontroller 410 also controls and monitors the charger 422.

In a discharging mode, under the control of the on-board computer 204 utilizing ADV device controller 212, the battery management system 222 is connected to the inverter 416 and drives the motor generator 418 by discharging the electrical energy that has been accumulated by the battery pack 402 to navigate the ADV along a current route. In a first charging mode, under the control of the on-board computer 204, the battery pack 402 can be charged by the motor generator 418. In a second charging mode, under the control of the on-board computer 204, the battery pack 402 can be charged to a predetermined level utilizing charger 420.

Environmental conditions can also affect the discharge rate of the battery stack 402 while the ADV is navigating one or more navigable pathways included in a route. These battery discharging activities can be described as stress events that affect the battery life due to a heightened rate of discharge (e.g., during periods of loading) during the duration of the battery stress event. One having ordinary skill appreciates that under what can be termed normal driving conditions, travel distance, travel time, average speed, vehicle weight and maximum acceleration are all factors that influence battery charge/discharge rates, heat generation rates, and energy throughput rates. Initial acceleration, cruise speed, maximum speed, drive cycles, the grade of the navigable pathways and drive range are typical specifications when considering performance. One having skill in the art also appreciates that the rate of discharge of a battery stack in an ADV traveling a predetermined distance at a predetermined rate of speed can also be calculated using estimation formulas such that a range of distances that an ADV can travel on a state of charge can be achieved by varying the speed of travel of the ADV.

The ADV is driven by the on-board computer 204 operating the battery management system 222 to discharge power stored in the battery stack 402 utilizing microcontroller 410. The ADV vehicle is powered through a connection between the battery stack 402 and an electric motor (not shown) or hybrid motor (not shown) electrically connected to the motor generator 418. In operation, the wheels of the ADV are powered by the torque generated by the electric motor. The various sensors described herein that are utilized to navigate the ADV and communicate with the ADV occupants are also powered by the battery stack 402. For example, in one or more embodiments, an ADV is a hybrid vehicle wherein the torque of the engine is transferred to the motor generator 418 and the power required to move the wheels is generated by the torque. The battery stack 402 is configured to store power generated by the motor generator 418. Electric current drawn from the battery stack 402 is applied, under the management of microcontroller 410, to the motor. Inside the motor, this current is passed through a magnetic field, which results in a torque that is used to turn the vehicle's wheels. In one or more embodiments, this process is reversed during braking of the vehicle such that the microcontroller 410 can converts the motor generator 418 to a generator. Upon deceleration of the ADV, the torque generated by the resistance force applied to a braking system during deceleration creates power that is transferred to the battery stack 402 via the motor generator 418. For example, in these embodiments, the momentum stored in the moving vehicle is used to pass the conductors in the motor of the motor generator 418 through a magnetic field to create a current that is directed by the microcontroller 410 back to the battery system to charge the battery stack 402 with electrical energy. Using regenerative braking processes increase the driving range of the ADV EVs or HEVs. Microcontroller 410, utilizing voltage and temperature sensing circuit 408, current sensing circuit 412 and monitoring and performance device 406 continuously determines the current charge level of the battery stack 402, the SOV, OVC and SOH of the battery. In one or more embodiments, an ADV is configured as an electric vehicle that can utilize an electric motor to produce torque to move the wheels without the use of a driving motor. In this embodiment, the battery stack 402 is also utilized to power the ADV sensors described herein with reference to FIGS. 2 and 3.

In one or more embodiments, monitoring and performance device (M&P device) 406 is configured to transmit the SOH, SOC and OCV information to one or more visual displays 210. In this embodiment, warning messages that indicate inadequate states of the battery stack 402 and/or one or more batteries 404 included therein are also transmitted by M&P device 200. Additionally, when an ADV is undergoing charging operations such that the batteries 404 in the battery stack 402 are undergoing charging from an external power supply utilizing the charging device 422, the M&P device 406 can indicate the state of the charge of the battery stack 402 or one or more batteries 404 included therein and the time required to reach a state of full charge, and display the same. For example, based upon the expediency of charging, dictated by the charging device and the state of health (SOH) of the battery stack 402, and the current state of charge the battery stack 402, the M&P device can display the current level of charge and the estimated time to obtain a desired level of charge. As discussed herein, the M&P device 406 can also assist in determining whether the current level of charge of the battery stack 402 is enough to reach a predetermined destination from a current vehicle location or a scheduled vehicle location. M&P device 406 can also request the SOH and SOC information from the microcontroller 410 at predetermined intervals and display the same or utilize the information to display warning notification information to one or more ADV occupants concerning the current or future charging states of the battery pack 402 or one or more batteries 404, and/or the health of the battery stack 402 or one or more batteries 404. These charging states can include the remaining battery power, anticipated battery power, and/or a power capacity of the battery stack 402 or one or more batteries including information that indicates whether the battery stack 402 or one or more batteries 404 have the ability to reach a certain predetermined level of charge that is a percentage of the full state of charge if the battery stack 402 or the relevant battery(ies) 404 had a 100% rating. For example, if a battery loses capacity, its ability to recharge to a fully charged state of 100% is degraded. The M&P device 406 can indicate a reduced capacity for the battery stack 402 and/or one or more batteries 404 included therein. In other embodiments, if the battery stack 402 or one or more batteries has developed a high internal resistance, the battery will heat up and cause the voltage to drop when the battery is under a load. The M&P device 406 can indicate high internal resistances for the battery stack 402 and/or one or more batteries 404 included therein.

There are various battery stress events that affect energy charge of and energy discharge from the battery stack 402 that are expressed in terms of power in kilowatts (kW). These events include heating of the engine, parasitic losses affecting the battery stack 402, energy discharges due to inefficiencies in the operation of a battery system and/or inefficiencies in a transmission, energy discharges required for acceleration of the ADV, energy discharges required to negotiate navigable pathways that include one or more angles of inclination, energy discharges required to resist gravity and prevent the ADV from rolling backwards on a navigable pathway that includes an uphill angle of inclination, and energy discharges required to resist the force of atmospheric conditions due, at least in part, to aerodynamic inefficiencies (e.g., drag losses). In one or more embodiments, the grade of one or more navigable pathways may be taken into account as a stress event that may affect energy charge and discharge of a battery stack 402. Additionally, internal battery resistance characteristics can negatively impact the life of a battery and the rate of discharge of electrical power of a battery. On the positive side, energy charges through the regenerative braking process can be applied as a positive energy change upon battery stack 402 or one or more of the batteries 404. Utilizing routing information for each generated route such as, for example, traffic patterns, mapping information that includes the geographical length (meters, kilometers, miles, etc.) and angles of inclination of one or more navigable pathways, the angles of curvature of each curve included within one or more navigable pathways, environmental conditions (e.g., rain, snow, clear, temperature, wind speed, etc.) and other information (e.g., rate of speed, distance, time of travel, etc.) described herein, and information concerning the ADV itself (e.g., transmission health, battery stack health, etc.) enables the microcontroller 410 to estimate the energy gains and losses incurred by the battery stack 402 or one or more batteries 404 due to each of these and other battery stress events in advance. In this manner, the total amount of energy that will be discharged by the battery stack 402 or one or more batteries 404 due to the ADV navigating any route, generated by on-board computer 204 or one or more nodes 502, is estimated by the microcontroller 410 utilizing the ADV on-board computer 204 to analyze the navigable pathways included in the relevant route and calculate the energy charging and discharging events that will occur over the course of the relevant route. In this manner, the state of charge of the battery stack 402 or one or more batteries 404 included therein can be estimated in advance of a trip once the relevant route is generated to estimate the remaining battery life at any geographical point along the generated route.

Figure 5:
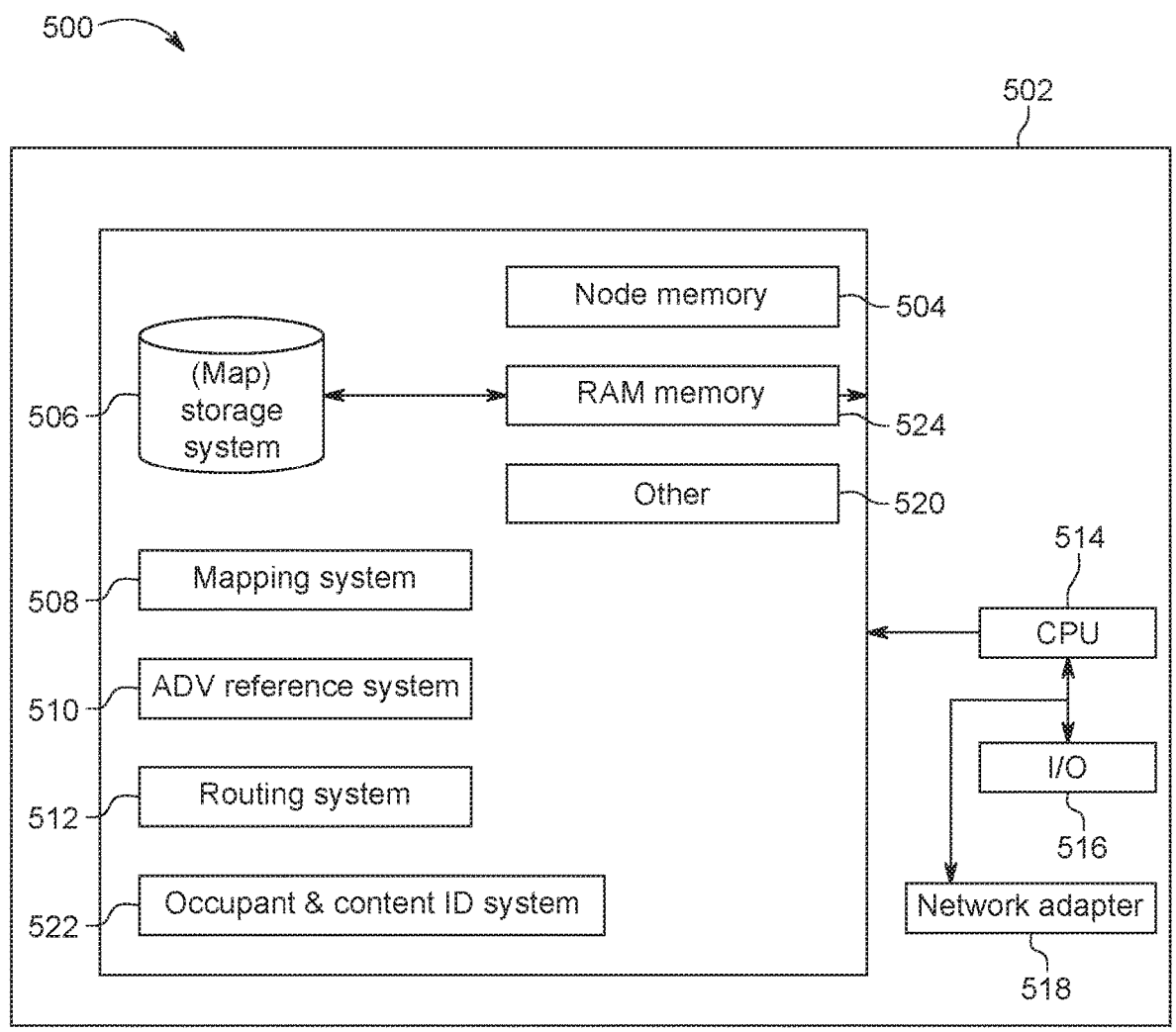
FIG. 5 is a diagram depicting an example of an architecture for an ADV control system computer node, according to some embodiments.

ADV control system nodes 502, as described with reference to FIGS. 5 and 6, are configured as an ADV control system network 610 which is part of an ADV control network platform 600. One more control system nodes 502 that reside in ADV control system network 610 can be utilized by an on-board computer 204 by one or more ADV vehicles to navigate the relevant ADV in various ways including, for example, generating mapping and routing information, assisting in monitoring one or more ADV occupants, and monitoring the battery stack and/or one or more batteries utilized by one or more ADVs as described herein reference to FIGS. 4, 5 and 6. As described with respect to FIG. 6, one or more ADV control system nodes 502 may be configured in a ADV network service platform 600 and configured as a cloud network and/or mapped to a cloud network 610. The cloud network can be protected such that only authorized users (e.g., computer devices and/or persons given authorization) can access the network. The network 610 can also be protected by a firewall that assists in preventing unauthorized access.

In one embodiment, mapping system 508, ADV reference system 510, routing system 512 and ADV occupant identification system 522 reside in node memory data storage 504 and can be configured, for example, as software, software applications, executable instructions to be executed by CPU 514, etc. In one or more embodiments, CPU 514 can be one or more processors. In one embodiment, storage system 506 included with ADV control system node 502 may also include one or more one or more databases and/or have access to one or more databases (e.g., SQL server, MySQL, Oracle, etc.) that store mapping information concerning geographical areas of various sizes (e.g., areas that span less than a mile to areas that span over a thousand miles), such as, for example, large geographical areas, such as the United States, states within the U.S., foreign countries and other large areas such as the European Continent (e.g., geographical area that includes navigable pathways that are accessible by car). The map system 508 can retrieve mapping information from storage device 506 to generate one or more maps that include the relevant geographical areas of one or more routes generated by routing system 512 that may be utilized by one or more ADVs 602 to reach one or more predetermined destinations. The mapping information also includes geographical information and associated address information for structures (e.g., residences, businesses, healthcare facilities, entertainment facilities, etc.) and points of interest (i.e., tollways, bridges, airports, box stores, amusement parks, etc.). The on-board computers 204 that reside in the ADVs are also configured to receive mapping information and routing information from one or more nodes 502 that reside in the ADV network 610 and utilize this information to navigate the relevant ADV. In some embodiments, the ADV control and system node 502 may reside on one or more (in the case of multiple nodes) application servers (not shown), and/or in a cloud network. Other configurations are within the scope of the present disclosure. With the aid of on-board computer 204, one or more nodes 502 may transmit one or a series (i.e., one or more) of navigable routes from the ADV's current position to one or a series of predetermined destinations that may be utilized by one or more on-board computers 204 residing in one or more ADVs 602 in each of their mapping, route generation and navigating activities described herein with reference to FIGS. 7-10C. Each of the routes generated and/or obtained along with any information associated with each of the routes and/or navigable pathways included in any one of the routes may be stored in map storage database 506 for retrieval by the mapping system 508, ADV reference system 510, routing system 512 and/or occupant ID system 522 for use in assisting one or more ADVs.

The on-board computers 204 that reside in the ADVs are also configured to receive mapping information and routing information, including routing instructions, from one or more nodes 502 that reside in the ADV network 610 and utilize this information to automatically navigate the relevant ADV. In some embodiments, the ADV control and system node 502 may reside on one or more (in the case of multiple nodes) application servers (not shown), and/or in a cloud network. Other configurations are within the scope of the present disclosure. With the aid of on-board computer 204, one or more nodes 502 may transmit one or a series (i.e., one or more) of navigable routes that includes the ADV's current position, a predetermined starting geographical position or a scheduled starting position and one or a series of predetermined destinations (e.g., destinations that can be determined due to input by an ADV occupant utilizing a GUI (not shown), scheduled utilizing a mobile device, laptop or desktop computer, and/or received by one or more nodes 502). The one or more nodes 502 can also transmit routing and mapping information concerning the one or more navigable pathways or relevant portions of one or more pathways included in a route that is transmitted to an ADV. This information can include inclination information, traffic information, estimated idling/stop time, speed information, environmental conditions, temperature information, power required by one or more ADV sensors, power required by one or more ADV components/devices, and any other information that would impact electrical energy discharge or accumulation. This information can be analyzed by an on-board computer 204 to determine its impact upon the state of charge (SOC) of the relevant battery stack. The routing and mapping information can be utilized by one or more on-board computers 204 residing in one or more ADVs 602 in each of their mapping, route generation and navigation activities described herein with reference to FIGS. 7-10C. Each of the routes generated and/or obtained along with any information associated with each of the routes and/or navigable pathways included in any one of the routes may be stored in map storage database 506 for retrieval by the mapping system 508, ADV reference system 510, routing system 512 and/or occupant and content identification system 522 for use in assisting one or more ADVs.

In one embodiment, one or more nodes 502 that reside in ADV control network 610 may use social networking to build and update mapping information and routing information utilized to generate navigational routes as described herein. For example, users may communicate with one or more nodes 502 and other components of the ADV control network platform 600 (e.g., ADVs 602) using mobile devices 606 over a network 608. Examples of mobile devises 606 include, but are not limited to, mobile phones (e.g., a smartphone, feature phone, etc.), personal digital assistants, and tablet computers and other types of mobile devices 606 are within the scope of the present disclosure. Mobile devices 606 can communicate with the ADV control network platform 600 via a communication network 608.

Examples of mobile devices 606 that may be used to communicate data and information concerning the navigation of one or more ADVs over a network 608 include a laptop computer, a tablet computer (e.g., an iPad), a mobile or smart phone (e.g., an iPhone), a smartwatch (e.g., a Pebble E-Paper Watch), an augmented reality head-mounted display (e.g., Google Glass), and so on. In one or more other embodiments, each ADV included in the fleet of ADVs can communicate with the ADV control network platform 600 via a communication network 608 to transmit information to one or more nodes 502 residing in the ADV network 610 such that the information can be utilized and/or transmitted to one or more ADVs in an ADV fleet. The information transmitted by mobile devices 606 and/or ADVs 602 can include, for example, information concerning one or more navigable pathways, geographical location information of geographical artifacts, current and/or average speed of a length of a navigable pathway, temperature, road hazards, traffic congestion information, traffic pattern information, detours, travel times of a navigable pathway or length of a navigable pathway, travel time to navigate a generated route, GPS and reference positioning data of the vehicle, inclination angles of a navigable pathway or length of navigable pathway, angles of curvature of a navigable pathway or length of navigable pathway, or any information about a navigable pathway or a length thereof, the surrounding geographical area, environmental conditions and/or information concerning the ADV itself that can be sensed and/or determined by an ADV on-board computer.

As described herein, if an on-board computer 204 does not have enough mapping information to generate a route from its current geographical position to an identified destination or determine an estimate of the total amount of electrical power that will be required to navigate a generated route, either because the mapping information does not contain the current position of the ADV, the identified destination of the ADV, or one or more navigable pathways or the relevant information concerning the one or more navigable pathways that are between the aforementioned current position and the identified destination, the on-board computer 204 may transmit a request to one or more ADV control system nodes 502 that reside in the ADV control network 610 to receive the required mapping and routing information. For example, the on-board computer 204 may utilize the mapping system 310, the dynamic routing system 308 and the ADV reference system 304 to use the transmitted information to generate the current geographical position of the ADV, the identified geographical destination, one or more routes to navigate the ADV along to reach the destination and the total amount of electrical power that will be required to navigate the generated route. In some embodiments, one or more ADV control system nodes 502 will determine the current position of the ADV, the identified destination of the ADV, one or more navigable pathways that are between the aforementioned current position and the identified destination, and generate one or more routes for the ADV to reach the destination and transmit the same to the on-board computer 204 for either use by and/or confirmation of the on-board computer 204 generated information. In one embodiment, an ADV occupant or another user of the ADV system may enter a destination using a GUI on display 210. In another embodiment, an ADV can be provided with one or more destinations using one or more mobile devices 606 or via a desktop computer that transmits information to the ADV system network 610 that includes scheduling information (e.g., time, date, etc.), destination information (address, etc.), and occupant ID information (name, age, address, etc.). In one or more embodiments, a user of the ADV platform 600 can transmit destination information and scheduling information to one or more ADVs 602 directly to the one or more ADVs over network 608 or via one or more control and system nodes 502 that reside in ADV platform network 610. For example, destination information can be transmitted by one or more nodes 502 residing in the ADV network 610 to one or more ADVs that will, in turn, automatically generate routing information from the current location of the ADV and transport known ADV occupants to one or more predetermined destinations. Additionally, the destination and scheduling information can be utilized by an on-board computer 204 to automatically deliver the relevant ADV occupants to the predetermined destination at a specific time, if possible, under time, navigational, speed and environmental constraints.

The ADV control system utilizing one or more control nodes 502 may determine the current positon and/or a starting position of an ADV to assist in the generation of routing information in a similar manner as described with the on-board computer 204 herein. For example, the ADV network may utilize an ADV reference system 510, shown in FIG. 5, included within one or more control system nodes 502 to determine the location of the ADV on the Earth and, ultimately, on a map. For example, ADV reference system 510 can use a global-positioning system (GPS), the Quazi-Zenith Satellite System (QZSS), Beidou, Galileo, Globalnaya Navigazionnaya Sputnikovaya Sistema or Global Navigation Satellite System (GLONASS), or any other system that is accurate enough to determine the position of an ADV within time and distance constraints such that the position may both correlate with mapping information, be continuously updated, and fall within certain positioning distances such that navigation of the vehicle can be safely achieved while maintaining the accuracy of the routing information. In another embodiment, the starting location may be transmitted via mobile devices 606, entered using a GUI included in display 210, or otherwise provided to an on-board computer 204.

As described herein, mobile devices 606 may be utilized within the ADV network platform 600 to provide information about one or more navigable pathways by transmitting the same over a public network 608 to one or more control system nodes 502 residing in the ADV network 610. For example, some of the mobile devices 606 are equipped with imaging systems such that visual information (e.g., pictures, videos) may be transmitted to one or more nodes 502 or one or more on-board computers 204 that reside in ADVs 602, or both. Utilizing the ADV reference system 508 that resides in one or nodes 502, and the ADV reference system 304 that resides within on-board computer 204, the image data may be compared with historical image data that resides in the storage system 506 and/or the data storage 314 to determine the location of the image information. Once the geographical location is determined, the information may be used to update route navigation times due to circumstances surrounding the navigable pathways (i.e., accidents, road obstructions, environmental occurrences, etc.), determine one or more of a destination or a current position, or other information that affects routing and positioning. In some instances, the image data itself will include metadata that includes positioning and other information that may be utilized in a manner to determine and generate routing, mapping and route updating information. Historical information that can be used to generate and determine information concerning positioning, routing and mapping of one or more of the ADVs is stored in storage system 506 or other databases for retrieval by one or more nodes 502 to assist one or more ADVs to navigate generated routes as described herein. With respect to FIG. 6, one or more ADV control system nodes may be configured in a ADV network service network that can be mapped to a cloud network 610 protected by a firewall and a management network that can be mapped to a public cloud network 608.

Figure 7:
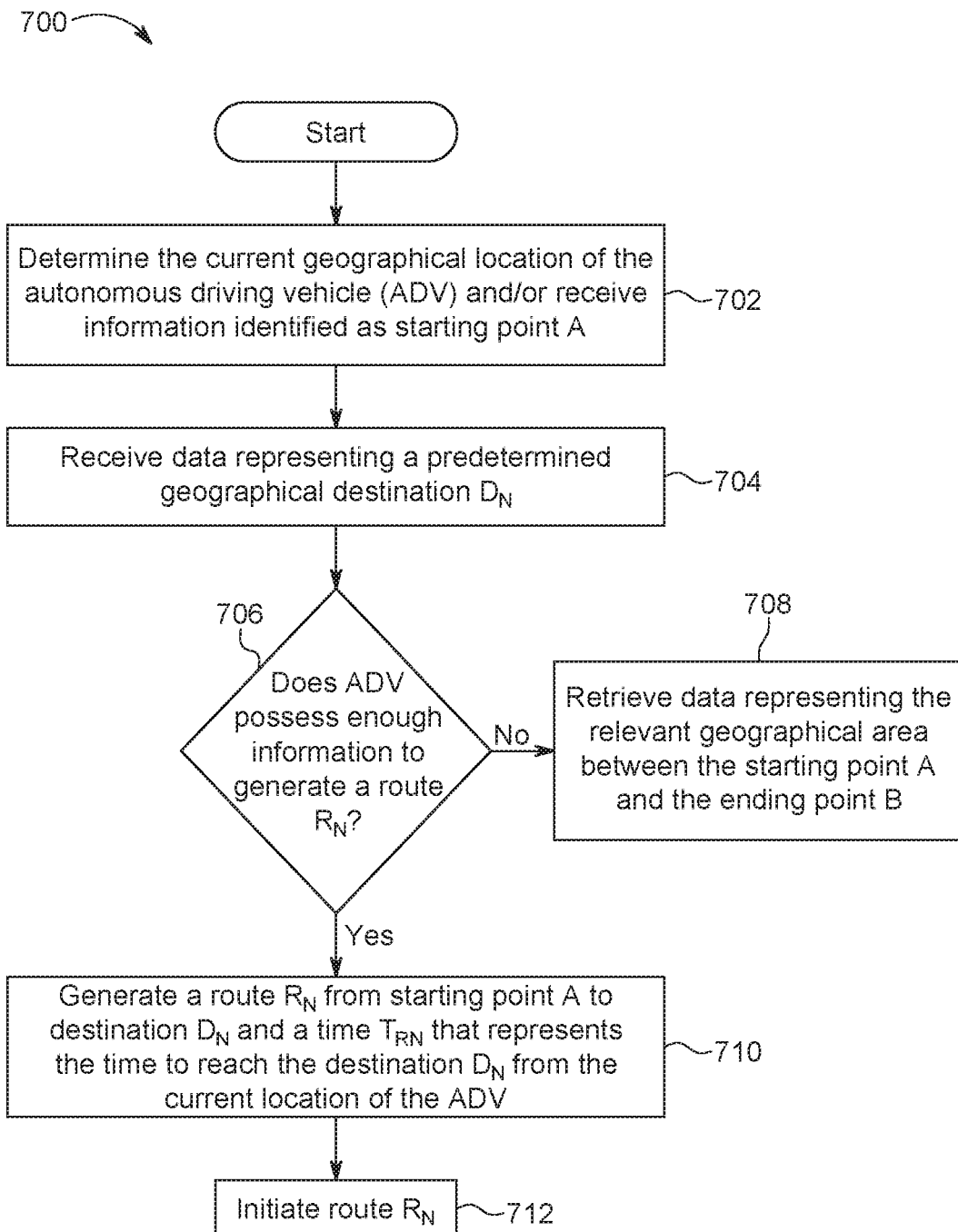
FIG. 7 is an example of a block diagram including a flow chart of one or more steps performed by one or more processors and/or other devices to route an ADV based upon sensor data, navigation data, and/or other data provided to the processor(s), according to some embodiments.
Figure 8:
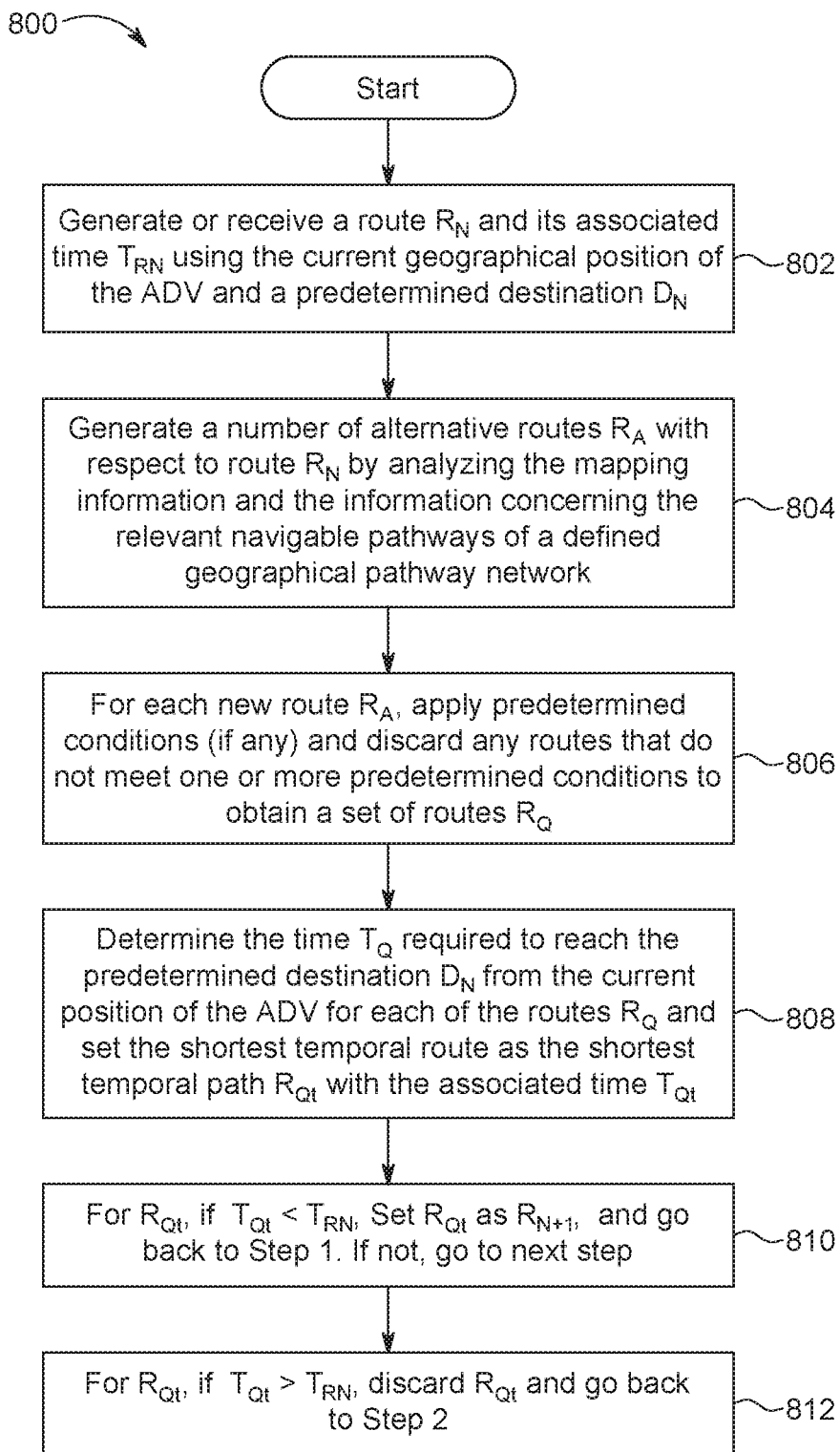
FIG. 8 is an example of a block diagram including a flow charts of one or more steps performed by one or more processors and/or other devices to alter a previous navigation route stored and/or undertaken by an ADV based upon sensor and/or other data received by the processor(s), according to some embodiments.

FIG. 7 is a flowchart 700 that will be referenced to describe an algorithm for determining and generating a route $R_N$ using an ADV's current location to a predetermined destination $D_N$ and autonomously navigate the ADV along the route $R_N$ in accordance with one embodiment. At step 702, the current geographical location of the ADV is identified. In one embodiment, the on-board computer 204 utilizing the ADV reference system 304 determines the current geographical position of an ADV using techniques described herein. In another embodiment, one or more control system nodes 502 that reside in the ADV network 610 may be utilized to determine the current geographical location of the ADV using one or more techniques described herein. In another embodiment, one or more mobile devices 606 may be utilized to determine the current geographical location of an ADV using one or more techniques described herein.

At step 704, the on-board computer 204 receives data representing the predetermined destination $D_N$ that represents an ending point B and determines the associated geographical location of destination $D_N$ on a map using mapping information generated for a relevant geographical area. As described herein, the destination $D_N$ may be selected by an ADV occupant or third-party, transmitted to one or more nodes 502 using a mobile device or desktop computer and, thereafter, transmitted to the relevant ADV, entered into a display 210 by an ADV occupant, transmitted using one or control and system nodes 502 over a network 608 to on-board computer 204, and/or otherwise selected.

At step 706, the onboard computer 204 utilizing the mapping system 310 and the data storage 314 determines, utilizing dynamic routing system 308, if there is enough information to generate a route $R_N$ from the starting point A to the predetermined destination $D_N$. As described herein, the mapping information is used to assist in the determination of the navigational pathways from the starting point A to the destination $D_N$ so that a time $T_{RN}$ that represents the time that it will take the ADV to autonomously navigate the ADV along the navigational pathways from the starting point to the destination $D_N$. Knowing the geographical positions of all of the navigational pathways between starting point A to the predetermined destination $D_N$ allows the on-board computer 204 and/or one or more nodes 502 residing in the ADV network 610 to analyze historical data and/or data transmitted in real time to determine if one or more occurrences (e.g., traffic, accident, environmental hazard, draw bridge activity, tollways, road work, etc.) will impede the ADV from navigating one or more pathways included in the current route $R_N$ to reach a destination $D_N$ and thus impact the time $T_{RN}$. Additionally, analyzing each of the navigable pathways, with respect to the current positon of the car, the current direction of the ADV and/or the direction the ADV is traveling along a navigable pathway, allows for a more reliable calculation of the time $T_{RN}$. If the on-board computer 204 determines that there is not enough information at step 706, as described with reference to step 708, the on-board computer 204 transmits a request to one or more control and system nodes 502 in the ADV network to either 1) receive the necessary information to generate the mapping information and/or the route $R_N$, 2) receive both the mapping information and the route $R_N$, or 3) receive both 1) and 2) and use the information from 2) to confirm the mapping and/or route information generated in 1).

If the on-board computer 204 determines that there is enough information at step 706, the on-board computer 204 utilizes the dynamic routing system 308 to generate a route $R_N$ and a time $T_{RN}$ at step 710 and automatically initiates the route at step 712 to autonomously navigate the ADV to the destination $D_N$ from the ADV's current position.

In one embodiment, an on-board computer 204 and/or one or more of the system control nodes are programmed via the dynamic routing system 308 in case of the on-board computer 204 or the routing system 512 in case of the one or more control nodes to execute a dynamic routing algorithm that utilizes artificial intelligence to continuously generate the shortest temporal route from the ADV's current position to a predetermined destination $D_N$ based upon information concerning the navigable pathways in the relevant geographical region. The dynamic algorithm will now be described with reference to FIG. 8 which represents a flow chart of the algorithm. According to one embodiment, an ADV on-board computer 204 and/or one or more system control nodes 502 are programmed to utilize a dynamic routing algorithm to perform dynamic routing using artificial intelligence (AI) to generate and determine the shortest temporal route that an ADV will navigate from a geographical starting point (e.g., the current location of the ADV or another predetermined geographical location) to a geographical ending point (e.g., a predetermined destination $D_N$ or another predetermined geographical location). Depending upon the size of a geographical region to be traversed and the amount of information gathered concerning the navigable pathways within the geographical region collected, either a single ADV can perform dynamic routing using artificial intelligence (AI) to generate a route $R_{N+1}$, or an ADV system network 610 that utilizes one or more ADV control system nodes 502 can be utilized by an on-board ADV computer to perform dynamic routing using artificial intelligence (AI) to generate a new route $R_{N+1}$.

For example, if the on-board computer 204 determines that the mapping information stored in the data storage and generated utilizing the mapping system does not contain any one or more parts of the new route $R_{N+1}$, the on-board computer 204 can communicatively couple to one or more control system nodes 502 included in the ADV system network 610 and receive the required mapping information to generate a new route $R_{N+1}$ and perform the dynamic routing algorithm. The dynamic routing algorithm is initialized utilizing the dynamic routing system 308 concurrently with the generation or the receipt of a route $R_N$ or at any point during the navigation of the route $R_N$ by the ADV. As described herein with reference to step 802, the on-board computer 204 determines the current geographical location of the ADV and the total time $T_{RN}$ that it will take from the ADV's current geographical location to reach the current predetermined location $D_N$. As described with reference to step 804, the on-board computer 204 uses the reference system, the dynamic routing system 308 and the mapping system 310 and analyzes 1) the mapping information generated by the mapping system, 2) data and/or other information transmitted to the on-board computer 204 over a network, 3) historical data stored in the on-board computer 204 data storage device 314 and/or the data storage 506 of one or more control system nodes 502 transmitted to the on-board computer 204, if available, to generate a number of alternative navigable routes $R_A$ from the ADV's current position to the predetermined destination $D_N$.

For example, in one embodiment the on-board computer 204 uses the mapping system and the ADV reference system to automatically generate a set number of alternative routes $R_A$ in addition to the current route $R_N$ when the route $R_N$ is initially generated. The routes $R_A$ may be generated based upon a weighted system that utilizes time, distance and/or navigable pathway conditions.

For example, in one embodiment, using the total navigable distance associated with a current route $R_N$ measured from the ADV's current position on the route $R_N$ to the current predetermined destination $D_N$, the on-board computer 204 utilizing the dynamic routing system 308 can also generate a number (e.g., ≤N (which can be any number depending upon the number of routes available and the available system processing resources)) of alternative routes $R_A$ that are within (higher and lower) a navigable distance (e.g., ≤N≥ (which can be a % of the reference navigable distance or some other number)) of the reference navigable distance (defined by the distance from the current location of the ADV to the predetermined geographical destination $D_N$).

Another embodiment generates a number of alternative routes $R_A$ an ADV can navigate from the ADV's current position to the predetermined destination $D_N$ as described in step 804 by using a weighting system that uses historical data that includes the average times required to traverse one or more known previously stored routes that align with or most closely align with the current route $R_N$. In this example, as described herein with reference to step 802, each route $R_N$ generated or received by the on-board computer 204 or by one or more control system nodes 502 has a total time value $T_{RN}$ associated therewith that is a temporal measure based upon the total distance of the route $R_N$ and/or other information (e.g., current speed of the ADV, known average speed of vehicles one on or more navigable pathways within the route, historical information concerning time(s) to traverse the entire route or one or more navigable pathways included therein, speed limit of one or more navigable pathways within the route, roadway obstructions, accidents, conditions of one or more navigable pathways within the route, time of day, day of the week, or any information that can be used to determine the time to traverse the route $R_N$—e.g., navigable pathway information). For example, the time $T_{RN}$ for the route $R_N$ is continuously updated in the manner described herein and saved as the ADV navigates current route $R_N$ such that the $T_{RN}$ represents a current estimated temporal measure of the total time it will take the ADV to reach the current destination $D_N$ from the ADV's current position based upon the information described herein. In one embodiment, as described with respect to step 804, for each route $R_N$ received or generated, a series of historical routes $R_H$ are automatically generated based upon certain criteria. For example, historical routes $R_H$ that match or most closely match the route $R_N$ are selected by comparing the total time value $T_{RN}$ with a total time value $T_{RH}$ (total time to traverse a relevant historical route from the current geographical position of the ADV) that is similarly associated with each $R_H$ and determined in one or more ways consistent with that of time $T_{RN}$. In one embodiment, the on-board computer 204 and/or one or more control system nodes 502 determines if the time $T_{RH}$ is within a predetermined temporal range of time $T_{RN}$. For example, the temporal range may be any range (higher or lower) (e.g., ≤$T_{RN}$≥ (which can be a % of the reference navigable time $T_{RN}$ or some other number)) as long as it is suitable to identify a number of relevant historical routes $R_H$ for the purpose described herein. Each historical route $R_H$ is selected from a repository of historically saved routes either stored in the data storage 314 included in an on-board computer 204 and/or in the storage system 506 of one or more control system nodes 502. As above, if the on-board computer 204 determines that the mapping information stored in the data storage 314 and generated utilizing the mapping system 310 does not contain any one or more navigable pathways included in a historical route $R_H$ or an alternative route $R_A$, the on-board computer 204 can communicatively couple to one or more control system nodes 502 included in the ADV system network 610 and receive the required mapping information to generate a historical route $R_H$ or an alternative route $R_A$ and perform the dynamic routing algorithm. If one or more historical routes $R_H$ are stored on one or more control system nodes 502, the historical routes $R_H$ may be transmitted to the on-board computer 204 for processing. Once a set of one or more historical routes has been determined using one or more techniques described herein and/or other known techniques, each historical route $R_H$ will be added to the list of alternative routes $R_A$ and associated with a current route $R_N$. In one embodiment, for each route $R_A$, a total time value TRA that represents the total time to traverse the route $R_A$ from the current geographical position of the ADV that is similarly determined for the current route $R_N$ in one or more ways described herein is currently updated and saved by the on-board computer 204 and/or the one or more control system nodes 502. In this manner, if $T_{RA}$ for one or more of the alternative routes $R_A$ is determined to be out of the range of acceptable temporal values, those one or more offending routes $R_A$ will be discarded from the set of alternative routes $R_A$.

In one embodiment, the on-board computer 204 can also rely upon information and data transmitted by one or more mobile devices 606 that are connected to the ADV system platform 600 over a network 608 to calculate, update and/or obtain information that may impact the total time value $T_{RH}$ of one or more historical routes $R_H$, total time value TA of one or more alternative routes $R_A$ and/or obtain information that may be utilized to calculate and/or update the $T_{RN}$ for a route $R_N$ upon which an ADV is currently navigating. Information that can be transmitted by one or more mobile devices 606 includes, for example, average speed of vehicles on one or more navigable pathways that are included within one or more of the routes $R_N$, $R_H$ and/or $R_A$, historical information concerning time(s) to traverse the entirety of one or more of the routes $R_N$, $R_H$ and/or $R_A$ or one or more navigable pathways included within any one or more of the routes $R_{N+1}$, $R_H$ and/or $R_A$, speed limit of one or more navigable pathways within any one or more of the routes $R_{N+1}$, $R_H$ and/or $R_A$, roadway obstructions, accidents, conditions of one or more navigable pathways within any one or more of the routes $R_N$, $R_H$ and/or $R_A$, time of day, day of the week, or any information that can be used to determine and/or update the measurements of the times $T_{RA}$, $T_H$ and/or $T_{RN}$ to traverse the routes $R_A$, $R_H$ and/or $R_N$. In this example, that will be described with reference to FIG. 6, the mobile devices 606 will connect to one or more control system nodes 502 over a network 608 and transmit information to the one or more nodes using ADV system platform 600. An on-board computer 204 can communicatively connect to one or more control system nodes 502 over a network 608 such that the relevant information can be transmitted from one or more nodes 502 residing in the network 610 to an on-board computer 204. In this embodiment, users of mobile devices 606 that are connected to the ADV system network 610 via a network 608 can transmit information concerning any of the navigable pathways included in the routes $R_A$, $R_H$ and/or $R_N$.

As described in step 806, after the set of alternative routes $R_A$ has been determined with respect to step 804, each alternative route $R_A$ included in the set of alternative routes $R_A$ is analyzed to determine if any pre-determined restrictions will cause one or more alternative routes $R_A$ to be discarded from the set of available alternative routes $R_A$. For example, once the set of routes $R_A$ have been generated, the on-board computer 204 can take into account any rules or predetermined conditions that must be met to select one of the routes in the set $R_A$ as the new current route $R_{N+1}$. The on-board computer 204 is programmed to select the shortest temporal pathway $R_Q$ from the set of alternative routes $R_A$ that meet one or more predetermined conditions, wherein $R_Q$ represents the route that will take the shortest amount of time for the ADV to traverse from the ADV's current position to the predetermined destination $D_N$ (the shortest temporal route) determined from the set of qualifying alternative routes $R_A$. As described in step 806, these predetermined conditions may include conditions that are associated with 1) roadway conditions that exists on one or more navigable pathways included in a relevant $R_A$, 2) tollways or other monetary entities that condition travel on some sort of payment system that that exists on one or more navigable pathways included in a relevant $R_A$, 3) environmental conditions that exists on one or more navigable pathways included in a relevant $R_A$, 4) accidents or other obstructions that exists on one or more navigable pathways included in a relevant $R_A$, or 5) any other condition or occurrence that exists on one or more navigable pathways included in a relevant $R_A$ that will impede an efficient and/or expedient form of travel. In one embodiment, as described with reference to step 806, the on-board computer 204 is programmed to select alternative routes $R_A$ that avoid certain geographical artifacts that are found along the navigable pathways and/or the relevant geographical region, artifacts including, for example, one or more of city streets, tolls, lights, bridges, highways, street cameras, structures, identified accidents or traffic jams, locations, etc. that may exists and are identifiable geographically within the relevant geographical area that includes one or more navigable pathways included in the set of alternative routes $R_A$. According to step 806, for any alternative routes $R_A$ that do not meet any one or more of the predetermined conditions described herein with reference to step 806, the on-board computer 204 will discard the one or more alternative routes from the set of alternative routes $R_A$ to determine of the set $R_Q$ of qualifying alternative routes $R_Q$.

Once the on-board computer 204 has identified the set of qualifying alternative routes $R_Q$, the on-board computer 204 determines the time $T_{RQ}$ for each qualifying route $R_Q$, wherein $T_{RQ}$ for each route $R_Q$ represents the total time to traverse the route $R_Q$ from the current geographical position of the ADV as described in step 808. The time $T_{RQ}$ for each qualifying route $R_Q$ is determined in a manner similar to that of $T_{RN}$ determined for the current route $R_N$ and/or in one or more ways described herein. Once the set of qualifying routes $R_Q$ is determined, the time $T_{RQ}$ for each qualifying route $R_Q$ is continuously updated and saved by the on-board computer 204 and/or the one or more control system nodes 502. With respect to step 808, in response to on-board determining the time $T_{RQ}$ for each qualifying route $R_Q$, the on-board computer 204 determines the current location of the ADV and, with respect to the current location, determines which time $T_{RQ}$ for each of the qualifying routes $R_Q$ represents the shortest time, and sets the qualifying route that is associated with the shortest $T_{RQ}$ as route $R_{Qt}$. In this example, route $R_{Qt}$ represents the shortest temporal path of all of the qualifying routes $R_Q$ in the set of qualifying routes $R_Q$ from the current position of the ADV to the predetermined destination $D_N$. As described in step 808, the on-board computer 204 determines the time $T_{Qt}$ for shortest temporal path route $R_{Qt}$, wherein $T_{Qt}$ for the route $R_{Qt}$ represents the total time to traverse the shortest temporal path $R_{Qt}$ from the current geographical position of the ADV to the predetermined destination $D_N$. The time $T_{Qt}$ for the shortest temporal path $R_{Qt}$ is continuously updated and saved by the on-board computer 204 and/or the one or more control system nodes 502.

As described in step 810, in response to the on-board computer 204 determining the time $T_{Qt}$ for the shortest temporal path $R_{Qt}$, the time $T_{Qt}$ for the shortest temporal path $R_{Qt}$ is compared to the time $T_{RN}$ for the current route $R_N$. If the time $T_{Qt}$ for the current geographical position of the ADV is less than the time $T_{RN}$ for the current route $R_N$, then the on-board computer 204 will set the route $R_{QT}$ as the new route $R_{N+1}$ and automatically reroute the ADV to autonomously navigate the new route $R_{N+1}$ as described herein. Once the new route $R_{N+1}$ is set, the dynamic routing algorithm will recycle back to step 802, set $R_N=R_{N+1}$ and continuously cycle through the dynamic routing algorithm that utilizes artificial intelligence to automatically navigate the ADV as described herein until the ADV reaches its predetermined destination $D_N$. For example, in response to $R_N$ being updated to $R_{N+1}$, the on-board computer 204 will determine the time $T_{RN+1}$ for new route $R_{N+1}$, wherein time $T_{RN+1}$ represents the total time to traverse the route $R_{N+1}$ from the current geographical position of the ADV, as described in step 802. Thereafter, the dynamic routing algorithm will use artificial intelligence as described herein to automatically navigate the ADV by continuously generating alternative routes $R_A$ in real-time, determine if any of those alternative routes represent a shorter temporal route to the current route the ADV is autonomously navigating, and automatically redirect the autonomous vehicle to navigate another alternative route (e.g., new route $R_{N+2}$ if the preceding route was route $R_{N+1}$ and the current destination was $D_N$) if the new route meets predetermined conditions and is a shorter temporal route than the current route the ADV is navigating.

For example, as described in step 812, if the time $T_{Qt}$ for the current geographical position of the ADV is equal to or more than the time $T_{RN}$ for the current route $R_N$, then the on-board computer 204 will discard route $R_{QT}$, go back to step 804 and autonomously navigate the ADV along the current route $R_N$ while continuously cycling through the dynamic routing algorithm to generate alternative routes and determine if an alternative route meets the predetermined conditions and is a shorter temporal route than the current route the ADV is navigating until the ADV reaches its predetermined destination $D_N$, as described herein. In the above embodiments, the on-board computer 204, one or more control system nodes 502 or a combination of both utilizing the dynamic routing system 308 and/or the routing system 512, respectively, can perform the dynamic routing algorithm that utilizes artificial intelligence to automatically navigate an ADV in real time as described herein.

In one or more embodiments, either the on-board computer 204 or one or more nodes 502 utilizing the dynamic routing system 308 and/or the routing system 512, respectively, will generate the set of alternative routes $R_A$. For example, if an ADV is required to navigate road A, road B, road C and road D from its current position to reach a predetermined destination $D_N$, then the ADV on-board computer 204 will monitor its data storage 314 and/or the storage system 506 of one or more control system nodes 502 to determine if there is any current and relevant information concerning road A, road B, road C and/or road D that will impact the navigable time $T_{RN}$. If there exists an event that will impact the navigable time $T_{RN}$ for the current route, either the on-board computer 204 or one or more nodes 502 will generate a new navigable time $T_{RN+1}$ that will take the event into account. Similarly, if an alternative route $R_A$ or a historical route $R_H$ includes road G, road H, road I, and road J which represent navigable pathways that an ADV can navigate to reach the current destination $D_N$ from its current geographical position along one or more alternative routes, the ADV on-board computer 204 will monitor its data storage and/or the storage system 506 of one or more control system nodes 502 to determine if there is any current and relevant information concerning road G, road H, road I, and/or road J that will impact the navigable time $T_{RA}$ or $T_{RH}$ and update the same on the on-board computer 204. In this example, the on-board computer 204 can determine if the information received from devices on the ADV system platform 600 or the data storage system included in one or more control system nodes 502 is current using a time/date stamp (e.g., time of storing, receipt, transmittal, capture, etc.) associated with the information. For example, the on-board computer 204 can determine if a time/date stamp associated with the information is within a predetermined time range X from the current time. For example, the on-board computer 204 can determine if the information is relevant and if the information impacts a time required to traverse one or more roads A-D or an event that affects one or more measured times $T_{RN}$, $T_{RH}$, $T_{RA}$, $T_Q$ and or $T_{Qt}$, as described herein using the dynamic routing algorithm described with respect to FIG. 8 herein.

Figure 9:
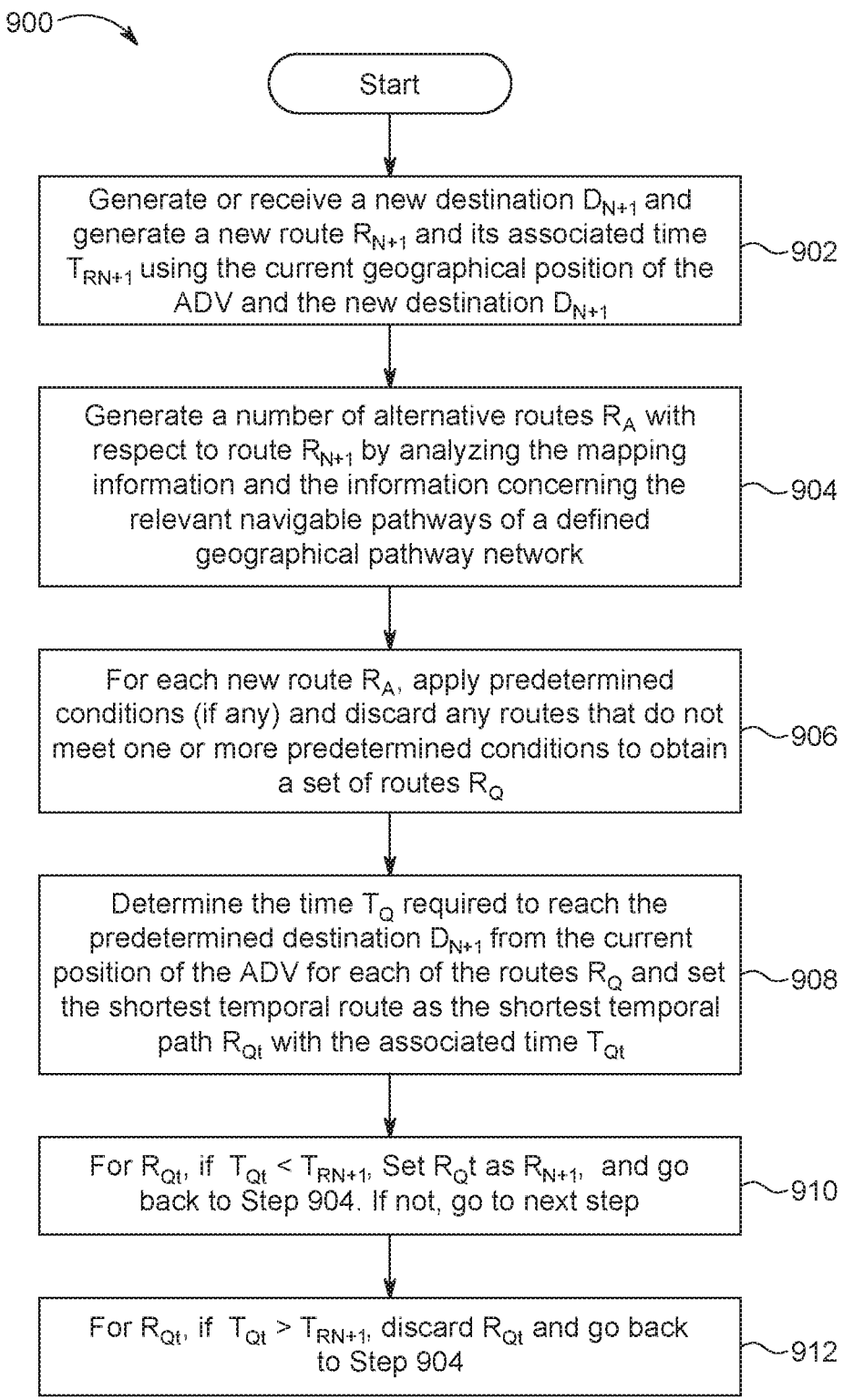
FIG. 9 is an example of a block diagram including a flow charts of one or more steps performed by one or more processors and/or other devices to alter a previous navigation route stored and/or undertaken by an ADV based upon sensor and/or other data received by the processor(s), according to some embodiments.

The on-board computer 204, utilizing the dynamic routing system 308, mapping system 310 and the positioning system 304 can re-route an ADV from its current geographical position on the current route $R_N$ to a newly determined geographical destination included in the new route $R_{N+1}$ by executing the dynamic re-routing algorithm described with reference to the flowchart illustrated in FIG. 9. Similarly to the routing algorithm described with reference to the flowchart illustrated in FIG. 8, the dynamic algorithm described with reference to FIG. 9 utilizes artificial intelligence to enable an on-board computer 204 to perform dynamic re-routing to, while the ADV is traversing the current route $R_N$, generate a new route $R_{N+1}$ and automatically re-route an ADV from its current geographical position on the current route $R_N$ to a newly determined geographical destination $D_{N+1}$ included in the new route $R_{N+1}$. The on-board computer 204 and/or one or more of the system control nodes 502 are programmed via the dynamic routing system 308 in case of the on-board computer 204 or the routing system 512 in case of the one or more control nodes 502 to execute a dynamic routing algorithm that utilizes artificial intelligence to continuously generate the shortest temporal route from the ADV's current position to a new destination $D_{N+1}$ based upon information concerning the navigable pathways in the relevant geographical region. The dynamic re-routing algorithm will now be described with reference to FIG. 9.

In this embodiment at step 902, while the ADV is autonomously navigating route $R_N$ to reach predetermined geographical destination $D_N$, the on-board computer 204 receives or generates a new destination $D_{N+1}$. Similar to the original destination $D_N$, a new destination $D_{N+1}$ can be generated or received by the on-board computer 204 which will, in turn, cause the on-board computer 204 to generate a new route $R_{N+1}$ from the ADV's current geographical position to the new geographical destination and determine the total time $T_{RN+1}$ that it will take from the ADV's current geographical location to reach the new destination $D_{N+1}$. Depending upon the size of a geographical region to be traversed from the ADV's current position to the new destination $D_{N+1}$ and the amount of relevant available information concerning the navigable pathways within the geographical region that contains the new route $R_{N+1}$, either a single ADV on-board computer 204 can perform dynamic re-routing using artificial intelligence (AI) to generate a new route $R_{N+1}$, or an ADV system network 610 that utilizes one or more ADV control system nodes 502 can be utilized by the on-board ADV computer 204 to perform dynamic routing using artificial intelligence (AI) to generate a new route $R_{N+1}$. For example, similar to the dynamic routing algorithm described above with reference to FIG. 8, if the on-board computer 204 determines that the mapping information stored in the data storage and generated utilizing the mapping system does not contain any one or more relevant parts of the new route $R_{N+1}$, the on-board computer 204 can communicatively couple to one or more control system nodes 502 included in the ADV system network 610 and receive the required mapping information to generate a new route $R_{N+1}$ and perform the dynamic re-routing algorithm. The dynamic re-routing algorithm can be initialized utilizing the dynamic routing system 308 concurrently with the generation or the receipt of a new route $R_{N+1}$ or at any point during the navigation of the route $R_N$ by the ADV when a new destination $D_{N+1}$ is generated or received. As described herein with reference to step 902, the on-board computer 204 determines the current geographical location of the ADV and the total time $T_{RN+1}$ that it will take from the ADV's current geographical location to reach the new destination $D_{N+1}$.

As described with reference to step 904, after the on-board computer 204 generates the new route $R_{N+1}$, on-board computer 204 uses the reference system, the dynamic routing system 308 and the mapping system 310 and analyzes 1) the mapping information generated by the mapping system, 2) data and/or other information transmitted to the on-board computer 204 over a network, and/or 3) historical data stored in the on-board computer 204 data storage and/or the data storage of one or more control system nodes 502 transmitted to the on-board computer 204, if available, to generate a number of alternative navigable routes $R_A$ from the ADV's current position to the new destination $D_{N+1}$. For example, in one embodiment the on-board computer 204, utilizing the dynamic routing system, may use the mapping information and the ADV reference system to automatically generate a set number of alternative routes $R_A$ in addition to the new route $R_{N+1}$ when the new route $R_{N+1}$ is initially generated. The routes $R_A$ may be generated based upon a weighted system that utilizes time, distance and/or navigable pathway conditions.

For example, in one embodiment, using the total navigable distance associated with a new route $R_{N+1}$ measured from the ADV's current position on the new route $R_{N+1}$ to the new destination $D_{N+1}$, the on-board computer 204 can also generate a number (e.g., ≤N (which can be any number depending upon the number of routes available and the available system processing resources)) of alternative routes $R_A$ that are within (higher and lower) a navigable distance (e.g., ≤N≥ (which can be a % of the reference navigable distance or some other number)) of the reference navigable distance (defined by the distance from the current location of the ADV to the new geographical destination $D_{N+1}$).

Another embodiment generates a number of alternative routes $R_A$ an ADV can navigate from the ADV's current position to the new destination $D_{N+1}$ as described in step 904 by using a weighting system that uses historical data that includes the average times required to traverse one or more known previously stored routes that align with or most closely align with the new route $R_{N+1}$. In this example, as described herein with reference to step 902, each new route $R_{N+1}$ generated utilizing dynamic routing system 308 or received by the on-board computer 204 via one or more control system nodes 502 has a total time value $T_{RN+1}$ associated therewith that is a estimated temporal measurement based upon the total distance of the new route $R_{N+1}$ and/or other information (e.g., current speed of the ADV, known average speed of vehicles one on or more navigable pathways within the route, historical information concerning time(s) to traverse the entire route or one or more navigable pathways included therein, speed limit of one or more navigable pathways within the route, roadway obstructions, accidents, conditions of one or more navigable pathways within the route, time of day, day of the week, or any information that can be used to determine the time to traverse the new route $R_{N+1}$). For example, the time $T_{RN+1}$ for the new route $R_{N+1}$ is continuously updated in the manner described herein and saved as the ADV navigates new route $R_{N+1}$ such that the time $T_{RN+1}$ represents a current temporal measure of the total time it will take the ADV to reach the new destination $D_{N+1}$ from the ADV's current position based upon the information described herein. In one embodiment, as described with respect to step 904, for each new route $R_{N+1}$ received or generated, a series of historical routes $R_H$ are automatically generated based upon certain criteria. For example, historical routes $R_H$ that match or most closely match the new route $R_{N+1}$ are selected by comparing the total time value $T_{RN+1}$ with a total time value $T_{RH}$ (total time to traverse a relevant historical route from the current geographical position of the ADV) that is similarly associated with each $R_H$ and determined in one or more ways consistent with that of $T_{RN+1}$. In one embodiment, the on-board computer 204 and/or one or more control system nodes 502 determines if the $T_{RH}$ is within a predetermined temporal range of $T_{RN+1}$. For example, the temporal range may be any range (higher or lower) (e.g., $\leq T_{RN+1} \geq$ (which can be a % of the reference navigable time $T_{RN+1}$ or some other number)) as long as it is suitable to identify a number of relevant historical routes $R_H$ for the purpose described herein. Each historical route $R_H$ is selected from a repository of historically saved routes either stored in the data storage 314 included in an on-board computer 204 and/or in the storage system 506 of one or more control system nodes 502. As above, if the on-board computer 204 determines that the mapping information stored in the data storage 314 and generated utilizing the mapping system 310 does not contain any one or more navigable pathways included in a historical route $R_H$ or an alternative route $R_A$, the on-board computer 204 can communicatively couple to one or more control system nodes 502 included in the ADV system network 610 and receive the required mapping information to generate a historical route $R_H$ or an alternative route $R_A$ and perform the dynamic routing algorithm. If stored on one or more control system nodes 502, the historical routes $R_H$ may be transmitted to the on-board computer 204 for processing. Once a set of historical routes has been determined using one or more techniques described herein and/or other known techniques, each historical route $R_H$ will be added to the list of alternative routes $R_A$ and associated with a new route $R_{N+1}$. In one embodiment, for each route $R_A$, a total time value $T_{RA}$ that represents the total time to traverse the route $R_A$ from the current geographical position of the ADV that is similarly determined for the new route $R_{N+1}$ in one or more ways described herein is currently updated and saved by the on-board computer 204 and/or the one or more control system nodes 502. In this manner, if $T_{RA}$ for one or more of the alternative routes $R_A$ is determined to be out of the range of acceptable temporal values, those one or more offending routes $R_A$ will be discarded from the set of alternative routes $R_A$.

In one embodiment, the on-board computer 204 can also rely upon information and data transmitted by one or more mobile devices 606 that are connected to the ADV system platform 600 over a network 608 to obtain information that may impact the total time value $T_{RH}$ of one or more historical routes $R_H$, total time value TA of one or more alternative routes $R_A$ and/or obtain information that may be utilized to calculate and/or update the $T_{RN+1}$ for a new route $R_{N+1}$ upon which an ADV is currently navigating. Information that can be transmitted by one or more mobile devices 606 includes, for example, average speed information of vehicles on one or more navigable pathways that are included within one or more of the routes $R_{N+1}$, $R_H$ and/or $R_A$, historical information concerning time(s) to traverse the entirety of one or more of the routes $R_{N+1}$, $R_H$ and/or $R_A$ or one or more navigable pathways included within any one or more of the routes $R_{N+1}$, $R_H$ and/or $R_A$, speed limit information of one or more navigable pathways within any one or more of the routes $R_{N+1}$, $R_H$ and/or $R_A$, roadway obstructions, accidents, the physical and/or environmental conditions of one or more navigable pathways within any one or more of the routes $R_{N+1}$, $R_H$ and/or $R_A$, the time of day, the day of the week, or any information that can be used to determine and/or update the measurements of the times $T_A$, $T_H$ and/or $T_{RN+1}$ to traverse the routes $R_A$, $R_H$ and/or $R_{N+1}$. In this example, that will be described with reference to FIG. 6, one or more mobile devices 606 will connect to one or more control system nodes 502 over a network and transmit information to the one or more nodes 502 using ADV system network 610. An on-board computer 204 can communicatively connect to one or more control system nodes 502 over a network 608 such that the relevant information can be transmitted from one or more nodes 502 residing in the network 610 to an on-board computer 204. In this embodiment, one or more users of mobile devices 606 that are connected to the ADV system platform 600 via a network 608 can transmit information concerning any of the navigable pathways included in the routes $R_A$, $R_H$ and/or $R_{N+1}$.

As described in step 906, after the set of alternative routes $R_A$ has been determined with respect to step 904, each alternative route $R_A$ included in the set of alternative routes $R_A$ is analyzed to determine if any pre-determined conditions will cause one or more alternative routes $R_A$ to be discarded from the set of available alternative routes $R_A$. For example, once the set of routes $R_A$ have been generated, the on-board computer 204 determines if one of the routes in the set $R_A$ will become a new route $R_{N+2}$ that an ADV will automatically navigate according to a set of rules or predetermined conditions that must be met. For example, as described in step 906, the on-board computer 204 is programmed via the dynamic routing system 308 to select the shortest temporal pathway $R_Q$ from the set of alternative routes $R_A$ that meet one or more predetermined conditions, wherein $R_Q$ represents the route that will take the shortest amount of time for the ADV to traverse from the ADV's current position to the predetermined destination $D_{N+1}$ (the shortest temporal route) determined from the set of qualifying alternative routes $R_A$. As described in step 906, these predetermined conditions may include conditions that are associated with 1) roadway conditions that exists on one or more navigable pathways included in a relevant $R_A$, 2) tollways or other monetary entities that condition travel on some sort of payment system that exists on one or more navigable pathways included in a relevant $R_A$, 3) environmental conditions that exists on one or more navigable pathways included in a relevant $R_A$, 4) accidents or other obstructions that exists on one or more navigable pathways included in a relevant $R_A$, or 5) any other condition(s) or occurrence(s) that exists on one or more navigable pathways included in a relevant $R_A$ that will impede an efficient and/or expedient form of travel. In one embodiment, as described with reference to step 906, the on-board computer 204 is programmed to select alternative routes $R_A$ that avoid certain geographical artifacts that are found along the navigable pathways and/or the relevant geographical region, artifacts including, for example, one or more of city streets, tolls, lights, bridges, highways, street cameras, structures, locations, etc. that may exists and are identifiable geographically within the relevant geographical area that includes one or more navigable pathways included in the set of alternative routes $R_A$. According to step 906, for any alternative routes $R_A$ that do not meet any one or more of the predetermined conditions described herein with reference to step 906, the on-board computer 204 will discard the one or more alternative routes from the set of alternative routes $R_A$ to determine of the set $R_Q$ of qualifying alternative routes $R_Q$.

Once the on-board computer 204 has identified the set of qualifying alternative routes $R_Q$, the on-board computer 204 determines the time $T_{RQ}$ for each qualifying route $R_Q$, wherein $T_{RQ}$ for each route $R_Q$ represents the total time to traverse the route $R_Q$ from the current geographical position of the ADV as described in step 908. The time $T_{RQ}$ for each qualifying route $R_Q$ is determined in a manner similar to that of $T_{RN+1}$ determined for the new route $R_{N+1}$ and/or in one or more ways described herein. Once the set of qualifying routes $R_Q$ is determined, the time $T_{RQ}$ for each qualifying route $R_Q$ is continuously updated and saved by the on-board computer 204 and/or the one or more control system nodes 502. With respect to step 908, in response to the on-board computer 204 determining the time $T_{RQ}$ for each qualifying route $R_Q$, the on-board computer 204 determines the current location of the ADV and, with respect to the current location, determines which time $T_{RQ}$ for each of the qualifying routes $R_Q$ represents the shortest time, and sets the qualifying route that is associated with the shortest $T_{RQ}$ as route $R_{Qt}$. In this example, route $R_{Qt}$ represents the shortest temporal path of all of the qualifying routes $R_Q$ in the set of qualifying routes $R_Q$ from the current position of the ADV to the new destination $D_{N+1}$. As described in step 908, the on-board computer 204 determines the time $T_{Qt}$ for shortest temporal path route $R_{Qt}$, wherein $T_{Qt}$ for the route $R_{Qt}$ represents the total time to traverse the shortest temporal path $R_{Qt}$ from the current geographical position of the ADV to the new destination $D_{N+1}$. The time $T_{Qt}$ for the shortest temporal path $R_{Qt}$ is continuously updated and saved by the on-board computer 204 and/or the one or more control system nodes 502.

As described in step 910, in response to the on-board computer 204 determining the time $T_{Qt}$ for the shortest temporal path $R_{Qt}$, the time $T_{Qt}$ for the shortest temporal path $R_{Qt}$ is compared to the time $T_{RN+1}$ for the new route $R_{N+1}$. If the time $T_{Qt}$ for the current geographical position of the ADV is less than the time $T_{RN+1}$ for the new route $R_{N+1}$, then the on-board computer 204 will set the route $R_{QT}$ as the new route $R_{N+2}$ and automatically re-route the ADV to autonomously navigate the new route $R_{N+2}$ as described herein. Once the new route $R_{N+2}$ is set, the dynamic routing algorithm will recycle back to step 902, set $R_{N+2}$ as the current route (e.g., $R_N$) and continuously cycle through the dynamic routing algorithm that utilizes artificial intelligence to automatically navigate the ADV as described herein until the ADV reaches the new destination $D_{N+1}$. For example, in response to $R_{N+1}$ being updated to $R_{N+2}$, the on-board computer 204 will determine the time $T_{RN+2}$ for new route $R_{N+2}$, wherein time $T_{RN+2}$ represents the total time to traverse the route $R_{N+2}$ from the current geographical position of the ADV, as described in step 902. Thereafter, the dynamic routing algorithm using artificial intelligence, as described herein, will automatically navigate the ADV by continuously generating alternative routes $R_A$ in real-time to determine if any of those generated alternative routes represent a shorter temporal route as compared to the current route the ADV is autonomously navigating, and automatically redirect the autonomous vehicle to navigate another alternative route (e.g., new route $R_N+3$ if the preceding route was route $R_{N+2}$ and the current destination was $D_{N+1}$) if the new route meets predetermined conditions and is a shorter temporal route than the current route the ADV is navigating.

For example, as described in step 912, if the time $T_{Qt}$ for the current geographical position of the ADV is equal to or more than the time $T_{RN+1}$ for the new route $R_{N+1}$, then the on-board computer 204 will discard route $R_{QT}$, go back to step 904 and autonomously navigate the ADV along the current route $R_{N+1}$ while continuously cycling through the dynamic routing algorithm to generate alternative routes and determine if an alternative route meets the predetermined conditions and is a shorter temporal route than the current route the ADV is navigating until the ADV reaches its new destination $D_{N+1}$, as described herein. In the above embodiments, the on-board computer 204, one or more control system nodes 502 or a combination of both can perform the dynamic re-routing algorithm that utilizes artificial intelligence to automatically navigate an ADV in real time as described herein.

In one embodiment, either the on-board computer 204 or one or more nodes 502 will generate the set of alternative routes $R_A$. For example, if an ADV is required to navigate road A, road B, road C and road D from its current position to reach a new destination $D_{N+1}$, then the ADV on-board computer 204 will monitor its data storage and/or the storage system 506 of one or more control system nodes 502 to determine if there is any current and relevant information concerning road A, road B, road C and/or road D that will impact the navigable time $T_{RN+1}$. If there exists an event that will impact the navigable time $T_{RN+1}$ for the current route, either the on-board computer 204 or one or more nodes 502 will update the navigable time $T_{RN+1}$ that will take the event into account. Similarly, if an alternative route $R_A$ or a historical route $R_H$ includes road G, road H, road I, and road J which represent navigable pathways that an ADV can navigate to reach the new destination $D_{N+1}$ from its current geographical position along one or more alternative routes, the ADV on-board computer 204 will monitor its data storage 314 and/or the storage system 506 of one or more control system nodes 502 to determine if there is any current and relevant information concerning road G, road H, road I, and/or road J that will impact the navigable time $T_{RA}$ or $T_{RH}$ and update the same on the on-board computer 204. In this example, the on-board computer 204 can determine if the information received from devices 606 on the ADV system platform 600 or the data storage system 506 included in one or more control system nodes 502 is current using a time/date stamp (e.g., time of storing, receipt, transmittal, capture, etc.) associated with the information to determine if the received information is within a predetermined time range X from the current time. For example, the on-board computer 204 can determine if the information is relevant and if the information impacts a time required to traverse one or more roads A-D or an event that affects one or more measured times $T_{RN}$, $T_{RH}$, $T_{RA}$, $T_Q$ and or $T_{Qr}$, as described herein using the dynamic re-routing algorithm described with respect to FIG. 9 herein.

Figure 10A:
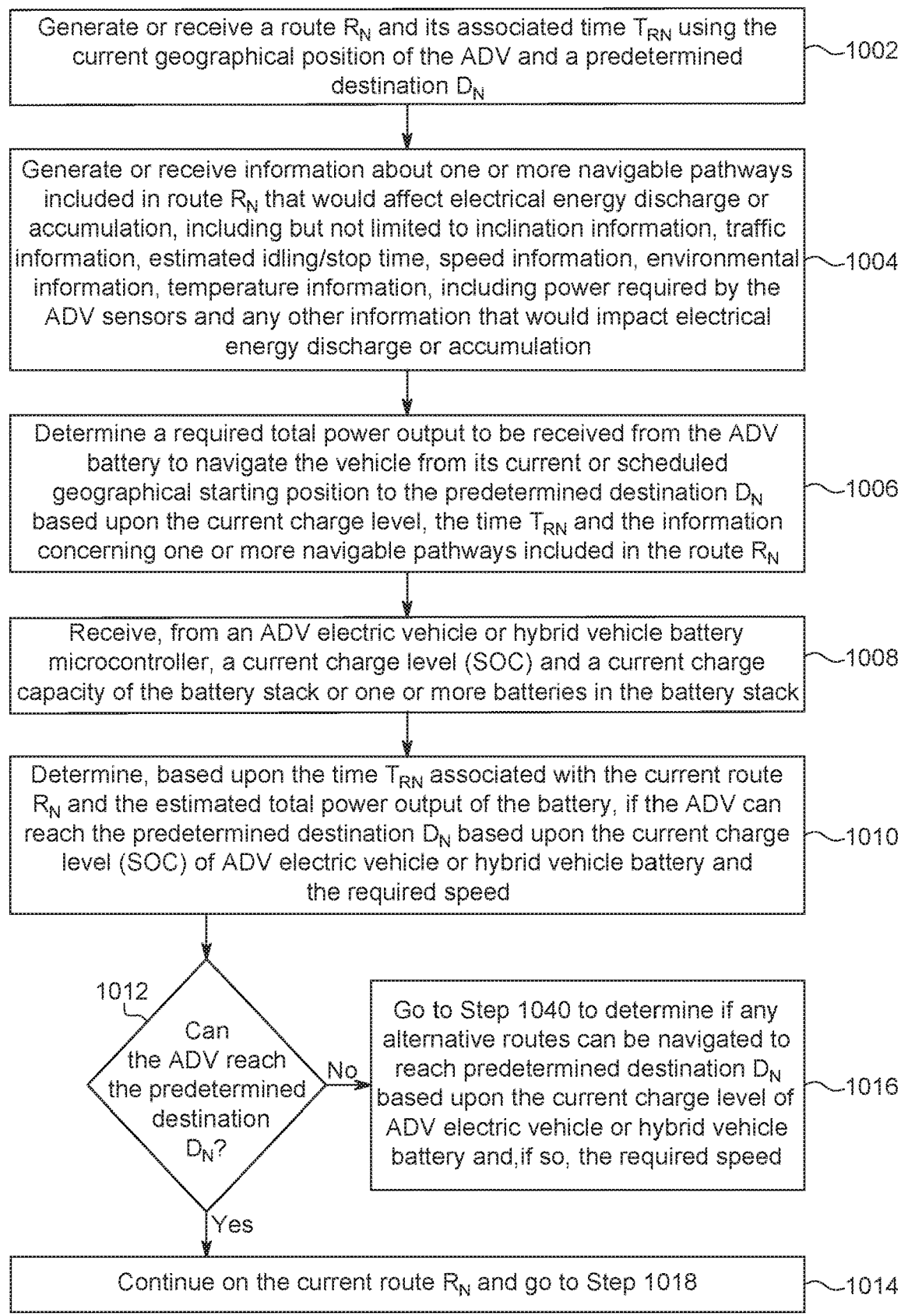
FIG. 10A is an example of a block diagram including a flow chart of one or more steps performed by one or more processors and/or other devices to navigate a route generated by an ADV using sensor and/or other data received by the processor(s) utilizing a power management algorithm, according to some embodiments.

FIG. 10A is a flowchart 1000, that will be referenced to describe an algorithm for managing the power required to be delivered to the motor/generator 418 to assist an ADV EV/HEV to reach a predetermined destination. Utilizing the battery management system 222 and one or more applications that are executed via microcontroller 410, on-board computer 204 can estimate the state of health (SOH) and the state of charge (SOC) of battery stack 402 and/or one or more batteries 404 included therein in advance of a trip for any generated route or at any time along a current route to estimate the battery charge that will be required to reach a predetermined destination for each generated route from the current geographical location of an ADV or for a scheduled trip, determine the battery life of battery stack 402 and/or one or more batteries 404 in real time and estimate the battery life of battery stack 402 and/or one or more batteries 404 at any geographical point along each generated route (e.g., current route, alternative route, scheduled route, etc.), manage the power output by the motor/generator 418 by manipulating the power demands placed upon the motor/generator 418 in advance of a trip or at any time along a generated route, and manage the energy discharge of battery stack 402 and/or one or more batteries 404 by manipulating the load placed upon battery stack 402 in advance of a trip or at any time along a generated route. One having ordinary skill in the art will appreciate that the discussion concerning battery stack 402 also applies to one or more batteries 404 included within battery stack 402 and similarly, discussion concerning any one or more batteries 404 also applies to one battery stack 402 unless otherwise indicated.

At step 1002, the on-board computer 204 receives data representing the predetermined destination $D_N$ that represents an ending point B for a trip and determines the associated geographical location of destination $D_N$ utilizing mapping information generated by the mapping system 310. Using techniques described herein, the on-board computer generates a route $R_N$ that includes the destination $D_N$ and either the current geographical position of the ADV or another starting location for a planned trip and estimates the time $T_{RN}$ associated with route $R_N$ that represents the time it will take the ADV to navigate the one or more navigable pathways included in route $R_N$ using to reach the destination $D_N$.

Figure 3B:
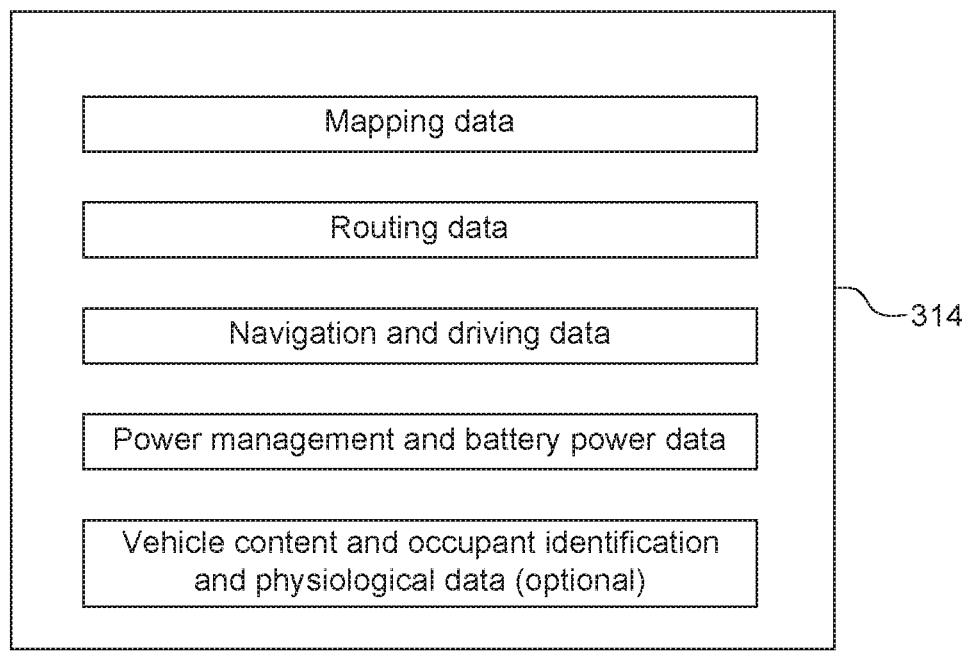
FIG. 3B is a diagram depicting an example of a memory architecture for an ADV control system and on-board computer, according to some embodiments.

At step 1004, CPU 302 included within the onboard computer 204, utilizing the power management and battery monitoring system 312 and mapping system 310, one or more ADV sensors described herein with reference to FIGS. 2 and 3A, 3B and/or one or more nodes 502, receives information concerning the physical attributes of the one or more navigable pathways included in route $R_N$ and environmental conditions affecting the one or more navigable pathways included in route $R_N$. This information, in addition to the information received in step 1002 to determine the time $T_{RN}$ and as discussed herein with reference to FIGS. 7-9, can include the angles of inclination of the one or more navigable pathways included in the route $R_N$, the angles of curvature of the one or more navigable pathways included in the route $R_N$, any weather conditions (rain (amount, severity, etc.), sleet, snow (inches, meters, etc.), wind speeds (mph, km/h, etc.), temperature) that are impacting the one or more navigable pathways included in the route $R_N$. At step 1004, CPU 302 can also receive information about the ADV itself including aerodynamic attributes of the ADV, inefficiencies concerning a transmission, inefficiencies concerning an engine, and inefficiencies concerning any other part of the ADV that can affect the battery, the state of charge of the battery and he state of health of the battery, or any other information that can assist the CPU 302 to determine the estimated battery life for a trip. At step 1004, CPU 302 can also receive information concerning events that are impacting the flow of traffic for one or more navigable pathways included in the route $R_N$ such as the current speed of traffic, road work, traffic congestion, traffic patterns, regions of increased speed (e.g., speed limit changes, end of area of congestion or vehicular or other accident zone or work zone, etc.) and regions of decreased speed (e.g., speed limit changes, beginning of area of congestion or vehicular or other accident zone or work zone, etc.), road signs (e.g., stop sign, slow signs, bridge open/close signs, detour signs, etc.) and anything else that can affect the speed of an ADV on a navigable pathway and the power demands of the battery stack 402 utilized by the ADV.

At step 1004, the CPU utilizing power management and battery monitoring system 312 determines which of the generated and/or received information indicates a battery stress event such that the battery stack 402 will be required to increase the amount of energy generated to meet the higher demand for power by the ADV or any of its components (e.g., the motor/generator 418, the ADV sensors, HVAC, air conditioner, heating system, 4-wheel drive (if applicable), etc.). For example, the temperature of the geographical area that includes the route $R_N$ may be high enough such that it may affect the rate of electrical power discharge such that the life of the battery associated with the current state of charge (SOC) is less than it would be when impacted by lower regional temperatures. As another example, traffic congestion on a navigable pathway that includes a hill (e.g., a positive angle of inclination) may indicate a battery stress event due to the electrical energy discharge that is required of the battery to produce enough power to overcome the friction of the ADV tires and the rolling resistance forces impacting the ADV due to the angle of inclination. As another example, drag forces associated with the surface area of an ADV (and also due to wind speed and/or atmospheric density) may indicate a battery stress event due to the electrical energy discharge that is required of the battery to produce enough power to overcome the aerodynamic dragging force. Additionally, regions that require one or more bursts of speed, such as a navigable pathway that includes a speed-limit change or a route that includes entering a highway from a city street, may indicate a battery stress event due to the electrical energy discharge that is required of the battery to produce enough power to meet the speed requirement. In another example, power lost due to a transmission inefficiency that results in generated power being wasted due to a deficient drive train that fails to properly transfer the produced torque to the wheels may indicate a battery stress event due to the wasted electrical energy discharged by the battery stack 402. In yet another example, power lost due to an ADV engine inefficiency such as an engine is inefficient based upon the amount of energy it consumes versus the distance traveled (i.e., fuel economy)

also results in generated power being wasted. The previous example is also relevant to any ADV engine controllers that are configured to assist the engine in its operations to both conserve and efficiently utilize energy discharged from a battery. Additionally, energy events that result in the battery stack 402 gaining electrical energy are also determined such as regenerative braking and scheduled battery stack 402 charging events.

Each of these battery stress events serve to decrease or increase the estimated life of the battery associated with the current level of charge of the battery stack 402. Persons skilled in the art appreciate that an estimated amount of electrical energy discharged or gained in association with a battery stress event can be determined through formulistic calculations and, as such, will not be discussed herein. Furthermore, the electrical energy output of a battery stack that is required to power an ADV utilizing a known route across one more navigable pathways can also be determined through formulistic calculations. Furthermore, the speed of the ADV, the weight of the ADV (including its occupants and the contents transported in the ADV) and the distance that will be traveled with respect to a generated route are all known quantities such that an estimate of the total electrical energy that will be required to navigate the ADV from a starting geographical location to a predetermined destination can also be estimated utilizing formulistic calculations. For example, the speed utilized to determine an estimate of the total electrical energy that will be required to navigate the ADV from a starting geographical location to a predetermined destination can be the average vehicular speed for vehicles traveling on each navigable pathway included in the generated route, or the speed utilized to determine an estimate of the total electrical energy can be the speed limit assigned by the relevant governmental authority to each navigable pathway included in the generated route. At step 1006, the CPU 302 utilizing power management and battery monitoring system 312, estimates the total required power based upon the information concerning the relevant generated route, the navigable pathways included in the route, the environmental conditions that are or will be impacting the region that includes the route and/or the route itself, components that are included in the ADV itself that may impact the SOC of the battery stack 402 and any other information that may impact the SOC of the battery stack 402.

At step 1008, the CPU, utilizing the battery management system 222, receives the current charge level (SOC) of the battery stack 402. At step 1008, the battery management system 222 also determines the battery capacity that is available for the accumulation and storage of charge based at least in part upon the state of health (SOH) of the battery stack 402. As discussed herein, it is understood by persons having ordinary skill in the art that if battery stack 402 is organized into one or more primary and one or more auxiliary batteries that, respectively, are assigned to power different components of the ADV, then the battery management system 222 utilized by one or more embodiments that include one or more primary batteries and one or more auxiliary batteries can be configured to determine the state of charge (SOC) and the state of health (SOH) of both the primary and auxiliary batteries.

At step 1010, utilizing the power management and battery monitoring system 312, the CPU 302 will determine if the ADV can reach the predetermined destination $D_N$ utilizing the battery stack 402 in its current state, that is with its current state of charge (SOC) and current state of health, navigating the current generated route $R_N$ from either the current vehicle geographical location or a scheduled predetermined starting geographical location. If the ADV can reach the predetermined destination $D_N$ utilizing the battery stack 402 in its current state, the CPU will also determine, at step 1010, a series of estimated average speeds that can be utilized by the ADV to reach the predetermined destination $D_N$ and the associated estimates of the states of charge (SOCs) that the battery stack 402 may have once the ADV reaches the predetermined destination $D_N$. These speeds and resultant state of charges (SOCs) can be estimated utilizing battery life estimation formulas that take into account the relevant battery stress events discussed herein, as the ADV will be navigating a generated route, which has a known distance, at a predetermined average speed. In one or more alternative embodiments, the state of health (SOH) of the battery pack 402 is also utilized to determine if the ADV can reach the predetermined destination $D_N$ based upon the associated estimates of the states of charge (SOCs) associated with the choice of speeds.

In one or more embodiments, if it is determined at step 1010 that more electrical power is required to reach the predetermined destination $D_N$, the CPU 302 will also determine if one or more components can be turned to an off state or off-line state to conserve electrical power. For example, the total power estimations required to power one or more of the air conditioner, heating system, ventilation system, radio, etc. for the time $T_{RN}$ can be considered to determine if the ADV can reach the predetermined destination $D_N$ by conserving the estimated power. If so, CPU 302 can display the results of the range of speeds and estimated state of charges (SOCs) and give an ADV occupant a choice of which speed the ADV will travel to reach the predetermined destination $D_N$ and, if applicable, which ADV components to switch to an off state or off-line state to conserve energy. For example, if the estimated state of charge (SOC) is higher by a certain percentage such that it is determined at any point during a trip that the ADV cannot make it to a predetermined destination $D_N$ on the current state of charge (SOC), CPU 302 can also give an ADV occupant a choice to turn off one or more ADV components as discussed herein.

At step 1012, the query block poses the question can the ADV reach the predetermined destination $D_N$ utilizing the battery stack 402 at its current SOC? In response to the on-board computer 204 determining that the answer is yes, in one or more embodiments, the algorithm moves to step 1018 at block 1014. In other one or more embodiments, the ADV will navigate the current route $R_N$ at the current speed selected to reach the predetermined destination $D_N$.

Figure 10B:
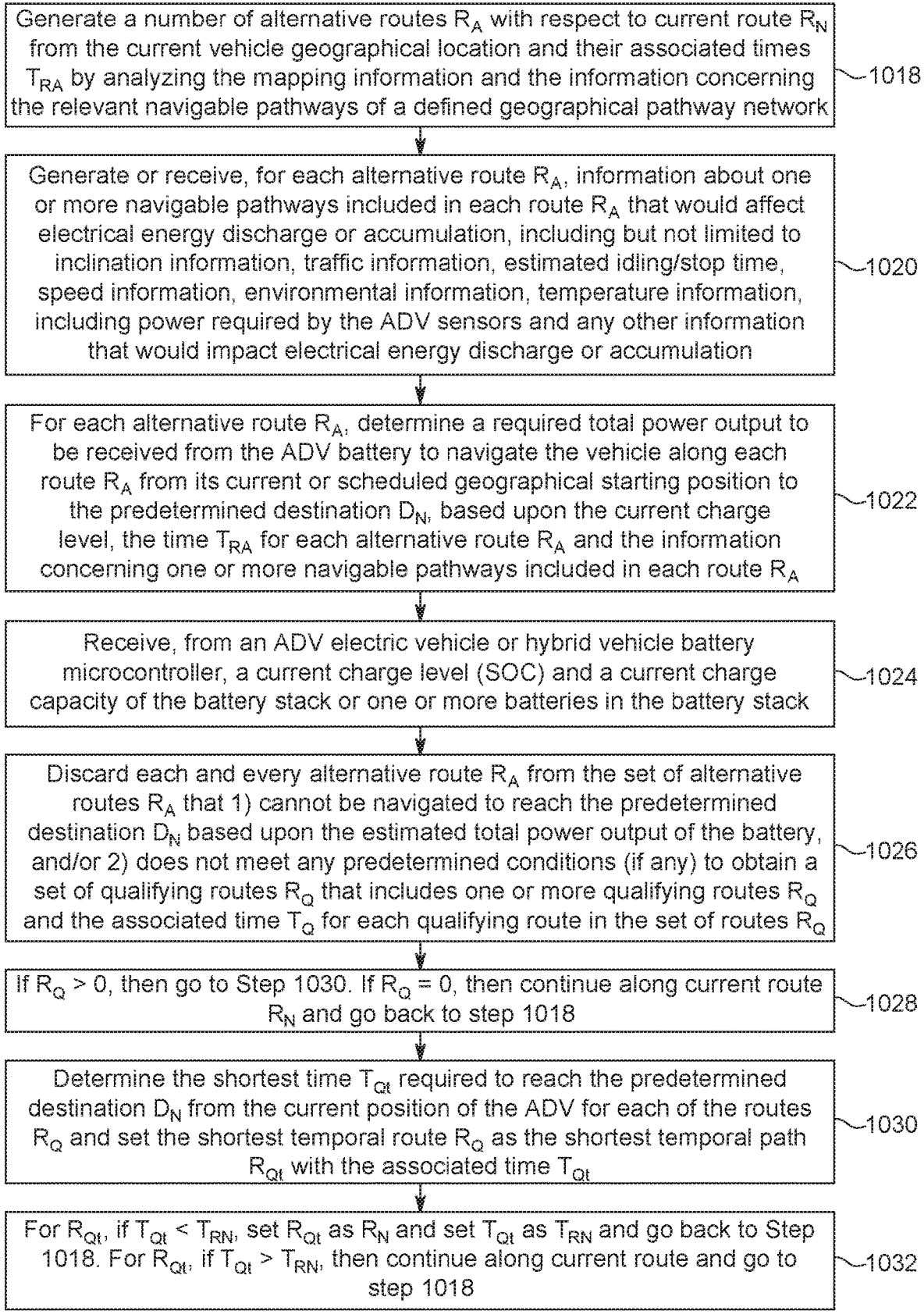
FIG. 10B is an example of a block diagram including a flow chart of one or more steps performed by one or more processors and/or other devices to navigate a route generated by an ADV using sensor and/or other data received by the processor(s) utilizing a power management algorithm, according to some embodiments.

With reference to FIG. 10B, the algorithm will now be discussed with reference to steps 1018-1030. At step 1018, on-board computer 204 generates a set of one or more alternative routes $R_A$ from the current geographical location of the ADV or a predetermined starting geographical location. The functionality performed by on-board computer 204 pursuant to the algorithm as described with reference to step 1018 is similar in functionality to the algorithm discussed with respect to step 804 and, thus, will not be described again in detail herein.

At step 1020, for each of the one or more alternative routes $R_A$ included in the set of alternative routes $R_A$, the CPU utilizing power management and battery monitoring system 312 determines which of the generated and/or received information indicates a battery stress event such that the battery stack 402 will be required to increase the amount of energy generated to meet the higher demand for power by the ADV or any of its components (e.g., the motor/generator 418, the ADV sensors, HVAC, air conditioner, heating system, 4-wheel drive (if applicable), etc.).

The functionality performed by on-board computer 204 pursuant to the algorithm as described with reference to step 1020 is similar in functionality to the algorithm discussed with respect to step 1004 and, thus, will not be described again in detail herein.

At step 1022, for each of the one or more alternative routes $R_A$ included in the set of alternative routes $R_A$, the CPU 302 utilizing power management and battery monitoring system 312, estimates the total required power based upon the information concerning each generated alternative route $R_A$, the navigable pathways included in each alternative route, the environmental conditions that are or will be impacting the region that includes each alternative route and/or the alternative route itself, components that are included in the ADV itself that may impact the SOC of the battery stack 402 and any other information that may impact the SOC of the battery stack 402. The functionality performed by on-board computer 204 pursuant to the algorithm as described with reference to step 1022 is similar in functionality to the algorithm discussed with respect to step 1006 and, thus, will not be described again in detail herein.

At step 1024, the CPU, utilizing the battery management system 222, receives the current charge level (SOC) of the battery stack 402. The functionality performed by on-board computer 204 pursuant to the algorithm as described with reference to step 1024 is similar in functionality to the algorithm discussed with respect to step 1008 and, thus, will not be described again in detail herein.

At step 1026, utilizing the power management and battery monitoring system 312, the CPU 302 will determine, for each of the one or more alternative routes $R_A$ included in the set of alternative routes $R_A$, if the ADV can reach the predetermined destination $D_N$ utilizing the battery stack 402 in its current state, that is with its current state of charge (SOC) and current state of health (SOH), from either the current vehicle geographical location or a scheduled predetermined starting geographical location. The functionality performed by on-board computer 204 pursuant to the algorithm as described with reference to step 1026 to make the above-described determination and perform the functionality pursuant to this determination is similar in functionality to the algorithm discussed with respect to step 1010 and, thus, will not be described again in detail herein. In response to a determination that the ADV cannot utilize one or more alternative routes to reach the predetermined destination $D_N$, then those alternative routes that cannot be utilized will be discarded to obtain a qualifying route set that includes one or more qualifying routes $R_Q$. In one or more embodiments, the one or more alternative routes that can be utilized to reach the predetermined destination is compared to a set predetermined conditions to obtain a qualifying route set that includes one or more qualifying routes $R_Q$. The functionality performed by on-board computer 204 pursuant to the algorithm as described with reference to step 1026 to compare a set of predetermined conditions to obtain a qualifying route set is similar in functionality to the algorithm discussed with respect to step 906 described with respect to FIG. 9 and, thus, will not be described again in detail herein.

At step 1028, in response to a determination that none of the alternative routes meet the requirements to be included in a set of qualifying routes, then the on-board computer 204 will continue to navigate the ADV along its current route $R_N$ and go back to step 1018 in the algorithm to continuously search for shorter temporal alternative routes. In the alternative, if the qualifying route set includes one or more qualifying routes $R_Q$, than the on-board computer 204 moves to step 1030 and determines the current location of the ADV and, with respect to the current location, determines which time $T_{RQ}$ for each of the qualifying routes $R_Q$ represents the shortest time. On-board computer 204 sets the qualifying route that is associated with the shortest $T_{RQ}$ as route $R_{Qt}$. In this example, route $R_{Qt}$ represents the shortest temporal path of all of the qualifying routes $R_Q$ in the set of qualifying routes $R_Q$ from the current position of the ADV to the predetermined destination $D_N$. As described in step 1022 concerning time $T_{RA}$, the on-board computer 204 similarly determines the time $T_{Qt}$ for shortest temporal path route $R_{Qt}$, wherein $T_{Qt}$ for the route $R_{Qt}$ represents the total time to traverse the shortest temporal path $R_{Qt}$ from the current geographical position of the ADV to the predetermined destination $D_N$. The time $T_{Qt}$ for the shortest temporal path $R_{Qt}$ is continuously updated and saved by the on-board computer 204 and/or the one or more control system nodes 502.

As described in step 1032, in response to the on-board computer 204 determining the time $T_{Qt}$ for the shortest temporal path $R_{Qt}$, the time $T_{Qt}$ for the shortest temporal path $R_{Qt}$ is compared to the time $T_{RN}$ for the current route $R_N$. If the time $T_{Qt}$ for the current geographical position of the ADV is less than the time $T_{RN}$ for the current route $R_N$, then the on-board computer 204 will set the route $R_{QT}$ as the new current route $R_{N+1}$ and automatically re-route the ADV to autonomously navigate the new current route $R_{N+1}$ as described herein. Once the new current route $R_{N+1}$ is set, the dynamic routing algorithm will recycle back to step 1018, set $R_{N+1}$ to the current route $R_N$ and continuously cycle through the dynamic routing algorithm that utilizes artificial intelligence to automatically navigate the ADV as described herein until the ADV reaches the predetermined destination $D_N$ as described herein. In one or more embodiments, on-board computer 204 will also determine if the required total power output to be received from the ADV battery to navigate the vehicle along the new current route $R_{N+1}$ is less than is required for the current route $R_N$. If the answer is the answer is no, then the on-board computer 204 will continue to navigate the ADV along the original current route $R_N$ and go back to step 1018 in the algorithm to continuously search for shorter temporal alternative routes that require less total power output from the battery stack 402.

With reference to FIG. 10A, at step 1012, in response to on-board computer 204 determining that the ADV cannot reach the predetermined destination $D_N$ utilizing the battery pack 402 with the current level of charge (SOC) and/or state of health (SOH), the algorithm moves to step 1040 that is described with reference to FIG. 10C. At step 1040, the algorithm performs steps 1018 through 1024 described herein with reference to FIG. 10B to generate an alternative route set that includes one or more alternative routes $R_A$.

At step 1044, utilizing the power management and battery monitoring system 312, the CPU 302 will determine, for each of the one or more alternative routes $R_A$ included in the set of alternative routes $R_A$, if the ADV can reach the predetermined destination $D_N$ utilizing the battery stack 402 in its current state, that is with its current state of charge (SOC) and current state of health (SOH), from either the current vehicle geographical location or a scheduled predetermined starting geographical location. The functionality performed by on-board computer 204 pursuant to the algorithm as described with reference to step 1044 to make the above-described determination and perform the functionality pursuant to this determination is similar in functionality to the algorithm discussed with respect to step 1010 and, thus, will not be described again in detail herein. At step

1046, in response to a determination that the ADV cannot utilize any of the alternative routes included in the alternative route set to reach the predetermined destination $D_N$, then the algorithm moves to step 1054 wherein the on-board computer 204 informs the ADV occupant that a new destination $D_{N+1}$ must be received or entered into the on-board computer such that the new destination can be reached by one or more generated routes. Persons having ordinary skill in the art appreciate that the new destination can be any place having a geographical location such as a theater, business, residence, charging station, gas station (in case of a HEV), etc.

At step 1046, in response to a determination that the ADV cannot utilize all of the alternative routes included in the alternative route set to reach the predetermined destination $D_N$, then, pursuant to step 1048, those alternative routes that cannot be utilized will be discarded to obtain a qualifying route set that includes one or more qualifying routes $R_Q$. In one or more embodiments, the one or more alternative routes that can be utilized to reach the predetermined destination is also compared to a set of predetermined conditions to obtain a qualifying route set that includes one or more qualifying routes $R_Q$. The functionality performed by on-board computer 204 pursuant to the algorithm as described with reference to step 1048 to compare a set of predetermined conditions to obtain a qualifying route set is similar in functionality to the algorithm discussed with respect to step 906 described with respect to FIG. 9 and, thus, will not be described again in detail herein.

Figure 10C:
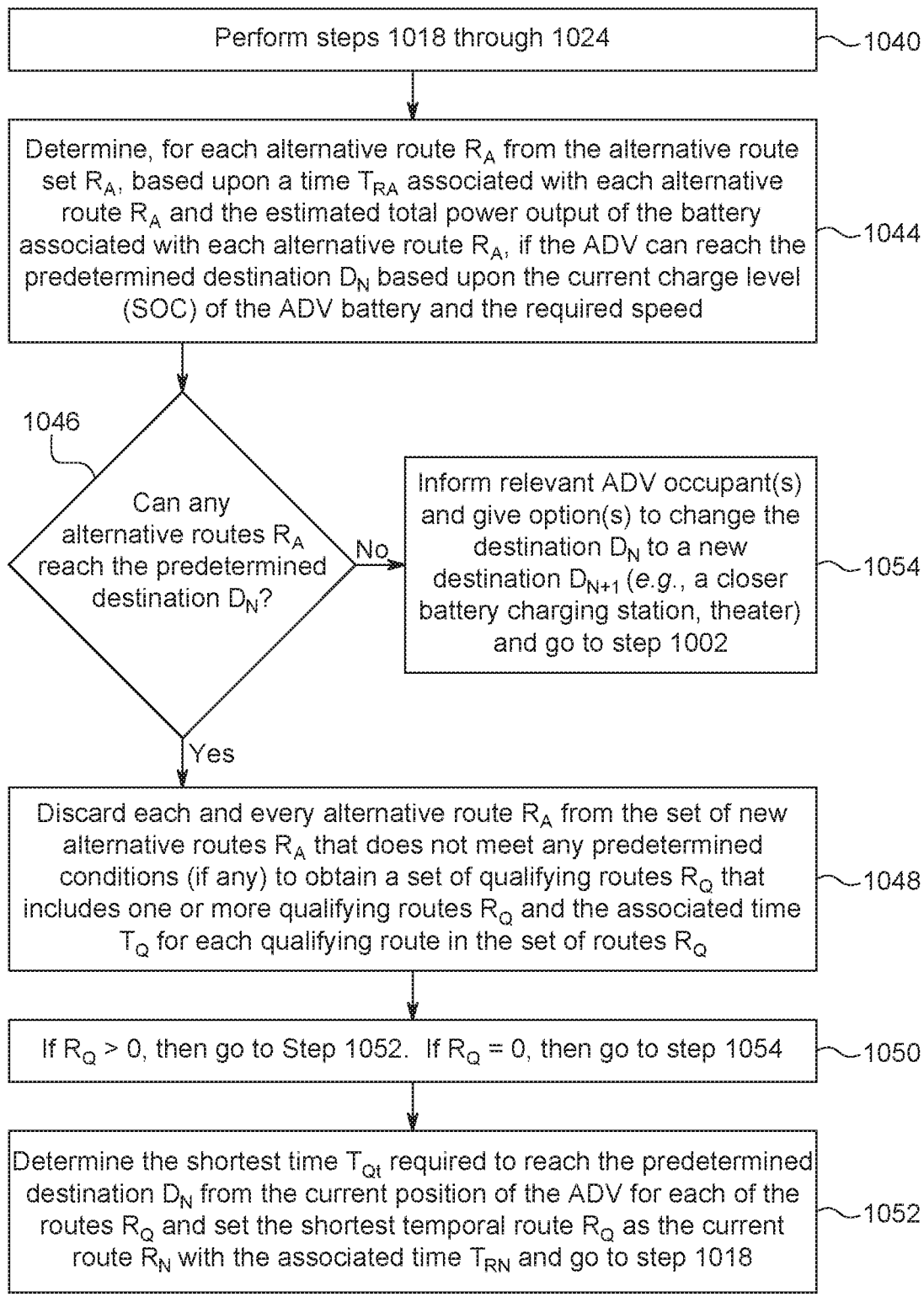
FIG. 10C is an example of a block diagram including a flow chart of one or more steps performed by one or more processors and/or other devices to navigate a route generated by an ADV using sensor and/or other data received by the processor(s) utilizing a power management algorithm, according to some embodiments.

At step 1050, if the qualifying route set $R_Q$ does not include one or more qualifying routes, then the algorithm advances to step 1054 described in detail above with reference to FIG. 10C. At step 1050, if the qualifying route set $R_Q$ includes one or more qualifying routes, then the algorithm advances to step 1052 wherein the qualifying route that is determined to be the shortest temporal path is set as the current route $R_N$ with an associated time $T_{RN}$ determined by techniques described herein. Thereafter, the algorithm advances to step 1018 to continuously search for shorter temporal routes or routes that require less electrical power output as described herein.

Another embodiment can use one or more dynamic routing algorithms, which utilize artificial intelligence as described herein, to automatically change the current destination of an ADV to a new geographical destination based upon one or more environmental conditions that exists or will exists to impact one or more navigational pathways in the relevant geographical area. Still another embodiment can use one or more algorithms described herein to navigate an ADV to a plurality of predetermined geographical destinations in a single generated route, wherein the ADV can dynamically choose any one of the plurality of predetermined destinations $D_N$ that represents the shortest temporal pathway from the current geographical location of the ADV, then move on to choose any one of the remaining plurality of predetermined destinations $D_{N-1}$ (i.e., a set of destinations that does not include the previously chosen destination) based upon which of the set of destinations $D_{N-2}$ represents the shortest temporal pathway from the current geographical location of the ADV. The dynamic routing algorithm can cycle through the set of predetermined destinations until all of the predetermined destinations have been reached by the ADV.

As described herein, ADV 602 includes an on-board computer 204 that functions to autonomously navigate "drive" the ADV along generated routes. Additionally, ADV 602 can be controlled manually when put into a manual mode of operation to operate as a normal vehicle. Here, an ADV occupant can manually operate a steering wheel, gas and brake pedals, turn signals, emergency lights, utilize one or more mirrors, and accelerate and/or come to a complete stop, and/or perform traditional functions and operations to drive the ADV manually like a conventional vehicle EV or HEV, depending upon the configuration.

The flowchart and block diagrams in the Figures referenced to describe one or more embodiments illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s) and/or method steps. It should also be noted that, in some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one or more embodiments described herein, the microcontroller 410 utilizes the open circuit voltage Vocv measurement to determine the SOC and SOH of the battery stack 402 and/or one or more batteries 404 included therein. One having ordinary skill in the art appreciates that other methods of determining the SOC and SOH can be utilized by one or more embodiments described herein including but not limited, for example, the Kalman filter method, the coulomb counting method or the enhanced coulomb counting method, the universal SOC algorithm, and/or a system that utilizes neural networks.

Examples of the computer devices that can be utilized by one or more embodiments of the ADV system network platform 600, as described with reference to FIG. 6, and/or computers communicatively connected to the network platform 600 will now be described with reference to FIGS. 1-6. For example, on-board computer 204, microcontroller 410, ADV control system node 502, and/or one or more computer components and corresponding functionality, as described below to enable the functionality of the computer devices described herein with reference to FIGS. 1-10C, can include communication transceivers that enable wired and/or wireless communication of device data, device data including transmitted data, received data, real time transmission of data and/or data scheduled for broadcast, data packets of the data, and any other transmission or reception form of communication using transceivers.

In one or more embodiments, the ADV system cloud network 610 that comprises one or more control nodes 502 that are described with reference to FIGS. 5 and 6 can include one or more web servers, and one or more waveform servers. The waveform servers and web servers are communicatively connected to the Internet such that can be data transmitted to the waveform servers and web servers from one or more computer devices (e.g., computer devices included in ADV 602, mobile devices 606, user PCs utilized for scheduling and monitoring trips taken by ADVs 602, etc.) connected to the ADV platform 600. The flowchart and block diagrams in the Figures referenced to describe one or more embodiments illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s) and/or method steps. It should also be noted that, in some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. Information concerning the battery stack utilized by an ADV can be transmitted to one or more of the waveform servers and web servers over a local network. For example, once an ADV is automatically re-routed as described herein, information concerning an arrival time of an ADV defined as the time it will the ADV to reach the predetermined destination from the current geographical position of the ADV (i.e., the current destination of the ADV along a route once it has been re-routed in accordance with the re-routing algorithm described herein) can be transmitted to the relevant ADV along with other information, data and instructions. For example, once the ADV is re-routed, information identifying the nearest external charging station may be transmitted to the relevant ADV by one or more control and system nodes 502.

The computer devices including, for example, the on-board computer 204 and ADV control system node 502 may be configured to provide voice and/or data communications functionality in accordance with different types of wireless network systems. For example, ADV 204, in one embodiment, includes a microphone wherein one or more ADV occupants can transmit voice data from the on-board computer 204 to one or more computer system nodes 502 that, in turn, may transmit the voice data to one or more ADVs 602 via network 608 or directly to another ADV utilizing the unique ADV identification information, as described with reference to FIG. 6. Mobile devices 606 may also communicate with the ADV control network platform 600 via a communication network 608. Examples of wireless network systems that may be utilized as networks 608, 610, 604 and any one or more networks utilized to connect communications devices (e.g., ADV 602, mobile devices 606, control and system nodes 502, and any computer devices utilized in each of the networks 608, 610, 604) described herein may further include (but are not limited to) a wireless local area network (WLAN) system, wireless metropolitan area network (WMAN) system, wireless wide area network (WWAN) system, and the like. Examples of suitable wireless network systems offering data communication services may include (but are not limited to) the Institute of Electrical and Electronics Engineers (IEEE) 802.xx series of protocols, such as the IEEE 802.11 a/b/g/n series of standard protocols and variants (also referred to as "WiFi"), the IEEE 802.16 series of standard protocols and variants (also referred to as "WiMAX"), the IEEE 802.20 series of standard protocols and variants, and the like. It should be noticed that references WAN and WWAN may be made interchangeably throughout the disclosure and/or references to LAN and WLAN may be made interchangeably throughout the disclosure. For example, network 608 can be configured as a public network, such as the Internet.

The computer devices on-board computer 204, ADV control system node 502, and/or one or more user workstations utilized to schedule trips in an ADV may also include, for example, one or more data input ports. For example, I/O interfaces 316 for the on-board computer 204 and the I/O interfaces for any of the additional computers described herein may be configured such that any type of data, media content, and/or inputs can be received, such as user-selectable inputs using display 210, messages using display 210 or a microphone (not shown) connected to the on-board computer 204, recorded video content, and any other type of audio, video, and/or image data received from any content and/or data source, including the ADV occupant sensors 208, the ADV navigation and control sensors 218, ADV reference sensors 216, etc (i.e., ADV sensors). The data input ports may also include USB ports, coaxial cable, internal connectors for flash memory or other memory devices described herein, and readable media such as flash memory sticks, CDs and DVDs. These data input ports may be used to couple the computer device to components, peripherals, or accessories such as microphones or cameras. Additionally, the computer device may include media capture components, such as an integrated microphone to capture audio and a camera to capture still images and/or video media content.

The transceiver modules utilized in on-board computer 204 (e.g., transceiver 206, communications transceiver 214, ADV device controller 212, occupant sensors 208, etc.), or in any one or more of the other ADV sensors described herein such as, for example, navigation and control sensors 218, ADV reference sensors 216, etc. may include one or more transceivers configured to communicate using different types of protocols, communication ranges, operating power requirements, RF sub-bands, information types (e.g., voice or data), use scenarios, applications, and/or the like. In various embodiments, one or more of the aforementioned transceivers may comprise, for example, one or more transceivers configured to support communications between ADVs 602, as described with reference to FIG. 6 using any number or combination of communication standards. For example, the transceivers included in or utilized by the on-board computers 204 of ADVs 602 in various embodiments may comprise one or more transceivers configured to perform data communications in accordance with one or more wireless communications protocols such as (but not limited to) WLAN protocols (e.g., IEEE 802.11 a/b/g/n, IEEE 802.16, IEEE 802.20, etc.), PAN protocols, Low-Rate Wireless PAN protocols (e.g., ZigBee, IEEE 802.15.4-2003), Infrared protocols, Bluetooth protocols, EMI protocols including passive or active RFID protocols, and/or the like.

The computer devices including on-board computer 204, ADV control system node 502, and/or one or more user desktop stations (not shown) or mobile devices 606 may also include one or more processors, microprocessors, controllers, and the like, which process computer-executable instructions to enable operation of the device and/or an ADV. Alternatively or in addition, the computer device can be implemented with any one or combination of software, hardware, firmware, or fixed logic circuitry that is implemented in connection with processing and control circuits. Although generally not shown, the computer devices including on-board computer 204, ADV control system node 502, and/or one more user desktop stations (not shown) or mobile devices 606 may also include a system bus or data transfer system that couples the various components within the device (e.g., a communications backbone). A system bus can include any one or combination of different bus structures, such as a memory bus or memory controller, a peripheral bus, a universal serial bus, and/or a processor or local bus that utilizes any of a variety of bus architectures.

The computer devices including on-board computer 204, ADV control system node 502, and/or one more user desktop stations (not shown) or mobile devices 606 may also include one or more memory devices that enable data storage, examples of which include random access memory (RAM), non-volatile memory (e.g., read-only memory (ROM), NAND flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The computer devices may also include a mass storage media device.

In one or more embodiments, memory devices included within the computer devices including memory device 414 (described with reference to FIG. 4) and memory device 314 included in on-board computer 204, memory device 504 included in ADV control system node(s) 502, and/or the memory device(s) included in or connected to user desktop stations (not shown) or mobile devices 606 can provide data storage mechanisms to store data and/or information generated, transmitted, and/or received from an ADV including, for example for some memory devices, sensor data described herein. This information includes information transmitted via mobile devices 606 described herein with respect to FIG. 6, device data such as sensor data generated by one or more ADV sensors described herein, other types of information and/or data, and information generated by various device applications including reference and positioning system 304, navigation and driving mode system 306, dynamic routing system 308, mapping system 310, battery management and monitoring system 312, occupant identification system 320, content identification and monitoring system 322, and/or other systems described herein.

For example, any one or more of the reference and positioning system 304, navigation and driving mode system 306, dynamic routing system 308, mapping system 310, battery management and monitoring system 312, occupant identification system 320, content identification and monitoring system 322, and operating system (not illustrated) (i.e., systems that may be configured as device applications) included in on-board computer 204 can be maintained as software instructions within memory device 314 and executed on the one or more processors 302. Similarly, one or more of the mapping system 508, ADV reference system 510, routing system 512, and occupant and content identification system 522 (i.e., systems that may be configured as device applications) can be maintained as software instructions within memory device 504 and executed on the one or more processors 514 included in the ADV control and system nodes 502. Each of the device applications may also include a device manager, such as any form of a control application, software application, signal-processing and control module, code that is native to a particular device, a hardware abstraction layer for a particular device, and so on.

In one or more embodiments, on-board computer 204, microcontroller 410, and/or one or more control system nodes 502 include an in-memory processing system configured to perform in-memory processing that can include memory data grid applications (e.g., Hazelcast IMDG, Infinispan, Pivotal GemFire XD, Oracle Coherence, GridGain Enterprise Edition, IBM WebSphere Application Server, Ehcache, XAP, Red Hat JBoss Data Grid, ScaleOut SateServer, Galaxy, etc.) to retrieve data from the associated accessible data storage device. In one or more embodiments, on-board computer 204 includes one or more RAM memory devices (e.g., SDRAM, DDR SDRAM, DDR2 SDRAM, DDR3 SDRAM, DDR4 SDRAM, etc.)(not shown) and/or flash memory (not shown) that may be utilized to perform in-memory processing in association with data storage 314 (e.g., a database, disk, memory bank, or any other suitable large memory device) or other storage devices accessible by on-board computer 204. Similarly, one or more nodes 502 and/or microcontroller 410 may utilize one or more RAM memory devices 524 to perform in-memory processing in association with the data and information stored in the map storage database 506 and/or other storage devices associated with the one or more relevant nodes (see examples associated with on-board computer data storage device 314). For example, the relevant data and/or information retrievably stored in data storage 314 and storage database 506 or any other storage device that is utilized to retrievably store and/or generate information (e.g., mapping information, navigational information, physiological state information, routes, reference information including current position of one or more ADVs, timing information including current times to reach a current destination, etc.) can also be maintained in one or more RAM memory devices, or devices utilized as RAM memory device (e.g., flash memory), and accessed utilizing an processing in-memory system.

The RAM memory device(s) described herein can be utilized to host all of the relevant data required to navigate one or more ADVs utilizing the sensors as described herein, monitor one or ADV occupants in one or more ADVs, generate routes for one or more ADVs as described herein, monitor one or more ADVs and the contents transported by the one or more ADVs, and/or monitor and manage a battery stack as described herein. In one or more embodiments, the RAM memory device(s) described herein can be utilized to host the entirety of the large memory structures in memory. In these embodiments, to ensure the durability of the data and information stored in RAM, copies of the data can also be stored in the associated long-term memory devices (i.e., data storage 314, data storage device 414, and/or storage system 506). Flash memory may also be used in association with or in place of the RAM memory device(s) to be used for the on-board computer system memory, microcontroller 410 and/or for the system memory for one or more nodes 502 for in-memory processing. For example, all of the relevant data required by either the on-board computer 204, the microcontroller 410 and/or control system nodes 502 to perform the functions described herein can be loaded into the associated system memory from the source database so that it can be processed in-memory instead of repetitively querying one or more databases for the required information. In one or more embodiments, the contents of one or more relevant databases (i.e., the entire database) may be loaded into the system memory for processing.

In one embodiment, the on-board computer 204 includes audio and video processing systems that are included in the navigation and driving mode system 306 and ADV device controller 212 that generates audio data and video data to assist in navigating the ADV as described herein and generate display data as described herein for a display system

210. The audio system and/or the display system may include any devices that process, display, and/or otherwise render audio, video, display, and/or image data. For example, one or more occupant sensors 208 can be camera devices that generate video data that is converted into video files that can be stored locally on computer 204 and transmitted to one or more computer and system nodes 502. Additionally, image files that include images of one or more ADV occupants may be created by on-board computer 204 utilizing image data generated by one or more occupant sensor devices 208 that can be one or more cameras.

In one or more embodiments, on-board computer 204 also utilizes one or more occupant sensors 208 that are camera devices that generate video data that can be used in conjunction with a secure Internet-enabled video conferencing application, such as Skype™ ClickMeeting™, Join.me™ and others to enable ADV occupants to communicate with persons occupying another ADV. Using video conferencing simultaneously with the disclosed system provides a tool for the ADV computer to interface with other ADV computers and allow the ADV system to assist ADV occupants in communicating with one another in different ADVs.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not limit the scope of the disclosure.

Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 428. Additionally, the audio system and/or the display system may be external components to the computer device, or alternatively, are integrated components of the example computer device.

All publications and patent applications mentioned in the specification are indicative of the level of skill of those skilled in the art to which this disclosure pertains. All publications and patent applications are herein incorporated by reference to the same extent as if each individual publication or patent application was specifically and individually indicated to be incorporated by reference.

The present disclosure has been described more fully herein with reference to the accompanying figures and drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The detailed description herein is, therefore, not intended to be taken in a limiting sense Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. Likewise, the term "if" may be interpreted as "in response to."

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventor that variations and equivalents of the invention are within the scope of the claims while the description, abstract and drawings are not to be used to limit the scope of the invention. The invention is specifically intended to be as broad as the claims below and their equivalents.

What is claimed is:

1. A system to route an autonomous driving vehicle, comprising:
   a battery device configured to provide electrical power to an autonomous driving vehicle;
   an on-board computer comprising:
   one or more processors programmed to autonomously navigate the vehicle along a current route to a predetermined geographical destination;
   one or more sensor devices communicatively coupled to the on-board computer;
   wherein at least one of the one or more sensor devices is configured to generate battery data including a state of charge of the battery device;
   wherein at least one of the one or more processors, in response to receiving the destination, is programmed to:
   determine a starting geographical location of the vehicle;
   generate mapping information for a geographical area that includes the starting location of the vehicle, the destination, one or more navigable pathways between the starting vehicle location and the destination and information concerning the one or more pathways;

generate, utilizing the mapping information, the current route from the starting location of the vehicle to the destination that includes one or more of the navigable pathways;

determine a current route time that represents a time that it will take to navigate the vehicle along the current route from the starting location to reach the destination;

receive the state of charge of the battery device from the at least one sensor device;

determine an estimated total amount of electrical power required to navigate the vehicle along the current route to reach the destination;

determine, utilizing the state of charge of the battery device and the total amount of electrical power, if the on-board computer can navigate the vehicle along the current route from the starting location to the destination without having to charge the battery device utilizing an external power source; and in response to determining that the on-board computer can navigate the vehicle along the current route to reach the destination without having to charge the battery device utilizing the external power source, autonomously navigate the vehicle from the starting location to the destination along the current route;

a data storage device communicatively coupled to the one or more processors for retrievably storing data; and an in-memory processing system that includes the at least one of the one or more processors to perform in-memory processing of data received from one or more devices included in the system.

2. The system of claim 1, wherein the at least one of the one or more processors, in response to determining that the on-board computer can navigate the current route to reach the destination without having to charge the battery device utilizing the external power source, is programmed to:

generate, utilizing the mapping information, a set of one or more alternative routes that include one or more navigable pathways from the starting location to the destination, and determine a corresponding set of alternative route times for the set of alternative routes that represents a time that it will take to navigate the vehicle along each alternative route from the starting location to reach the destination, wherein each alternative route includes at least one navigable pathway that is not included within any of the other alternative routes;

wherein the at least one of the one or more processors, in response to the identification of the set of one or more alternative routes, is programmed to determine the new current route by:

comparing the current route time to the set of alternative route times;

determining a shortest time between the current route time and each of the alternative route times in the set of alternative route times; and in response to determining that the shortest time is one of the alternative route times, setting the alternative route associated with the shortest time as the new current route of the vehicle.

3. The system of claim 1, wherein the battery device is a lithium-ion battery stack that includes one or more lithium-ion batteries, and wherein the sensor device configured to generate battery data comprises:

a microcontroller;

a voltage sensing circuit communicatively coupled to the battery device and the microcontroller;

a current sensing circuit communicatively coupled to the battery device and the microcontroller;

a temperature sensing circuit communicatively coupled to the battery device and the microcontroller; and a monitoring and performance device communicatively coupled to the battery device and the microcontroller that is configured to measure the impedance of the battery device;

wherein the microcontroller determines the state of charge and a state of health of the battery device utilizing data generated by the voltage sensing circuit, current sensing circuit, temperature sensing circuit and monitoring and performance circuit.

4. The system of claim 1, wherein the determination of an estimated total amount of electrical power required to navigate the vehicle along the current route to reach the destination is determined by one or more processors programmed to:

analyze, utilizing the mapping information, the one or more navigable pathways included in the current route to identify stress events associated with the one or more navigable pathways included in the current route that affect the energy charge and discharge of the battery device;

wherein the stress events include any one of an angle of inclination, an angle of curvature, a wind speed, a severity of rain, a surface grade and a depth of snow that impact the one or more navigable pathways included in the current route; and determine, utilizing the mapping information, the current route time and the identified stress events, the estimated amount of electrical power that will be discharged from the battery device to enable the on-board computer to navigate the vehicle along the current route to reach the destination.

5. The system of claim 1, wherein the at least one of the one or more processors, in response to determining that the on-board computer cannot navigate the current route to reach the destination without having to charge the battery device utilizing an external power source, is programmed to:

generate, utilizing the mapping information, a set of one or more alternative routes that includes one or more navigable pathways between the starting location to the destination;

determine a corresponding set of alternative route times for the set of alternative routes that represents a time that it will take to navigate the vehicle along each alternative route from the starting location to reach the destination;

wherein each alternative route includes at least one navigable pathway that is not included within any of the other alternative routes;

determine an estimated total amount of electrical power required to navigate the vehicle along the current route to reach the destination;

determine, utilizing the state of charge of the battery device and the total amount of electrical power, if the on-board computer can navigate the vehicle along each of the alternative routes from the starting location to the destination without having to charge the battery device utilizing an external power source; and in response to determining that the on-board computer can navigate the vehicle along one or more alternative routes to reach the destination without having to charge the battery device utilizing the external power source, identify each of the one or more alternative routes that can be navigated without having to charge the battery device utilizing the external power source as a qualifying route set of one or more qualifying routes and identify each alternative route time associated with the respective qualifying route as a qualifying route time;

wherein the at least one of the one or more processors, in response to the identification of the set of one or more qualifying routes, is programmed to determine the new current route by:
determining a shortest time between the one or more qualifying route times; and
setting the qualifying route associated with the shortest time as the new current route of the vehicle.

6. The system of claim 4, wherein the one or more sensors comprise:
at least one transducer that is configured to generate data indicative of a weight of one or more items placed within the vehicle;
wherein the at least one of the one or more processors are programmed to
receive a weight of the vehicle;
receive a weight of one or more occupants within the vehicle;
determine the combined weight of the vehicle, one or more occupants within the vehicle and one or more items place within the vehicle and identify the combined weight as a stress event;
determine, utilizing the mapping information, the current route time and the identified stress events, the estimated amount of electrical power that will be discharged from the battery device to enable the on-board computer to navigate the vehicle along the current route to reach the destination.

7. The system of claim 4 further including a display device that includes a touch screen,
wherein the estimated total amount of electrical power is calculated utilizing the assigned speed limit for one or more navigable pathways included in the current route; and
wherein the at least one of the one or more processors, in response to determining that the on-board computer cannot navigate the current route to reach the destination without having to charge the battery device utilizing the external power source, is programmed to:
determine an estimated total amount of electrical power required to navigate the vehicle from the starting location along the current route to reach the destination for a set of speeds that includes a speed that is 20%, 30% and 40% below the assigned speed limit for one or more navigable pathways included in the current route;
determine, for each speed included in the set of speeds, an associated estimated threshold below which the battery device will not discharge;
display each speed included in the set of speeds and the associated estimated thresholds on the display device; and
in response to one of the speeds being selected, navigate the vehicle at the selected speed along the current route to reach the destination without having to charge the battery device utilizing the external power source.

8. A processor implemented method for routing an autonomous driving vehicle comprising:
providing electrical power to an autonomous driving vehicle by a battery device;
autonomously navigating the vehicle along a current route to a predetermined geographical destination by at least one of one or more processors;
generating, utilizing at least one of one or more sensor devices, data concerning the battery device including a current state of charge of the battery device;
determining a starting geographical location of the vehicle;
generating mapping information, utilizing data retrieved from a storage device, for a geographical area that includes the starting location of the vehicle, the destination, one or more navigable pathways between the starting vehicle location and the destination and information concerning the one or more pathways;
performing in-memory processing, using an in-memory processing system that includes the at least one of the one or more processors utilizing the mapping information,
to generate the current route from the starting location of the vehicle to the destination that includes one or more navigable pathways; and
to determine a current route time that represents a time that it will take to navigate the vehicle along the current route from the starting location to reach the destination;
receiving the state of charge of the battery device from the at least one of the one or more sensor devices;
determining an estimated total amount of electrical power required to navigate the vehicle along the current route to reach the destination;
utilizing the state of charge and the total amount of electrical power to determine if the vehicle can be navigated from along the current route from the staring location to the destination without having to charge the battery device utilizing an external power source; and
navigating the vehicle along the current route to the destination in response to determining that the vehicle can be navigated along the current route from the staring location to the destination without having to charge the battery device utilizing an external power source.

9. The processor implemented method of claim 8, further comprising:
in response to determining that the vehicle can be navigated along the current route from the staring location to the destination without having to charge the battery device utilizing an external power source,
generating, utilizing the mapping information, a set of one or more alternative routes that include one or more navigable pathways from the starting location to the destination, wherein each alternative route includes at least one navigable pathway that is not included within any of the other alternative routes; and
determining a corresponding set of alternative route times for the set of alternative routes that represents a time that it will take to navigate the vehicle along each alternative route from the starting location to reach the destination;

in response to the identification of the set of one or more alternative routes,
comparing the current route time to the set of alternative route times; and
determining a shortest time between the current route time and each of the alternative route times in the set of alternative route times; and
in response to determining that the shortest time is one of the alternative route times,
setting the alternative route associated with the shortest time as the new current route of the vehicle.

10. The processor implemented method of claim 8, wherein the step of receiving the state of charge of the battery device comprises:
receiving, by a microcontroller, battery data indicative of a voltage of the battery device;
receiving, by the microcontroller, battery data indicative of a current of the battery device;
receiving, by the microcontroller, battery data indicative of a temperature of the battery device;
receiving, by the microcontroller, battery data indicative of an impedance of the battery device;
determining, by the microcontroller utilizing the battery data, the state of charge of the battery device; and
transmitting the state of charge to the at least one of the one or more processors.

11. The processor implemented method of claim 8, wherein determining an estimated total amount of electrical power required to navigate the vehicle along the current route to reach the destination includes:
analyzing the mapping information and the one or more navigable pathways included in the current route to identify stress events associated with the one or more navigable pathways included in the current route that affect the energy charge and discharge of the battery device,
wherein the stress events include any one of an angle of inclination, an angle of curvature, a wind speed, a severity of rain, a surface grade and a depth of snow that impact the one or more navigable pathways included in the current route; and
utilizing the mapping information, the current route time and the identified stress events to determine the estimated amount of electrical power that will be discharged from the battery device to enable the on-board computer to navigate the vehicle along the current route to reach the destination.

12. The processor implemented method of claim 8, in response to determining that the on-board computer cannot navigate the current route to reach the destination without having to charge the battery device utilizing an external power source,
utilizing the mapping information to generate a set of one or more alternative routes that includes one or more navigable pathways between the starting location to the destination;
determining a corresponding set of alternative route times for the set of alternative routes that represents a time that it will take to navigate the vehicle along each alternative route from the starting location to reach the destination, wherein each alternative route includes at least one navigable pathway that is not included within any of the other alternative routes;
determining an estimated total amount of electrical power required to navigate the vehicle along the current route to reach the destination;
utilizing the state of charge of the battery device and the total amount of electrical power to determine if the on-board computer can navigate the vehicle along each of the alternative routes from the starting location to the destination without having to charge the battery device utilizing an external power source; and
in response to determining that the on-board computer can navigate the vehicle along one or more alternative routes to reach the destination without having to charge the battery device utilizing the external power source,
identifying each of the one or more alternative routes that can be navigated without having to charge the battery device utilizing an external power source as a qualifying route set of one or more qualifying routes; and
identifying each alternative route time associated with the respective qualifying route as a qualifying route time; and
in response to the identification of the set of one or more qualifying routes, is programmed to determine the new current route by:
determining a shortest time between the one or more qualifying route times; and
setting the qualifying route associated with the shortest time as the new current route of the vehicle.

13. The processor implemented method of claim 11, wherein determining an estimated total amount of electrical power required to navigate the vehicle along the current route to reach the destination includes:
generating, by at least one transducer, data indicative of a weight of one or more items placed within the vehicle;
receiving a weight of the vehicle;
receiving a weight of one or more occupants within the vehicle;
determining the combined weight of the vehicle, one or more occupants within the vehicle and one or more items place within the vehicle;
identifying the combined weight as a stress event; and
utilizing the mapping information, the current route time and the identified stress events to determine the estimated amount of electrical power that will be discharged from the battery device to enable the on-board computer to navigate the vehicle along the current route to reach the destination.

14. The processor implemented method of claim 11, wherein determining an estimated total amount of electrical power required to navigate the vehicle along the current route to reach the destination includes:
utilizing the assigned speed limit for one or more navigable pathways included in the current route to determine the estimated total amount of electrical power; and
in response to determining that the on-board computer cannot navigate the current route to reach the destination without having to charge the battery device utilizing the external power source,
determining an estimated total amount of electrical power required to navigate the vehicle from the starting location along the current route to reach the destination for a set of speeds that includes a speed that is 20%, 30% and 40% below the assigned speed limit for one or more navigable pathways included in the current route;
determining, for each speed included in the set of speeds, an associated estimated threshold below which the battery device will not discharge;

displaying each speed included in the set of speeds and the associated estimated thresholds on the display device; and in response to one of the speeds being selected, navigating the vehicle at the selected speed along the current route to reach the destination without having to charge the battery device utilizing the external power source.

15. A computer program product for routing an autonomous driving vehicle, the computer program product comprising a non-transitory computer readable storage medium having program code embodied therewith, the program code readable and executable by at least one of one or more processors to perform a method comprising:

providing electrical power to an autonomous driving vehicle by a battery device;

autonomously navigating the vehicle along a current route to a predetermined geographical destination by at least one of one or more processors;

generating, utilizing at least one of one or more sensor devices, data concerning the battery device including a current state of charge of the battery device;

determining a starting geographical location of the vehicle;

generating mapping information, utilizing data retrieved from a storage device, for a geographical area that includes the starting location of the vehicle, the destination, one or more navigable pathways between the starting vehicle location and the destination and information concerning the one or more pathways;

performing in-memory processing, using an in-memory processing system that includes the at least one of the one or more processors utilizing the mapping information, to generate the current route from the starting location of the vehicle to the destination that includes one or more navigable pathways; and to determine a current route time that represents a time that it will take to navigate the vehicle along the current route from the starting location to reach the destination;

receiving the state of charge of the battery device from the at least one of the one or more sensor devices;

determining an estimated total amount of electrical power required to navigate the vehicle along the current route to reach the destination;

utilizing the state of charge and the total amount of electrical power to determine if the vehicle can be navigated from along the current route from the staring location to the destination without having to charge the battery device utilizing an external power source; and navigating the vehicle along the current route to the destination in response to determining that the vehicle can be navigated along the current route from the staring location to the destination without having to charge the battery device utilizing an external power source.

16. The computer product of claim 15, wherein the method further comprises:

in response to determining that the vehicle can be navigated along the current route from the staring location to the destination without having to charge the battery device utilizing an external power source, generating, utilizing the mapping information, a set of one or more alternative routes that include one or more navigable pathways from the starting location to the destination, wherein each alternative route includes at least one navigable pathway that is not included within any of the other alternative routes; and determining a corresponding set of alternative route times for the set of alternative routes that represents a time that it will take to navigate the vehicle along each alternative route from the starting location to reach the destination;

in response to the identification of the set of one or more alternative routes, comparing the current route time to the set of alternative route times; and determining a shortest time between the current route time and each of the alternative route times in the set of alternative route times; and in response to determining that the shortest time is one of the alternative route times, setting the alternative route associated with the shortest time as the new current route of the vehicle.

17. The computer product of claim 15, wherein determining an estimated total amount of electrical power required to navigate the vehicle along the current route to reach the destination includes:

analyzing the mapping information and the one or more navigable pathways included in the current route to identify stress events associated with the one or more navigable pathways included in the current route that affect the energy charge and discharge of the battery device, wherein the stress events include any one of an angle of inclination, an angle of curvature, a wind speed, a severity of rain, a surface grade and a depth of snow that impact the one or more navigable pathways included in the current route; and utilizing the mapping information, the current route time and the identified stress events to determine the estimated amount of electrical power that will be discharged from the battery device to enable the on-board computer to navigate the vehicle along the current route to reach the destination.

18. The computer product of claim 15, wherein the method further comprises:

in response to determining that the on-board computer cannot navigate the current route to reach the destination without having to charge the battery device utilizing an external power source, utilizing the mapping information to generate a set of one or more alternative routes that includes one or more navigable pathways between the starting location to the destination;

determining a corresponding set of alternative route times for the set of alternative routes that represents a time that it will take to navigate the vehicle along each alternative route from the starting location to reach the destination, wherein each alternative route includes at least one navigable pathway that is not included within any of the other alternative routes;

determining an estimated total amount of electrical power required to navigate the vehicle along the current route to reach the destination;

utilizing the state of charge of the battery device and the total amount of electrical power to determine if the on-board computer can navigate the vehicle along each of the alternative routes from the starting location to the destination without having to charge the battery device utilizing an external power source; and in response to determining that the on-board computer can navigate the vehicle along one or more alternative routes to reach the destination without having to charge the battery device utilizing the external power source,
- identifying each of the one or more alternative routes that can be navigated without having to charge the battery device utilizing an external power source as a qualifying route set of one or more qualifying routes; and
- identifying each alternative route time associated with the respective qualifying route as a qualifying route time; and in response to the identification of the set of one or more qualifying routes, is programmed to determine the new current route by:
- determining a shortest time between the one or more qualifying route times; and
- setting the qualifying route associated with the shortest time as the new current route of the vehicle.

19. The computer product of claim 17, wherein determining an estimated total amount of electrical power required to navigate the vehicle along the current route to reach the destination includes:
- generating, by at least one transducer, data indicative of a weight of one or more items placed within the vehicle;
- receiving a weight of the vehicle;
- receiving a weight of one or more occupants within the vehicle;
- determining the combined weight of the vehicle, one or more occupants within the vehicle and one or more items place within the vehicle;
- identifying the combined weight as a stress event; and
- utilizing the mapping information, the current route time and the identified stress events to determine the estimated amount of electrical power that will be discharged from the battery device to enable the on-board computer to navigate the vehicle along the current route to reach the destination.

20. The computer product of claim 17, wherein determining an estimated total amount of electrical power required to navigate the vehicle along the current route to reach the destination includes:
- utilizing the assigned speed limit for one or more navigable pathways included in the current route to determine the estimated total amount of electrical power; and
- in response to determining that the on-board computer cannot navigate the current route to reach the destination without having to charge the battery device utilizing the external power source,
  - determining an estimated total amount of electrical power required to navigate the vehicle from the starting location along the current route to reach the destination for a set of speeds that includes a speed that is 20%, 30% and 40% below the assigned speed limit for one or more navigable pathways included in the current route;
  - determining, for each speed included in the set of speeds, an associated estimated threshold below which the battery device will not discharge;
  - displaying each speed included in the set of speeds and the associated estimated thresholds on the display device; and
- in response to one of the speeds being selected,
  - navigating the vehicle at the selected speed along the current route to reach the destination without having to charge the battery device utilizing the external power source.

* * * * *